(12) United States Patent
Kihara et al.

(10) Patent No.: US 11,623,222 B2
(45) Date of Patent: *Apr. 11, 2023

(54) SEPARATION APPARATUS, GRINDING APPARATUS AND BEVERAGE PRODUCING APPARATUS

(71) Applicant: Daito Giken, Inc., Tokyo (JP)

(72) Inventors: Kaishun Kihara, Tokyo (JP); Toshio Saito, Tokyo (JP)

(73) Assignee: Daito Giken, Inc., Tokyo (JP)

( * ) Notice: Subject to any disclaimer, the term of this patent is extended or adjusted under 35 U.S.C. 154(b) by 461 days.

This patent is subject to a terminal disclaimer.

(21) Appl. No.: 16/851,591

(22) Filed: Apr. 17, 2020

(65) Prior Publication Data

US 2020/0238297 A1    Jul. 30, 2020

Related U.S. Application Data

(63) Continuation of application No. 15/924,656, filed on Mar. 19, 2018, now Pat. No. 10,695,773, which is a continuation of application No. PCT/JP2017/028615, filed on Aug. 7, 2017.

(51) Int. Cl.
| | |
|---|---|
| *A47J 42/02* | (2006.01) |
| *B02C 21/00* | (2006.01) |
| *A47J 42/52* | (2006.01) |
| *A47J 31/42* | (2006.01) |

(52) U.S. Cl.
CPC .............. *B02C 21/00* (2013.01); *A47J 42/02* (2013.01); *A47J 31/42* (2013.01); *A47J 42/52* (2013.01)

(58) Field of Classification Search
CPC .. A47J 31/42; A47J 31/52; A47J 42/02; A47J 42/00

See application file for complete search history.

(56) References Cited

U.S. PATENT DOCUMENTS

| | | | |
|---|---|---|---|
| 2,045,591 A | 6/1936 | Falla | |
| 5,076,157 A | 12/1991 | Satake | |
| 5,845,561 A | 12/1998 | Chigira et al. | |

(Continued)

FOREIGN PATENT DOCUMENTS

| | | |
|---|---|---|
| CN | 106660050 A | 5/2017 |
| JP | 58119886 U | 8/1983 |

(Continued)

OTHER PUBLICATIONS

Extended European Search Report dated Jul. 2, 2020 in European Patent Appln. No. 17849807.7.

(Continued)

*Primary Examiner* — Reginald Alexander
(74) *Attorney, Agent, or Firm* — Venable LLP

(57) ABSTRACT

A separation apparatus for separating an unwanted substance from an extraction target includes a forming unit configured to form a separation chamber through which the extraction target passes, and a suction unit communicating with the separation chamber in a direction crossing a passage direction of the extraction target and configured to suck air in the separation chamber. The forming unit includes an inlet for the extraction target, which communicates with the separation chamber, and an outlet for the extraction target, which communicates with the separation chamber, and the air is sucked from the outlet into the separation chamber by suction of the suction unit.

4 Claims, 60 Drawing Sheets

(56) References Cited

U.S. PATENT DOCUMENTS

| | | |
|---|---|---|
| 7,143,686 B1 | 12/2006 | Sandolo |
| 10,595,665 B2 | 3/2020 | Kihara et al. |
| 2002/0096058 A1 | 7/2002 | Li |
| 2016/0015215 A1 | 1/2016 | Ohta et al. |
| 2017/0273496 A1 | 9/2017 | Kitatani |
| 2019/0038064 A1 | 2/2019 | Kihara et al. |

FOREIGN PATENT DOCUMENTS

| | | | |
|---|---|---|---|
| JP | 61083890 A | | 4/1986 |
| JP | H04-103842 U | | 9/1992 |
| JP | 08009945 A | | 1/1996 |
| JP | H08-052081 A | | 2/1996 |
| JP | 10191889 A | | 7/1998 |
| JP | 3054703 U | | 9/1998 |
| JP | H11-318723 A | | 11/1999 |
| JP | 2008104651 A | | 5/2008 |
| JP | 2013066697 A | | 4/2013 |
| JP | 2013220073 A | | 10/2013 |
| TW | 200922503 A | | 6/2009 |
| TW | 201014556 A1 | | 4/2010 |
| WO | 2010044116 A2 | | 4/2010 |

OTHER PUBLICATIONS

Japanese Office Action dated Apr. 23, 2021 in corresponding Japanese Patent Appln. No. 2018-200286.

Japanese Office Action dated Sep. 27, 2021 in corresponding Japanese Patent Appln. No. 2018-200286.

Office Action dated Sep. 26, 2019 in corresponding Chinese Patent Application No. 201780008659.3.

Taiwan Notice of Allowance issued in corresponding Taiwainese Application No. 1071262275 dated Jul. 11, 2019.

Japanese Office Action issued in corresponding Japanese Application No. 2018-516588 dated Jul. 30, 2018.

Written Opinion and International Search Report issued in parent International Application No. PCT/JP2017/028615 dated Oct. 31, 2017.

FIG. 38

F I G. 50
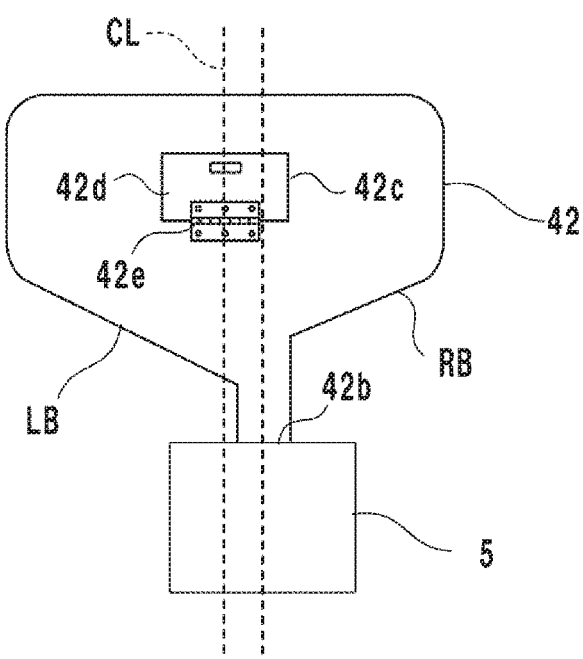
EX11
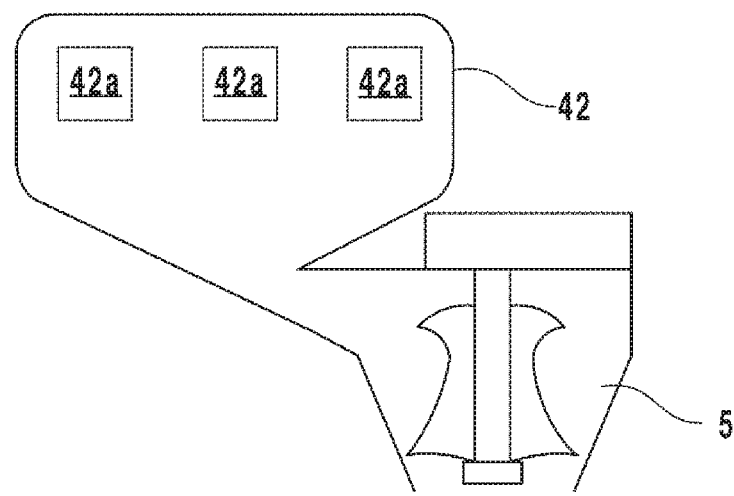
EX12

F I G. 56
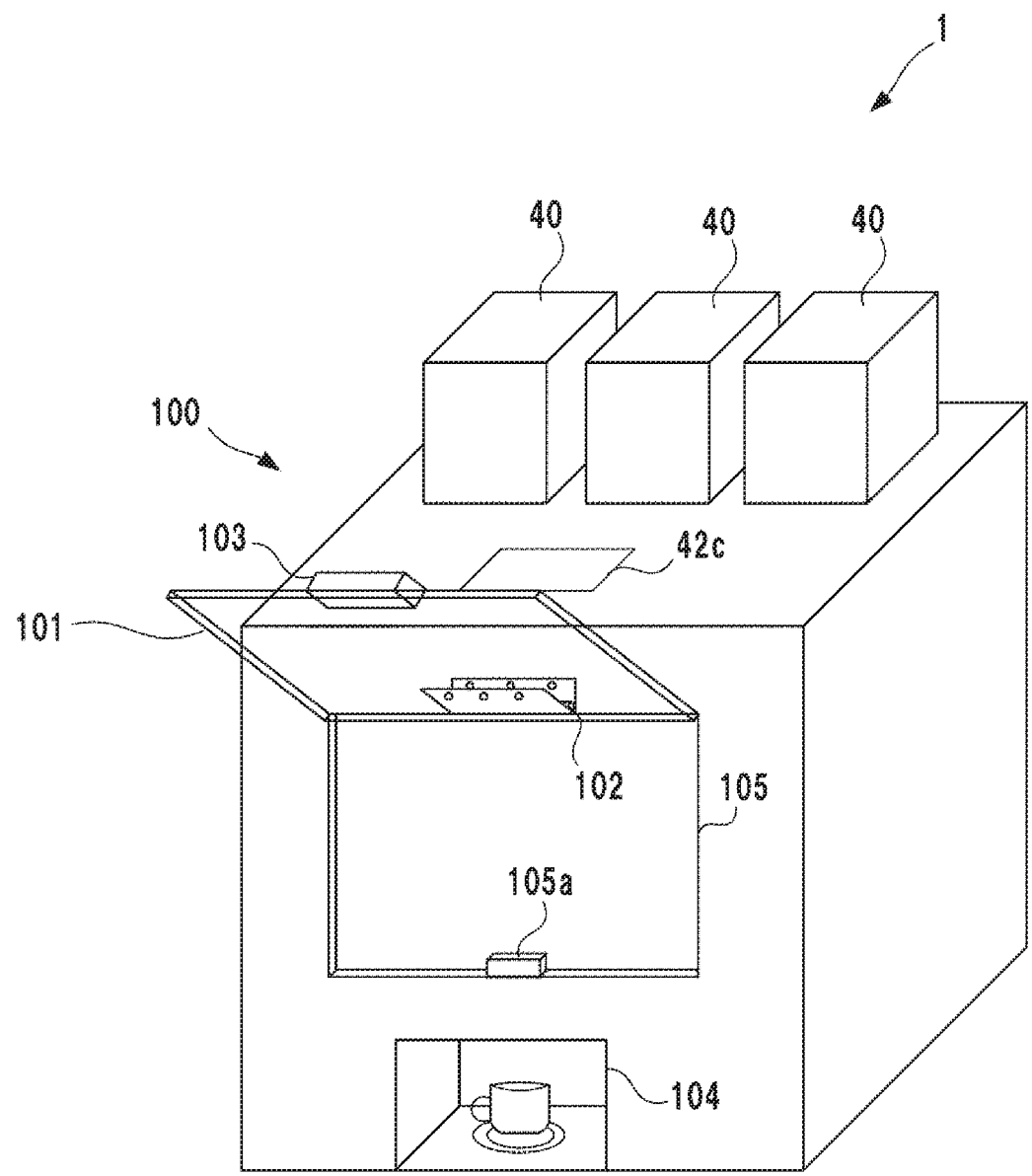

SEPARATION APPARATUS, GRINDING APPARATUS AND BEVERAGE PRODUCING APPARATUS

This application is a continuation of U.S. patent application Ser. No. 15/924,656, filed Mar. 19, 2018, which is a continuation of International Patent Application No. PCT/JP2017/028615 filed on Aug. 7, 2017, the entire contents of which are both incorporated herein by reference.

TECHNICAL FIELD

The present invention relates to a technique of producing a beverage (for example, a coffee beverage) and, more particularly, to a separation apparatus, a grinding apparatus and a beverage producing apparatus.

BACKGROUND ART

An unwanted substance (for example, chaff) is mixed in an extraction target (for example, roasted coffee beans). Such an unwanted substance becomes a factor that spoils the taste of a beverage (for example, a coffee beverage) obtained by extraction.

SUMMARY OF INVENTION

It is an object of the present invention to provide an apparatus that separates an unwanted substance from an extraction target.

According to an aspect of the present invention, there is provided a separation apparatus for separating an unwanted substance (for example, chaff) from an extraction target (for example, ground beans of roasted coffee beans), comprising: a forming unit configured to form a separation chamber through which the extraction target passes; and a suction unit communicating with the separation chamber in a direction crossing a passage direction of the extraction target and configured to suck air in the separation chamber, wherein the forming unit includes: an inlet for the extraction target, which communicates with the separation chamber; and an outlet for the extraction target, which communicates with the separation chamber, and the air is sucked from the outlet into the separation chamber by suction of the suction unit.

According to another aspect of the present invention, there is also provided a grinding apparatus comprising: a first grinder configured to grind (for example, coarsely grind) an extraction target (for example, roasted coffee beans); the above-described separation apparatus configured to separate an unwanted substance (for example, chaff) from the extraction target discharged from the first grinder; and a second grinder configured to grind (for example, finely grind) the extraction target (for example, ground beans) discharged from the separation apparatus.

According to still another aspect of the present invention, there is also provided a beverage producing apparatus comprising: the above-described grinding apparatus; and an extracting apparatus configured to extract a beverage liquid (for example, a coffee liquid) from an extraction target (for example, ground beans) discharged from the grinding apparatus.

BRIEF DESCRIPTION OF DRAWINGS

FIG. 38 is a vertical sectional view of the periphery of the canister according to another example in the attached state;

FIG. 48 is a view showing other examples of a collective conveyance path and the like;

FIG. 49 is a view showing other examples of the collective conveyance path and the like;

FIG. 50 is a view showing other examples of the collective conveyance path and the like;

FIG. 51 is a view showing other examples of the collective conveyance path and the like;

FIG. 52 is a view showing other examples of the collective conveyance path and the like;

FIG. 53 is a view showing other examples of the collective conveyance path and the like;

FIG. 54 is a view showing other examples of the collective conveyance path and the like;

FIG. 56 is an explanatory view of the operation of the housing shown in FIG. 55;

DESCRIPTION OF EMBODIMENTS

Embodiments of the present invention will now be described with reference to the accompanying drawings.

First Embodiment

<1. Outline of Beverage Producing Apparatus>

Figure 1:
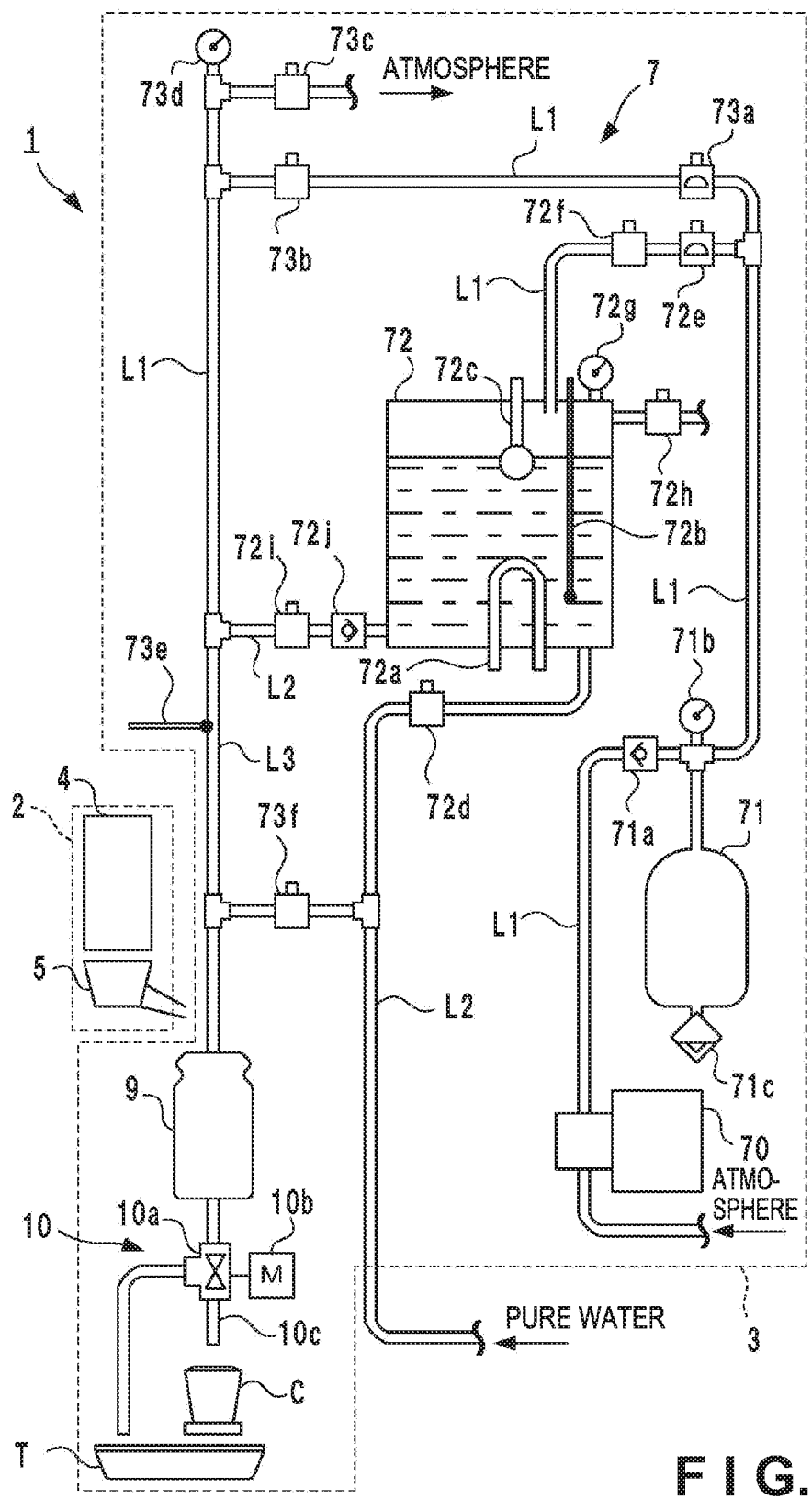
FIG. 1 is a schematic view of a beverage producing apparatus according to an embodiment of the present invention.
Figure 2:
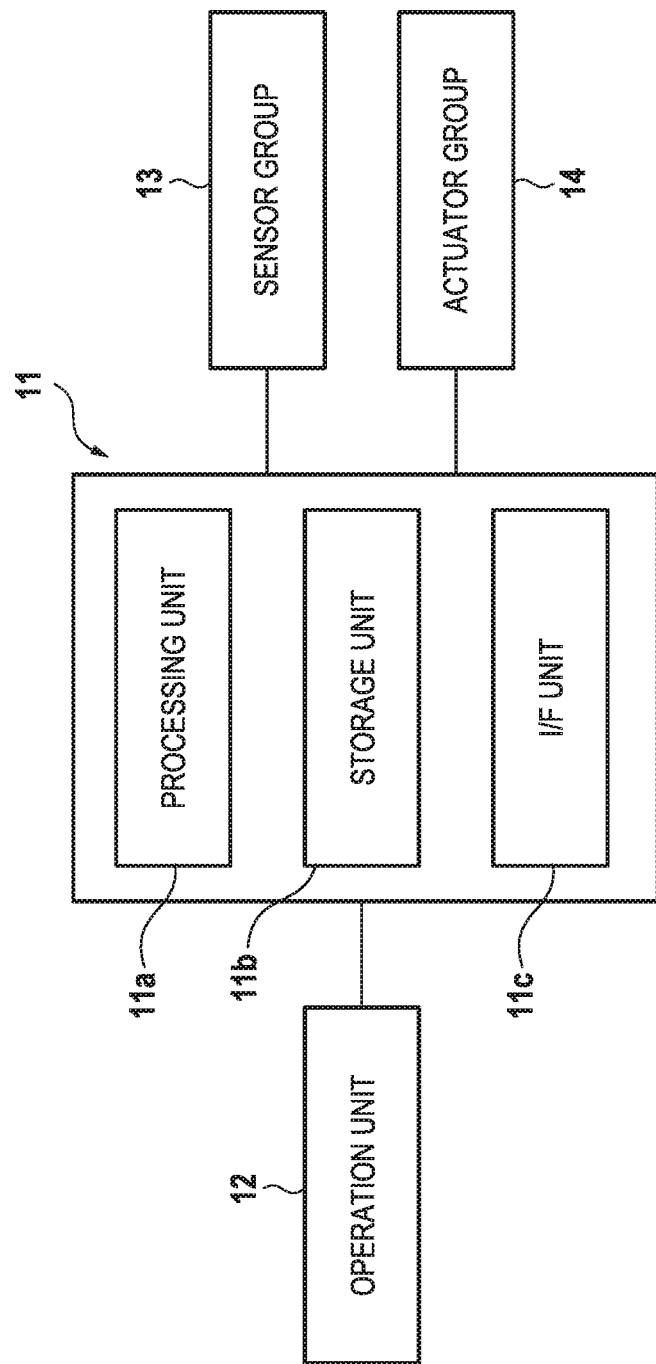
FIG. 2 is a block diagram of the control apparatus of the beverage producing apparatus shown in FIG. 1.

FIG. 1 is a schematic view of a beverage producing apparatus 1, and FIG. 2 is a block diagram of a control apparatus 11 of the beverage producing apparatus 1. The beverage producing apparatus 1 is an apparatus that automatically produces a coffee beverage from roasted coffee beans and a liquid (here, water), and can produce a cup of coffee beverage by one producing operation. The beverage producing apparatus 1 includes a bean processing apparatus 2, an extracting apparatus 3 and the control apparatus 11.

The control apparatus 11 controls the entire beverage producing apparatus 1. The control apparatus 11 includes a processing unit 11a, a storage unit 11b and an I/F (interface) unit 11c. The processing unit 11a is, for example, a processor such as a CPU. The storage unit 11b is, for example, a RAM or a ROM. The I/F unit 11c performs input/output of a signal between an external device and the processing unit 11a.

The processing unit 11a executes a program stored in the storage unit 11b, and controls an actuator group 14 based on an instruction from an operation unit 12 or detection results of a sensor group 13. The operation unit 12 is a unit that receives an instruction input of a user and includes, for example, a touch panel or a mechanical switch. The user can instruct production of a coffee beverage via the operation unit 12. The sensor group 13 includes various kinds of sensors (for example, a temperature sensor for hot water, an operation position detection sensor of a mechanism, a pressure sensor and the like) provided in the beverage producing apparatus 1. The actuator group 14 includes various kinds of actuators (for example, a motor, a solenoid valve, a heater and the like) provided in the beverage producing apparatus 1.

The bean processing apparatus 2 generates ground beans from roasted coffee beans. The extracting apparatus 3 extracts a coffee liquid from the ground beans supplied from the bean processing apparatus 2. The extracting apparatus 3 includes a fluid supply unit 7, a driving unit 8 to be described later, an extraction container 9 and a switching unit 10. The ground beans supplied from the bean processing apparatus 2 are charged into the extraction container 9. The fluid supply unit 7 charges hot water into the extraction container 9. A coffee liquid is extracted from the ground beans in the extraction container 9. The hot water containing the extracted coffee liquid is sent as a coffee beverage to a cup C via the switching unit 10.

<2. Fluid Supply Unit and Switching Unit>

The arrangements of the fluid supply unit 7 and the switching unit 10 will be described with reference to FIG. 1. First, the fluid supply unit 7 will be described. The fluid supply unit 7 performs supply of hot water to the extraction container 9, control of the air pressure in the extraction container 9 and the like. Note that in this specification, when an air pressure is represented by a number, it means an absolute pressure unless otherwise specified, and a gauge pressure is an air pressure based on an atmospheric pressure of 0 atm. The atmospheric pressure indicates an air pressure on the periphery of the extraction container 9 or an air pressure in the beverage producing apparatus. For example, when the beverage producing apparatus is placed at a point at an altitude of 0 m, the atmospheric pressure is the standard atmospheric pressure (1013.25 hPa) at an altitude of 0 m in International Standard Atmosphere [abbreviated as ISA] defined by International Civil Aviation Organization [abbreviated as ICAO] in 1976.

The fluid supply unit 7 includes pipes L1 to L3. The pipe L1 is a pipe to circulate air, and the pipe L2 is a pipe to circulate water. The pipe L3 is a pipe capable of circulating both air and water.

The fluid supply unit 7 includes a compressor 70 as a pressurizing source. The compressor 70 compresses air and sends it. The compressor 70 is driven by, for example, a motor (not shown) serving as a driving source. The compressed air sent from the compressor 70 is supplied to a reserve tank (accumulator) 71 via a check valve 71a. The air pressure in the reserve tank 71 is monitored by a pressure sensor 71b, and the compressor 70 is driven such that the air pressure is maintained at a predetermined air pressure (in this embodiment, 7 atm (6 atm in the gauge pressure)). The reserve tank 71 is provided with a drain 71c for drainage, and water generated by compressing air can be discharged.

Hot water (water) that forms a coffee beverage is stored in a water tank 72. The water tank 72 is provided with a heater 72a that heats the water in the water tank 72 and a temperature sensor 72b that measures the temperature of the water. The heater 72a maintains the temperature of the stored hot water at a predetermined temperature (in this embodiment, 120° C.) based on the detection result of the temperature sensor 72b. The heater 72a is, for example, turned on when the temperature of the hot water is 118° C. and turned off at 120° C.

The water tank 72 is also provided with a water level sensor 72c. The water level sensor 72c detects the water level of the hot water in the water tank 72. If the water level sensor 72c detects that the water level has fallen below a predetermined water level, water is supplied to the water tank 72. In this embodiment, tap water is supplied via a water purifier (not shown). A solenoid valve 72d is provided halfway through the pipe L2 from the water purifier. When the water level sensor 72c detects lowering of the water level, the solenoid valve 72d is opened to supply water. When the water level reaches a predetermined water level, the solenoid valve 72d is closed to cut off the water supply. The hot water in the water tank 72 is thus maintained at a predetermined water level. Note that the water supply to the water tank 72 may be done every time the hot water used for one production of a coffee beverage is discharged.

The water tank 72 is also provided with a pressure sensor 72g. The pressure sensor 72g detects the air pressure in the water tank 72. The air pressure in the reserve tank 71 is supplied to the water tank 72 via a relief valve 72e and a solenoid valve 72f. The relief valve 72e reduces the air pressure supplied from the reserve tank 71 to a predetermined air pressure. In this embodiment, the air pressure is reduced to 3 atm (2 atm in the gauge pressure). The solenoid valve 72f performs switching between supply of the air pressure controlled by the relief valve 72e to the water tank 72 and cut-off of the supply. Opening/closing of the solenoid valve 72f is controlled such that the air pressure in the water tank 72 is maintained at 3 atm except when supplying tap water to the water tank 72. When supplying tap water to the water tank 72, the air pressure in the water tank 72 is reduced by a solenoid valve 72h to a pressure (for example, less than 2.5 atm) lower than the water pressure of the tap water such that the tap water is smoothly supplied to the water tank 72 by the water pressure of the tap water. The solenoid valve 72h switches whether to release the interior of the water tank 72 to the atmosphere or not. At the time of pressure reduction, the interior of the water tank 72 is released to the atmosphere. In addition, except when supplying tap water to the water tank 72, when the air pressure in the water tank 72 exceeds 3 atm, the solenoid valve 72h releases the interior of the water tank 72 to the atmosphere, thereby maintaining the pressure in the water tank 72 at 3 atm.

The hot water in the water tank 72 is supplied to the extraction container 9 via a check valve 72j, a solenoid valve 72i and the pipe L3. When the solenoid valve 72i is opened, the hot water is supplied to the extraction container 9. When the solenoid valve 72i is closed, the supply of the hot water is cut off. The supply amount of the hot water to the extraction container 9 can be managed by the opening time of the solenoid valve 72i. However, the supply amount may be measured, and the opening/closing of the solenoid valve 72i may be controlled. The pipe L3 is provided with a temperature sensor 73e that measures the temperature of the hot water, and the temperature of the hot water supplied to the extraction container 9 is monitored.

The air pressure in the reserve tank 71 also is supplied to the extraction container 9 via a relief valve 73a and a solenoid valve 73b. The relief valve 73a reduces the air pressure supplied from the reserve tank 71 to a predetermined air pressure. In this embodiment, the air pressure is reduced to 5 atm (4 atm in the gauge pressure). The solenoid valve 73b performs switching between supply of the air pressure controlled by the relief valve 73a to the extraction container 9 and cut-off of the supply. The air pressure in the extraction container 9 is detected by a pressure sensor 73d. When raising the air pressure in the extraction container 9, the solenoid valve 73b is opened based on the detection result of the pressure sensor 73d, and the pressure in the extraction container 9 is raised to a predetermined air pressure (in this embodiment, 5 atm at maximum (4 atm in the gauge pressure)). The air pressure in the extraction container 9 can be reduced by a solenoid valve 73c. The solenoid valve 73c switches whether to release the interior of the extraction container 9 to the atmosphere or not. At the time of a pressure anomaly (for example, when the air pressure in the extraction container 9 exceeds 5 atm), the interior of the extraction container 9 is released to the atmosphere.

In this embodiment, when one production of a coffee beverage ends, the interior of the extraction container 9 is washed with tap water. A solenoid valve 73f is opened at the time of washing and supplies tap water to the extraction container 9.

The switching unit 10 will be described next. The switching unit 10 is a unit that switches the sending destination of a liquid sent from the extraction container 9 to one of a pouring portion 10c and a waste tank T. The switching unit 10 includes a selector valve 10a and a motor 10b that drives the selector valve 10a. When sending the coffee beverage in the extraction container 9, the selector valve 10a switches the channel to the pouring portion 10c. The coffee beverage is poured from the pouring portion 10c to the cup C. When discharging a waste fluid (tap water) and a residue (ground beans) in washing, the channel is switched to the waste tank T. In this embodiment, the selector valve 10a is a 3-port ball valve. Since the residue passes through the selector valve 10a at the time of washing, the selector valve 10a is preferably a ball valve. The motor 10b rotates its rotating shaft, thereby switching the channel.

<3. Bean Processing Apparatus>

Figure 3:
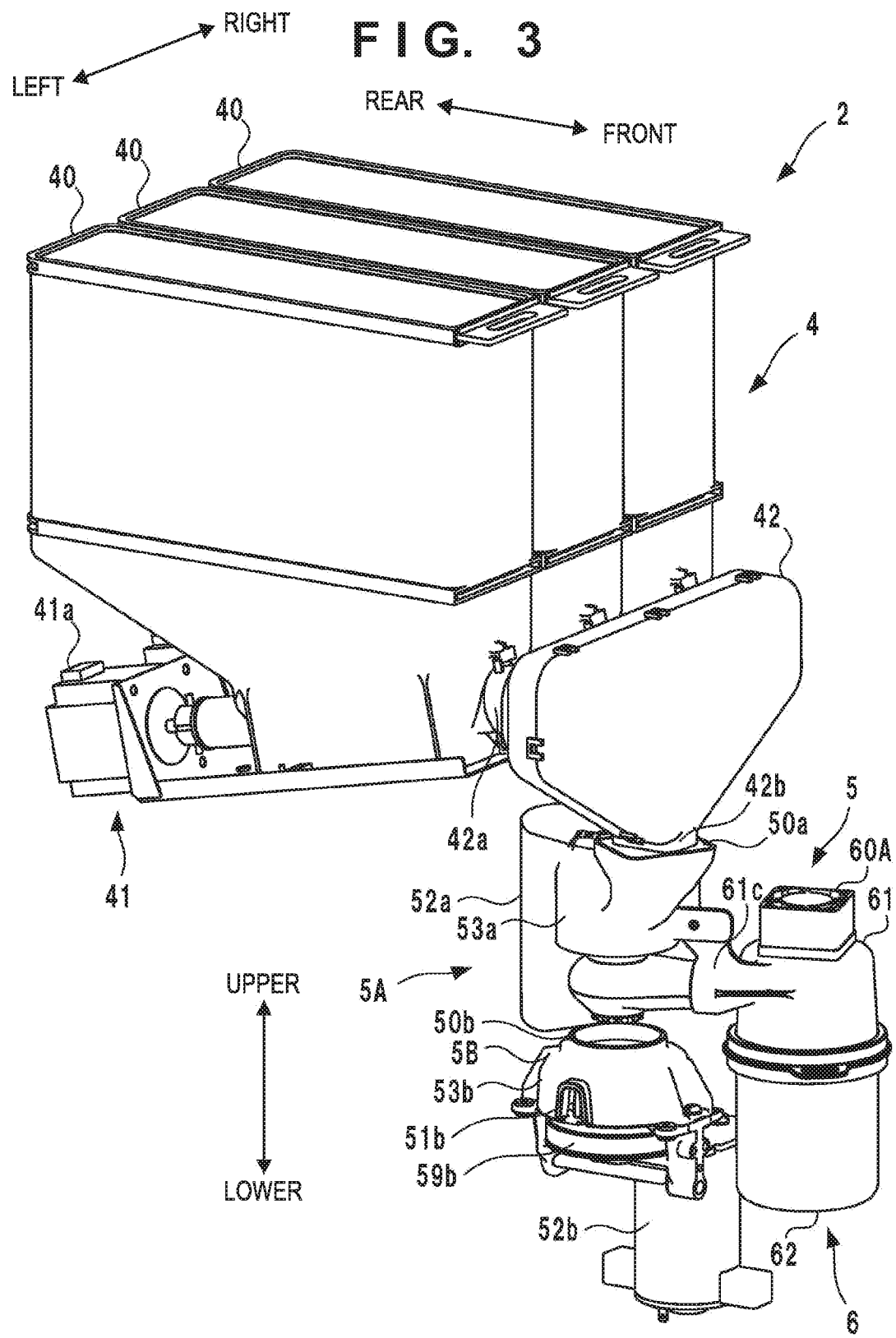
FIG. 3 is a perspective view of a bean processing apparatus.

The bean processing apparatus 2 will be described with reference to FIG. 3. FIG. 3 is a perspective view of the bean processing apparatus 2. The bean processing apparatus 2 includes a storage apparatus 4 and a grinding apparatus 5.

<3-1. Storage Apparatus>

The storage apparatus 4 includes a plurality of canisters 40 in which coffee beans after roasting are stored. In this embodiment, three canisters 40 are provided. When discriminating the three canisters 40, they will be referred to as canisters 40A, 40B and 40C. The canisters 40A to 40C may store roasted coffee beans of types different from each other and the type of roasted coffee beans to be used to produce a coffee beverage may be selected by an operation input to the operation unit 12. The roasted coffee beans of different types are, for example, roasted coffee beans of different varieties of coffee beans. Alternatively, the roasted coffee beans of different types may be roasted coffee beans of the same variety of coffee beans but different roasting degrees. Otherwise, the roasted coffee beans of different types may be roasted coffee beans of different varieties and different roasting degrees. At least one of the three canisters 40 may store roasted coffee beans in which roasted coffee beans of a plurality of varieties are mixed. In this case, the degrees of roasting may almost equal in the roasted coffee beans of the varieties.

Note that in this embodiment the plurality of canisters 40 are provided. However, only one canister 40 may be provided. In addition, when the plurality of canisters 40 are provided, roasted coffee beans of the same type may be stored in all or a plurality of canisters 40.

A conveyor 41 is individually provided for each canister 40. The conveyor 41 is a sending mechanism (conveyance mechanism) that automatically sends a predetermined amount of roasted coffee beans stored in the canister 40 to the downstream side. The conveyor 41 according to this embodiment is a screw conveyor using a motor 41a as a driving source, and serves as a measuring unit that automatically measures the roasted coffee beans. The sending amount of the roasted coffee beans can be controlled by the rotation amount of the motor 41a (the rotation amount of the screw). Each conveyor 41 discharges the roasted coffee beans to a collective conveyance path 42 on the downstream side. The collective conveyance path 42 is formed from a hollow member, and includes an inlet 42a for each conveyor 41 and a common outlet 42b. The roasted coffee beans are supplied from the common outlet 42b to the grinding apparatus 5.

<3-2. Grinding Apparatus>

Figure 4:
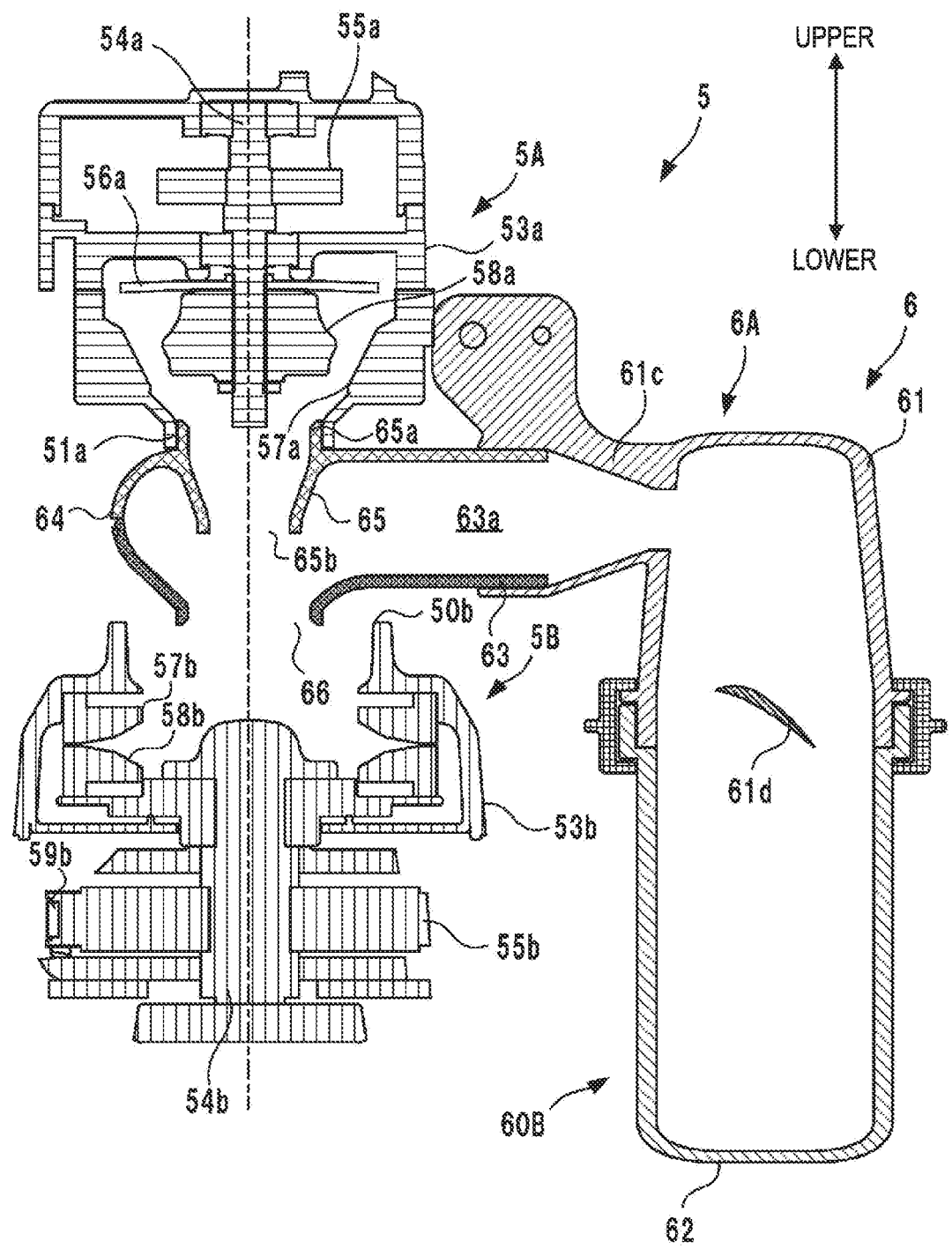
FIG. 4 is a longitudinal sectional view of a grinding apparatus.

The grinding apparatus 5 will be described with reference to FIGS. 3 and 4. FIG. 4 is a longitudinal sectional view of the grinding apparatus 5. The grinding apparatus 5 includes grinders 5A and 5B and a separation apparatus 6. The grinders 5A and 5B are mechanisms that grind the roasted coffee beans supplied from the storage apparatus 4. The grinders 5A and 5B grind the beans to different particle sizes. The grinder 5A is a grinder for coarse grinding, and the grinder 5B is a grinder for fine grinding.

<3-2-1. Grinder>

The grinder 5A includes a motor 52a and a main body portion 53a. The motor 52a is the driving source of the grinder 5A. The main body portion 53a is a unit that stores a cutter, and incorporates a rotating shaft 54a. The rotating shaft 54a is provided with a gear 55a, and the driving force of the motor 52a is transmitted to the rotating shaft 54a via the gear 55a.

The rotating shaft 54a is also provided with a rotary blade 58a that is a cutter. A stationary blade 57a that is a cutter is also provided on the periphery of the rotary blade 58a. The interior of the main body portion 53a communicates with an inlet 50a and an outlet 51a. The roasted coffee beans supplied from the collective conveyance path 42 enter from the inlet 50a formed in a side portion of the main body portion 53a into the main body portion 53a in the horizontal direction and are ground while being sandwiched between the rotary blade 58a and the stationary blade 57a. A suppression plate 56a is provided on the upper side of the rotary blade 58a of the rotating shaft 54a. The suppression plate 56a suppresses escape of the roasted coffee beans to the upper side. The grinder 5A grinds the roasted coffee beans to, for example, about ¼. The ground beans are discharged from the outlet 51a to the separation apparatus 6.

Note that the roasted coffee beans supplied to the inlet 50a may be supplied not from above the rotary blade 58a but to a height to hit the side surface. In this case, since escape of the roasted coffee beans to the upper side is suppressed by the rotary blade 58a, the suppression plate 56a need not be provided.

The grinder 5A may change the rotation speed of the rotary blade 58a, thereby changing the size of the roasted coffee beans discharged after grinding. In addition, the distance between the rotary blade 58a and the stationary blade 57a may be changed by manual adjustment.

The separation apparatus 6 is a mechanism that separates an unwanted substance from the ground beans. The separation apparatus 6 is arranged between the grinder 5A and the grinder 5B. That is, in this embodiment, the roasted coffee beans supplied from the storage apparatus 4 are coarsely ground by the grinder 5A first, and an unwanted substance is separated from the coarse-ground beans by the separation apparatus 6. The coarse-ground beans from which the unwanted substance is separated are finely ground by the grinder 5B. The unwanted substance separated by the separation apparatus 6 is representatively chaff or a fine powder. This may spoil the taste of a coffee beverage. The separation apparatus 6 is a mechanism that separates the unwanted substance by the suction force of air, and details will be described later.

The grinder 5B includes a motor 52b and a main body portion 53b. The motor 52b is the driving source of the grinder 5B. The main body portion 53b is a unit that stores a cutter, and incorporates a rotating shaft 54b. The rotating shaft 54b is provided with a pulley 55b, and the driving force of the motor 52b is transmitted to the rotating shaft 54b via a belt 59b and the pulley 55b.

The rotating shaft 54b is also provided with a rotary blade 58b. A stationary blade 57b is also provided on the upper side of the rotary blade 58b. The interior of the main body portion 53b communicates with an inlet 50b and an outlet 51b. The ground beans falling from the separation apparatus 6 enter from the inlet 50b into the main body portion 53b and are further ground while being sandwiched between the rotary blade 58b and the stationary blade 57b. The ground beans ground to a powder are discharged from the outlet 51b. Note that the particle size of the ground beans in the grinder 5B can be adjusted by adjusting the gap between the rotary blade 58b and the stationary blade 57b.

Grinding of the roasted coffee beans may be one grinder (grinding of one step). However, when grinding is performed in two steps by the two grinders 5A and 5B as in this embodiment, the particle sizes of the ground beans can readily become even, and the degree of extraction of a coffee liquid can be made constant. When grinding beans, heat is generated in some cases due to friction between the cutter and the beans. When grinding is performed in two steps, it is possible to suppress heat generation caused by friction at the time of grinding and prevent degradation of ground beans (for example, loss of flavor).

In addition, since the steps of coarse grinding→separation of unwanted substance→fine grinding are performed, the mass difference between the unwanted substance and the ground beans (necessary portion) can be made large when separating the unwanted substance such as chaff. This makes it possible to raise the separation efficiency of the unwanted substance and also prevent the ground beans (necessary portion) from being separate as the unwanted substance. In addition, when unwanted substance separation processing using suction of air intervenes between coarse grinding and fine grinding, heat generation of the ground beans can be suppressed by air cooling. This can prevent degradation of ground beans (for example, loss of flavor).

<3-2-2. Separation Apparatus>

Figure 5:
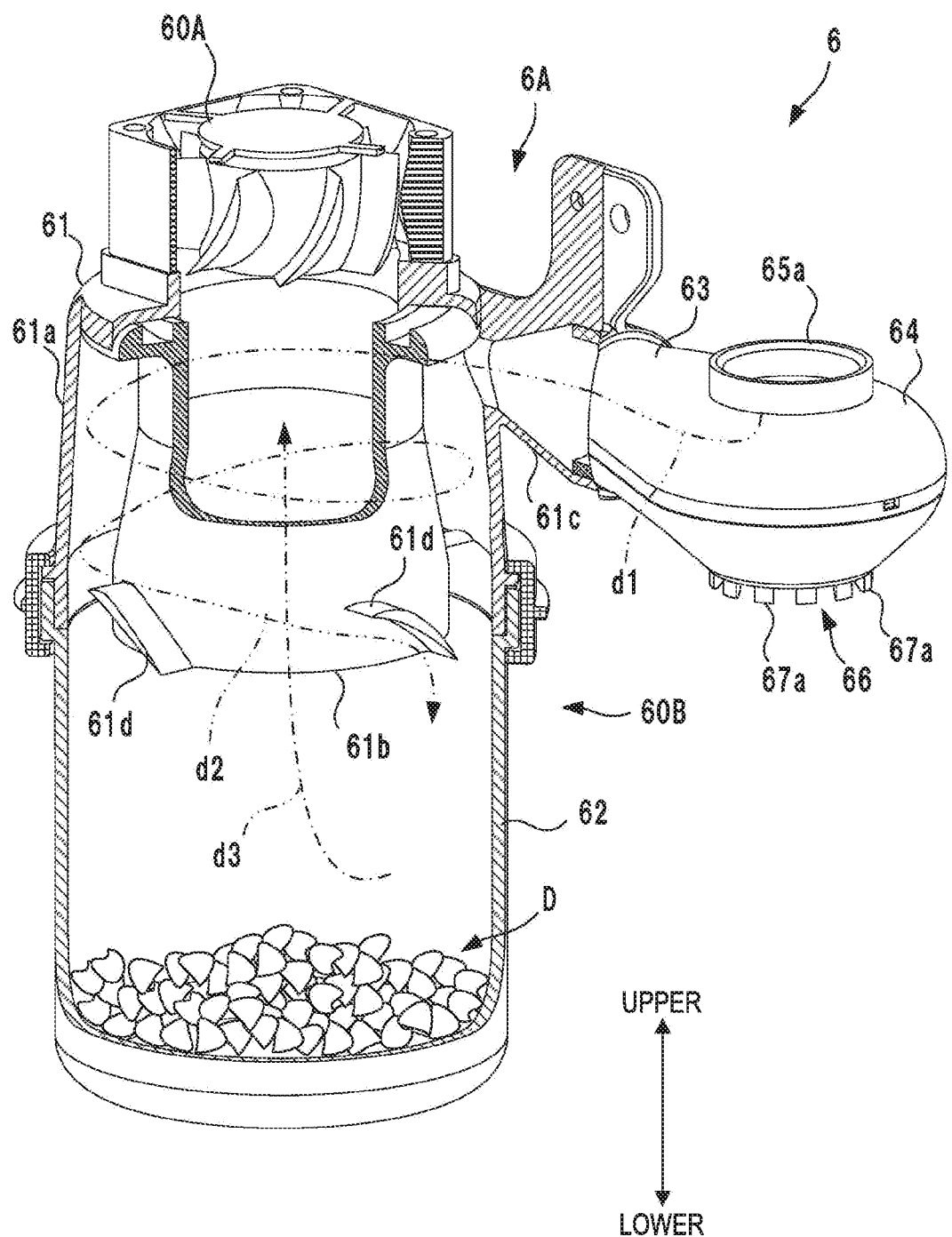
FIG. 5 is a partially cutaway perspective view of a separation apparatus.

The separation apparatus 6 will be described next with reference to FIGS. 3 to 5. FIG. 5 is a partially cutaway perspective view of the separation apparatus 6. The separation apparatus 6 includes a suction unit 6A and a forming unit 6B. The forming unit 6B is a hollow body that forms a separation chamber SC which the ground beans making a free fall from the grinder 5A pass through. The suction unit 6A is a unit that communicates with the separation chamber SC in a direction (in this embodiment, the horizontal direction) crossing the passing direction (in this embodiment, the vertical direction) of the ground beans and sucks air in the separation chamber SC. When the air in the separation chamber SC is sucked, a lightweight object such as chaff or a fine powder is sucked. The unwanted substance can thus be separated from the ground beans.

The suction unit 6A is a centrifugal mechanism. The suction unit 6A includes a blower unit 60A and a collection container 60B. In this embodiment, the blower unit 60A is a fan motor, and expels air in the collection container 60B upward.

The collection container 60B includes an upper portion 61 and a lower portion 62, which separably engage with each other. The lower portion 62 has a tubular shape with an open top and a closed bottom, and forms a space to store an unwanted substance. The upper portion 61 forms a lid portion attached to the opening of the lower portion 62. The upper portion 61 includes a cylindrical outer peripheral wall 61a and an exhaust stack 61b formed to be coaxial with the outer peripheral wall 61a. The blower unit 60A is fixed to the upper portion 61 on the upper side of the exhaust stack 61b so as to suck air in the exhaust stack 61b. The upper portion 61 also includes a tubular connecting portion 61c extended in the radial direction. The connecting portion 61c is connected to the forming unit 6B and makes the separation chamber SC and the collection container 60B communicate. The connecting portion 61c opens to a lateral side of the exhaust stack 61b.

When the blower unit 60A is driven, an airflow indicated by arrows d1 to d3 in FIG. 5 is generated. By this airflow, air containing an unwanted substance is sucked from the separation chamber SC into the collection container 60B through the connecting portion 61c. Since the connecting portion 61c opens to a lateral side of the exhaust stack 61b, the air containing the unwanted substance turns around the exhaust stack 61b. An unwanted substance D in the air falls by the weight of its own and is collected to a portion of the collection container 60B (accumulates on the bottom surface of the lower portion 62). The air passes through the exhaust stack 61b and is expelled to above.

A plurality of fins 61d are integrally formed on the peripheral surface of the exhaust stack 61b. The plurality of fins 61d are arrayed in the circumferential direction of the exhaust stack 61b. Each fin 61d obliquely tilts with respect to the axial direction of the exhaust stack 61b. By providing the fins 61, turn of the air containing the unwanted substance D around the exhaust stack 61b is promoted. In addition, separation of the unwanted substance D is promoted by the fins 61. As a result, the length of the suction unit 6A in the vertical direction can be suppressed, contributing to downsizing of the apparatus.

Additionally, in this embodiment, the forming unit 6B is arranged in the falling path of the ground beans by the grinders 5A and 5B, whereas the centrifugal suction unit 6A is arranged on a lateral side of the falling path. A centrifugal mechanism readily becomes long in the vertical direction. However, when the suction unit 6A is moved from the falling path and arranged on the lateral side, the suction unit 6A can be lined up in the horizontal direction with respect to the grinders 5A and 5B. This contributes to suppressing of the length of the apparatus in the vertical direction. In particular, when grinding is performed in two steps by the two grinders 5A and 5B, as in this embodiment, the length of the apparatus in the vertical direction tends to increase. For this reason, such an arrangement of the suction unit 6A is effective for downsizing of the apparatus.

Figure 6:
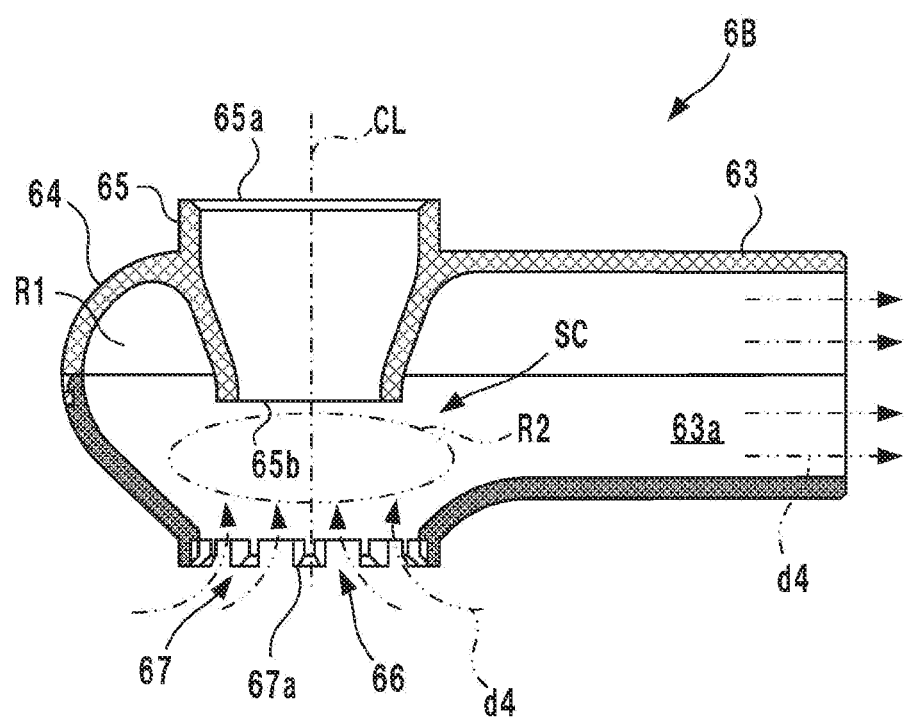
FIG. 6 is a longitudinal sectional view of a forming unit.
Figure 7:
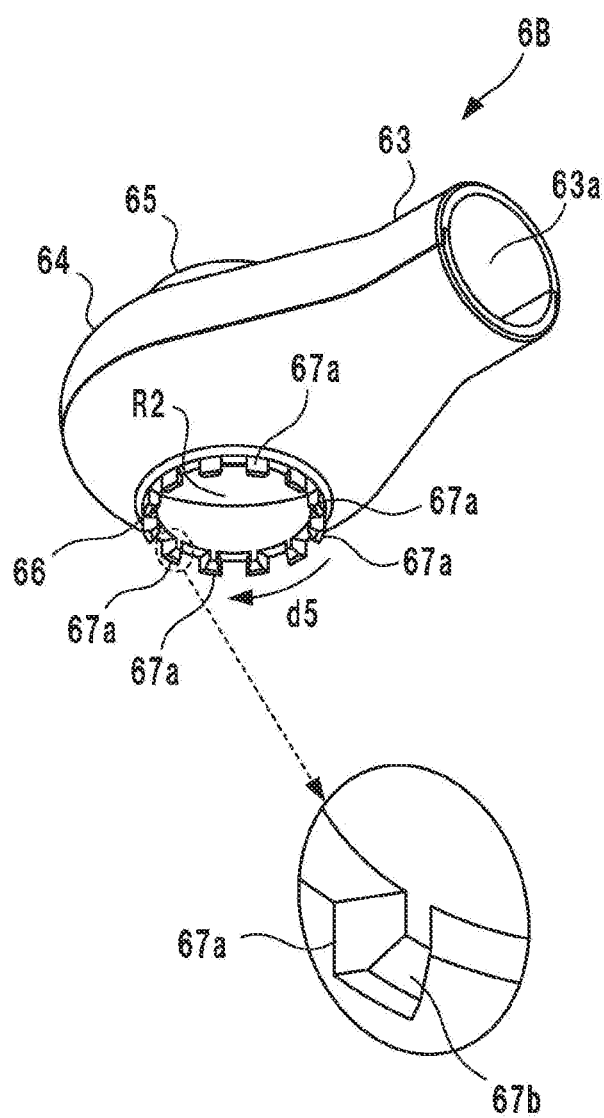
FIG. 7 shows a perspective view and a partially enlarged view of the forming unit shown in FIG. 6.
Figure 8:
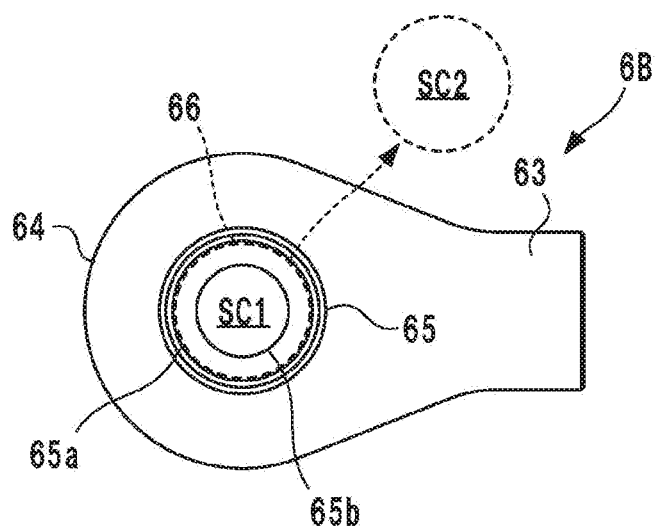
FIG. 8 is an explanatory view of comparison of sectional areas.

The forming unit 6B will be described with reference to FIGS. 3 to 9. FIG. 6 is a longitudinal sectional view of the forming unit 6B. FIG. 7 shows a perspective view and a partially enlarged view of the forming unit 6B. FIG. 8 is a plan view of the forming unit 6B, which is an explanatory view of comparison of sectional areas.

In this embodiment, the forming unit 6B is formed by connecting two members divided into halves in the vertical direction. The forming unit 6B includes a pipe portion 63 and a separation chamber forming portion 64 and has a spoon shape in a plan view. The pipe portion 63 is a tubular body that forms a communicating path 63a to the suction unit 6A, and is extended in the horizontal direction (a direction crossing a center line CL to be described later). The separation chamber forming portion 64 is an annular hollow body opening at the center in the vertical direction, which is connected to the pipe portion 63 and forms the separation chamber SC.

In this embodiment, when separating the unwanted substance from the ground beans, a method of applying a wind pressure in the horizontal direction to the ground beans falling from the grinder 5A and sucking the unwanted substance is employed. This is advantageous because the length in the vertical direction can be decreased as compared to the centrifugal method.

The separation chamber forming portion 64 includes a tubular portion 65 extended in the vertical direction. A portion from the center portion to the lower portion of the tubular portion 65 in the vertical direction projects into the separation chamber SC. The tubular portion 65 includes an opening portion 65a at one end. The opening portion 65a forms the inlet for ground beans, which communicates with the separation chamber SC. The opening portion 65a is located outside the separation chamber SC and connected to the outlet 51a of the grinder 5A. Accordingly, the ground beans falling from the outlet 51a are introduced into the separation chamber forming portion 64 without leaking. The tubular portion 65 includes an opening portion 65b at the other end on the lower side. The opening portion 65b is located in the separation chamber SC. Since the opening portion 65b faces the separation chamber SC, the ground beans falling from the outlet 51a are introduced into the separation chamber SC without leaking.

In this embodiment, the tubular portion 65 has a cylindrical shape, and the opening portions 65a and 65b have concentric circular shapes located on the center line CL. The ground beans falling from the outlet 51a thus readily pass through the tubular portion 65. The tubular portion 65 has a tapered shape in which the sectional area of the internal space gradually becomes small from the side of the opening portion 65a to the side of the opening portion 65b. Since the inner wall of the tubular portion 65 forms a mortar shape, the falling ground beans readily collide against the inner wall. The ground beans falling from the grinder 5A sometimes fall as a lump with particles adhered to each other. If the ground beans are in a lump state, the separation efficiency of the unwanted substance may lower. In this embodiment, when the ground beans forming a lump collide against the inner wall of the tubular portion 65, the lump breaks, and the unwanted substance is easily separated.

Note that the inner wall of the tubular portion 65 need not always have the mortar shape to break the lump of ground beans. If the tubular portion 65 has, in its middle portion, a portion where the sectional area of the internal space is smaller than in the opening portion 65a, and an inner wall tilting (not level) with respect to the center line CL thus exists, it is possible to make the ground beans smoothly fall while promoting collision with the lump. In addition, the tubular portion 65 need not project into the separation chamber SC, and may have only a portion projecting upward from the outer surface of the separation chamber forming portion 64. However, when the tubular portion 65 projects into the separation chamber SC, the wind velocity around the tubular portion 65 can be improved. For this reason, the unwanted substance separation effect by the wind pressure can be enhanced in a region R1 relatively far from the pipe portion 63.

The separation chamber forming portion 64 includes an outlet 66 communicating with the separation chamber SC, to which the ground beans after separation of the unwanted substance are discharged. In this embodiment, the outlet 66 is located under the opening portion 65b. The ground beans that have passed through the tubular portion 65 pass through the separation chamber SC and freely fall from the outlet 66. In this embodiment, the outlet 66 is a circular opening located on the center line CL, which is an opening concentric to the opening portions 65a and 65b. For this reason, the ground beans readily pass through the separation chamber forming portion 64 by free fall, and the ground beans can be prevented from accumulating in the separation chamber forming portion 64.

As shown in FIG. 8, in this embodiment, a sectional area SC2 of the outlet 66 is larger than a sectional area SC1 of the opening portion 65b. In this embodiment, the opening portion 65b and the outlet 66 overlap each other when viewed in the vertical direction. Hence, when the opening portion 65b is projected in vertical direction to the outlet 66, the opening portion 65b is fitted inside the outlet 66. In other words, the opening portion 65b is within a region formed by extending the outlet 66 in the vertical direction. An arrangement in which the opening portion 65b and the outlet 66 are not located on the same center line but overlap or an arrangement in which at least one of the opening portion 65b and the outlet 66 is not circular, but they overlap can also be employed.

The ratio of the sectional area SC1 to the sectional area SC2 is, for example, 95% or less or 85% or less and, for example, 60% or more or 70% or more. Since the opening portion 65b and the outlet 66 are concentric circles, they overlap each other when viewed in the direction of the center line CL. For this reason, the ground beans freely falling from the opening portion 65b are readily discharged from the outlet 66. It is also possible to prevent the falling ground beans from colliding against the edge of the outlet 66 and bouncing to the side of the pipe portion 63 and also suppress suction of necessary ground beans into the suction unit 6A. The opening area of the one-end opening portion (for example, 65a) is smaller than the opening area of the outlet (for example, 66), as exemplified above. However, the opening area of the outlet (for example, 66) and the opening area of the one-end opening portion (for example, 65a) may equal, or the opening area of the one-end opening portion (for example, 65a) may be larger than the opening area of the outlet (for example, 66). The opening area of the other-end opening portion (for example, 65b) is smaller than the opening area of the outlet (for example, 66), as exemplified above. However, the opening area of the outlet (for example, 66) and the opening area of the other-end opening portion (for example, 65b) may equal, or the opening area of the other-end opening portion (for example, 65b) may be larger than the opening area of the outlet (for example, 66). The suction unit (for example, 6A) sucks air from the outlet 66 and the inlet (for example, 65a, 65a'), as exemplified above. However, the amount of air sucked from the outlet 66 may be made larger than the amount of air sucked from the inlet (for example, 65a, 65a'). This may be implemented by making the other-end opening portion (for example, 65b) project into the separation chamber, by making the size of the sectional area of the outlet 66 larger than the size of the opening area of the one-end opening portion (for example, 65a), by making the size of the sectional area of the outlet 66 larger than the size of the opening area of the other-end opening portion (for example, 65b), by making the distance from the outlet 66 to the separation chamber shorter than the distance from the one-end opening portion (for example, 65a) to the separation chamber, by making the distance from the outlet 66 to the exhaust stack 61b shorter than the distance from the one-end opening portion (for example, 65a) to the exhaust stack 61b, or by making the distance from the outlet 66 to the blower unit 60A shorter than the distance from the one-end opening portion (for example, 65a) to the blower unit 60A. One of the inner wall portions of the members (63 to 65) that form the forming unit 6B and the separation chamber SC, the tubular portion 65, or the other-end opening portion (for example, 65b) may be configured to come into contact with the grinder (at least one of the grinders 5A and 5B) directly or indirectly via another member and vibrate by receiving a vibration transmitted from the grinder that rotates. For example, in the case of the beverage producing apparatus 1 according to this embodiment, since these members are in direct or indirect contact, during the grinder operation one of the inner wall portions of the members (63 to 65) that form the forming unit 6B and the separation chamber SC, the tubular portion 65, or the other-end opening portion (for example, 65b) vibrates, a brake is applied by turbulent air generated by the vibration in the separation chamber SC to a lightweight unwanted substance that enters from the other-end opening portion (for example, 65b) into the separation chamber SC, and the unwanted substance is readily sucked by the suction unit (for example, 6A). In particular, as in the beverage producing apparatus 1 according to the embodiment, the forming unit 6B is in direct contact with the grinder 5A of the grinders 5A and 5B. An appropriate vibration may be applied to the forming unit 6B by bringing it into direct contact with one grinder in this way, thereby readily sucking a lightweight unwanted substance.

In this embodiment, the air sucked by the suction unit 6A is mainly sucked from the outlet 66. For this reason, a gap is provided between the outlet 66 and the inlet 50b of the grinder 5B, and suction of air is promoted. An arrow d4 schematically represents the direction of the flow of air sucked by the suction unit 6A. When air is sucked from the outlet 66, the unwanted substance is hardly discharged from the outlet 66, the separation performance between the ground beans and the unwanted substance can be improved.

Note that the air sucked by the suction unit 6A is sucked from the opening portion 65a as well.

A turbulence promoting portion 67 is formed on the peripheral wall that defines the outlet 66. The turbulence promoting portion 67 generates turbulence in the air sucked from the outlet 66 into the separation chamber SC. When the turbulence promoting portion 67 is formed, turbulence readily occurs especially in a region R2 between the opening portion 65b and the outlet 66. Additionally, in this embodiment, since the wind velocity improves on the periphery of the tubular portion 65, generation of turbulence in the region R2 can synergistically be promoted.

The ground beans charged into the inlet 65a are stirred by the influence of the turbulence when passing through the region R2. In this embodiment, particularly, since the sectional area SC2 of the outlet 66 is larger than the sectional area SC1 of the opening portion 65b as described above, the ground beans always pass through the region R2. By the turbulence, an unwanted substance such as chaff or a fine powder is readily separated from the ground beans. Hence, even if the separation chamber SC is a small space, the unwanted substance separation efficiency can be improved. In particular, this contributes to reduction of the length of the separation chamber SC in the vertical direction and is advantageous for downsizing of the apparatus in which grinding is performed in two steps by the two grinders 5A and 5B, as in this embodiment.

In this embodiment, the turbulence promoting portion 67 includes a plurality of turbulence promoting elements 67a. The turbulence promoting elements 67a are projections projecting downward in the vertical direction. The projecting direction of the turbulence promoting elements 67a can be any direction. However, the direction is preferably a direction within the range from the downward direction to inward in the radial direction because the turbulence can more easily be generated in the separation chamber SC. More preferably, since the projecting direction is the downward direction, as in this embodiment, the ground beans that have fallen are never caught.

As for the sectional shape of the turbulence promoting element 67a, a trapezoidal prism is arranged such that the upper base of the section is directed in the direction of the center line CL, and chamfering 67b is applied to the inside at the distal end. The shape of the turbulence promoting element 67a is not limited to the shape according to this embodiment. A shape that three-dimensionally complicates the shape of the outlet 66 is preferable.

In this embodiment, the turbulence promoting elements 67a are repetitively formed in a peripheral direction d5 of the outlet 66. Accordingly, air blows from multiple directions into a region R, and generation of turbulence is promoted. The pitches of the adjacent turbulence promoting elements 67a may be different pitches. In this embodiment, however, equal pitches are used. Twelve turbulence promoting elements 67a are formed. However, the number of turbulence promoting elements 67a is arbitrary.

<3-2-3. Other Examples of Arrangement>

Figure 9:
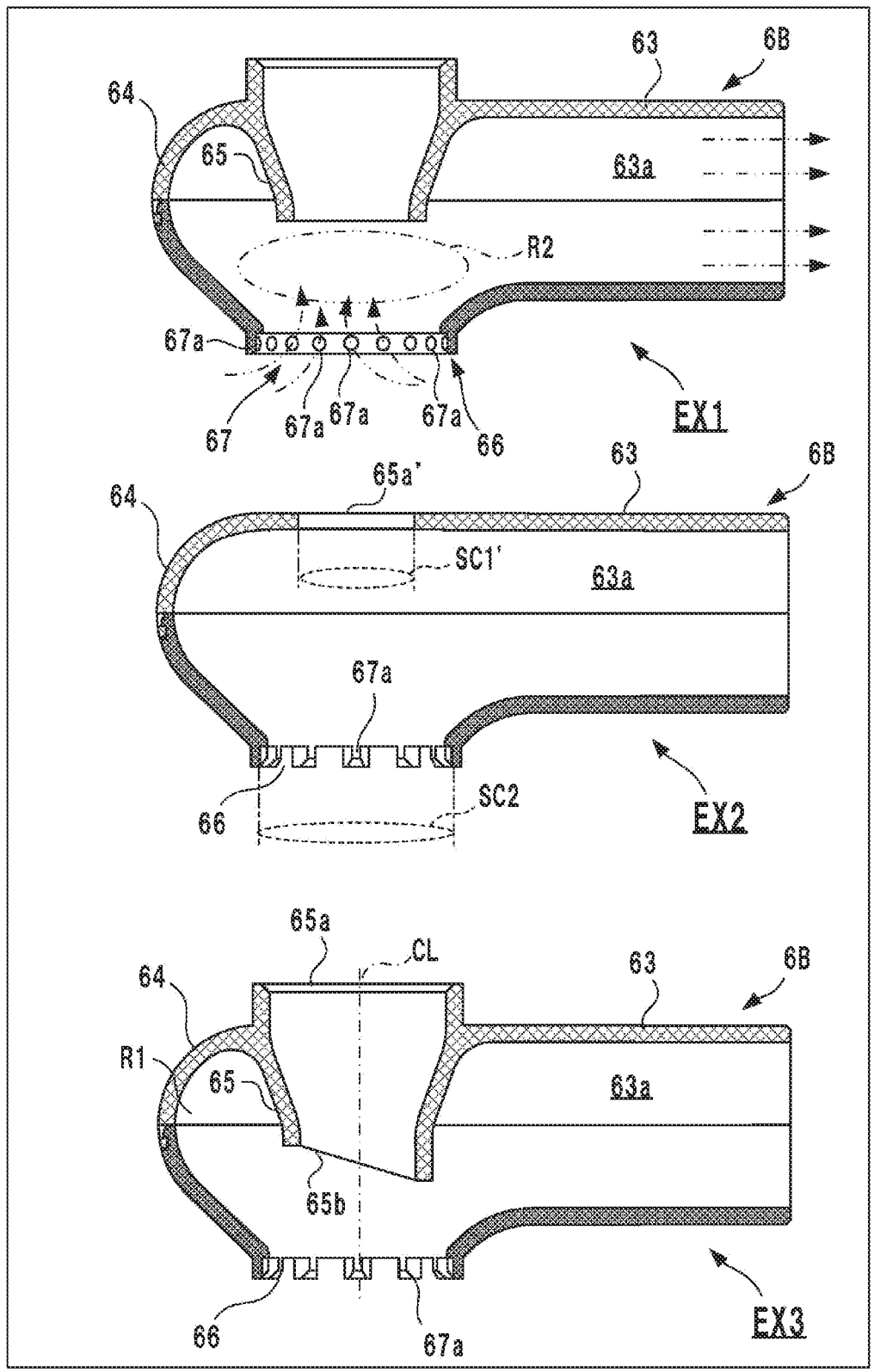
FIG. 9 is an explanatory view of other examples.

Other examples of the arrangement of the separation chamber forming portion 64 will be described with reference to FIG. 9. The turbulence promoting element 67a may be not a projection but a notch or a hole. An example EX1 shown in FIG. 9 shows an example in which the turbulence promoting element 67a is a through hole formed in the peripheral wall of the outlet 66. Such a hole can also promote generation of turbulence in the region R2.

An example EX2 shown in FIG. 9 shows an example in which the tubular portion 65 is not provided. Even in this case, an arrangement that makes the sectional area SC2 of the outlet 66 larger than a sectional area SC1' of an inlet 65a' is preferable.

The opening portion 65b of the tubular portion 65 may be not an opening on a horizontal level but an opening on a tilting plane. In an example EX3 shown in FIG. 9, the lower end of the tubular portion 65 on the side of the pipe portion 63 projects downward as compared to the lower end on the opposite side. With this arrangement, the ground beans are readily guided to the side of the region R1, stay time of the ground beans in the separation chamber SC can be prolonged, and the separation effect can be enhanced <4. Driving Unit and Extraction Container>

<4-1. Outline>

Figure 10:
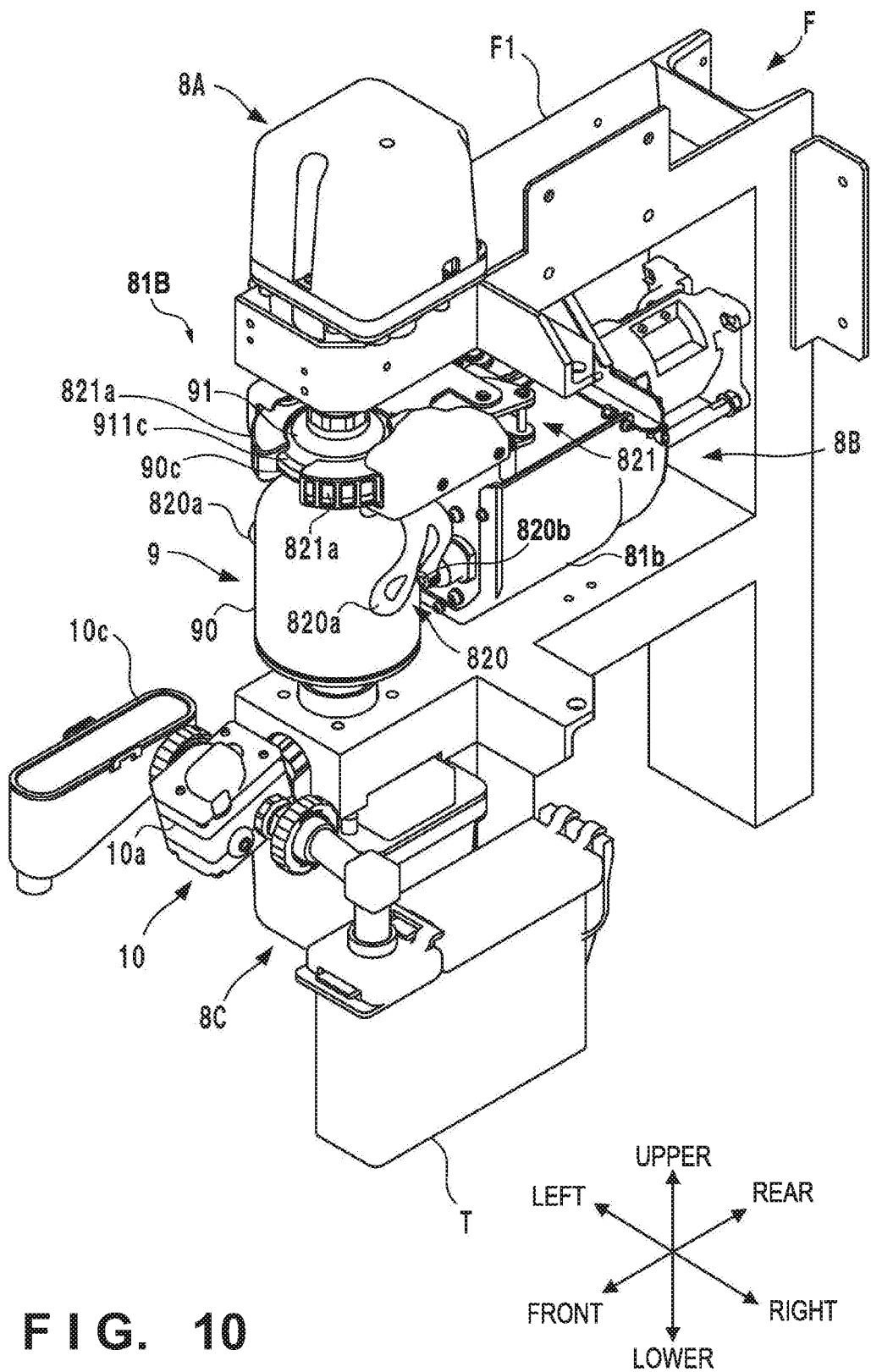
FIG. 10 is a perspective view of a driving unit and an extraction container.

The driving unit 8 and the extraction container 9 of the extracting apparatus 3 will be described with reference to FIG. 10. FIG. 10 is a perspective view of the driving unit 8 and the extraction container 9.

The driving unit 8 is supported by a frame F. The frame F includes upper and lower beam portions F1 and F2 and a column portion F3 that supports the beam portions F1 and F2. The driving unit 8 is roughly divided into three units, that is, an upper unit 8A, a middle unit 8B and a lower unit 8C. The upper unit 8A is supported by the beam portion F1. The middle unit 8B is supported by the beam portion F1 between the beam portion F1 and the beam portion F2. The lower unit 8C is supported by the beam portion F2.

The extraction container 9 is a chamber including a container main body 90 and a lid unit 91. The extraction container 9 will sometimes be referred to as a chamber. The middle unit 8B includes an arm member 820 that detachably holds the container main body 90. The arm member 820 includes a holding member 820a and a pair of shaft members 820b spaced apart to the left and right sides. The holding member 820a is an elastic member made of a resin or the like and formed into a C-shaped clip shape. The holding member 820a holds the container main body 90 by the elastic force. The holding member 82a holds the left and right side portions of the container main body 90 and exposes the front side of the container main body 90. The inside of the container main body 90 can thus be readily visible in a front view.

Attachment/detachment of the container main body 90 to/from the holding member 820a is done by a manual operation. When the container main body 90 is pressed against the holding member 820a rearward in the longitudinal direction, the container main body 90 is attached to the holding member 820a. In addition, when the container main body 90 is removed frontward in the longitudinal direction from the holding member 820a, the container main body 90 can be separated from the holding member 820a.

Each of the pair of shaft members 820b is a rod extended in the longitudinal direction and serves as a member that supports the holding member 820a. Note that in this embodiment, the number of shaft members 820b is two. However, the number of shaft members 820b may be one or may be three or more. The holding member 820a is fixed to the ends of the pair to shaft members 820b on the front side. The pair of shaft members 820b are moved in the longitudinal direction by a mechanism to be described later. The holding member 820a thus moves in the longitudinal direction and can perform a moving operation of translating the container main body 90 in the longitudinal direction. The middle unit 8B can also perform a pivotal operation of turning the extraction container 9 upside down as will be described later.

<4-2. Extraction Container>

Figure 11:
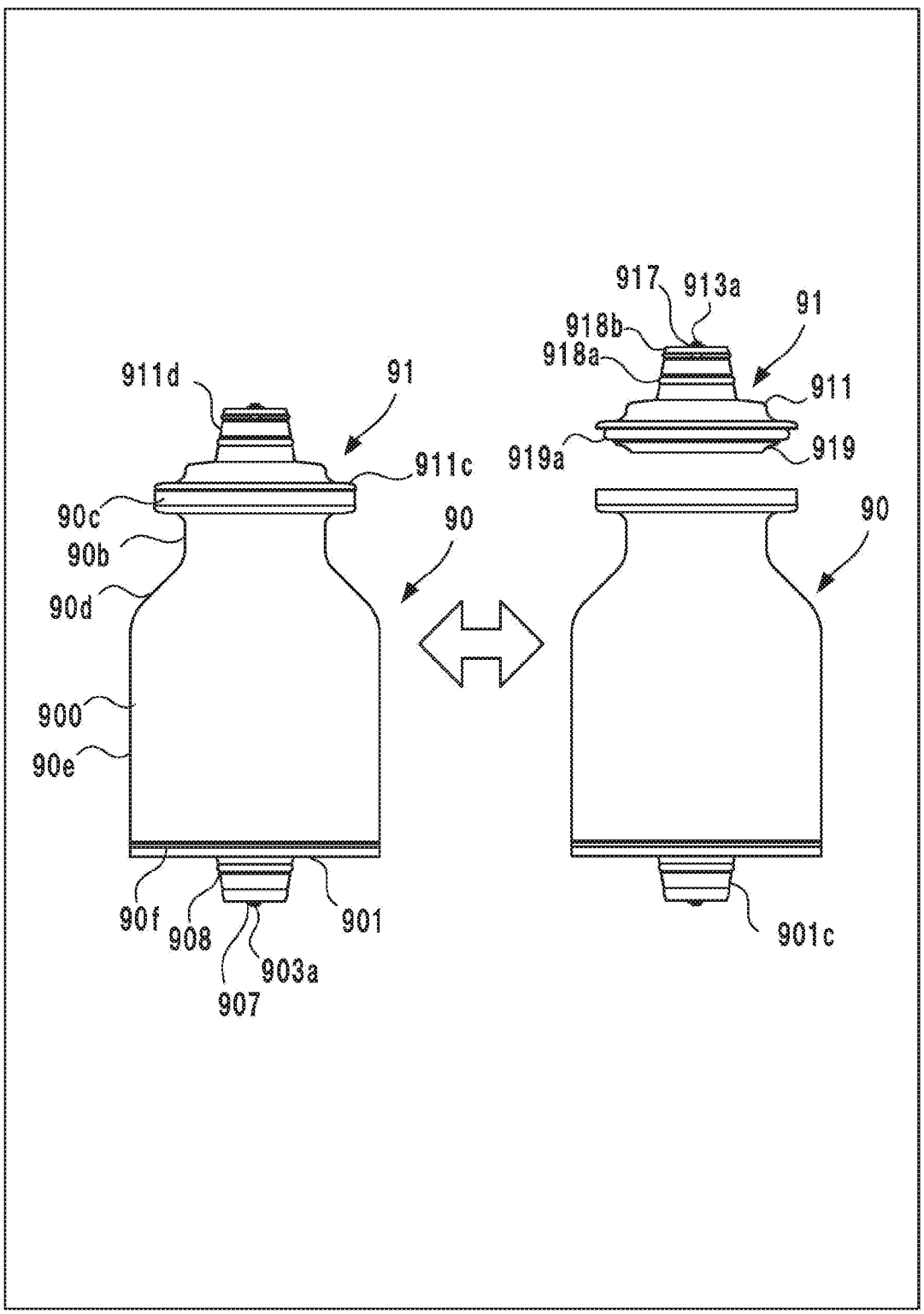
FIG. 11 is a view showing the closed state and the open state of the extraction container shown in FIG. 10.
Figure 12:
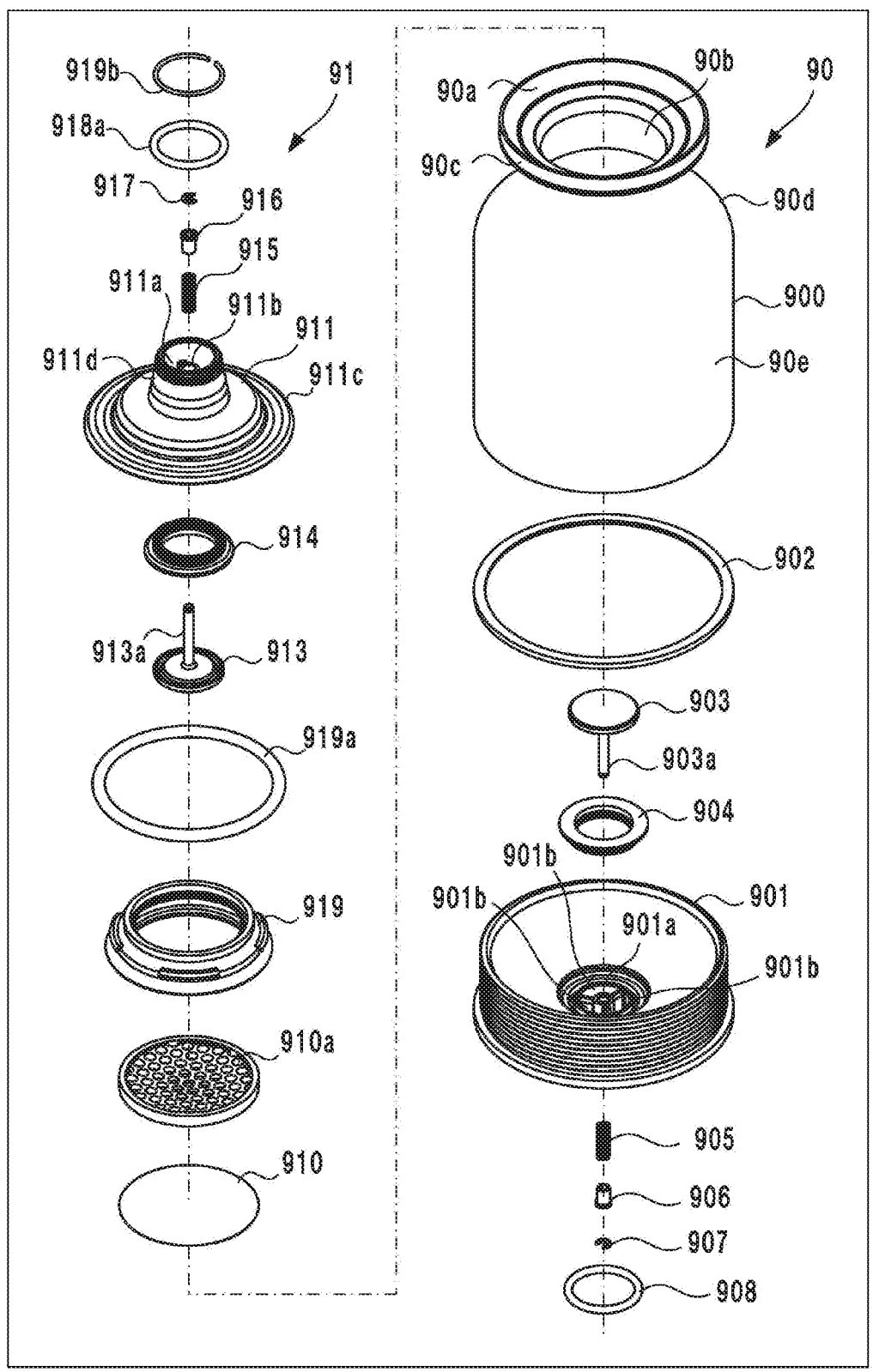
FIG. 12 is an exploded perspective view of the extraction container shown in FIG. 10.

The extraction container 9 will be described with reference to FIGS. 11 and 12. FIG. 11 is a view showing the closed state and the open state of the extraction container 9, and FIG. 12 is an exploded perspective view of the extraction container 9. As described above, the extraction container 9 is turned upside down by the middle unit 8B. The extraction container 9 shown in FIGS. 10 and 11 shows a basic posture in which the lid unit 91 is located on the upper side. When describing a positional relationship in the vertical direction in the following explanation, it means a positional relationship in the vertical direction in the basic posture unless otherwise specified.

The container main body 90 is a container with a closed bottom, and has a bottle shape including a neck portion 90b, a shoulder portion 90d, a trunk portion 90e and a bottom portion 90f. The whole portion or a part of the container main body 90 may have a transmissive portion. The transmissive portion may be made of a colorless transparent material or a color transparent material. This makes the inside of the container main body 90 visible from the outside. A flange portion 90c that defines an opening 90a communicating with the internal space of the container main body 90 is formed at an end of the neck portion 90b (the upper end of the container main body 90).

The neck portion 90b and the trunk portion 90e each have a cylindrical shape. In the neck portion 90b, a region where the sectional area or the sectional shape of the internal space is unchanged extends in the vertical direction. In the trunk portion 90e as well, a region where the sectional area or the sectional shape of the internal space is unchanged extends in the vertical direction, and the length is larger than that of the neck portion 90b. The sectional area of the internal space is larger in the trunk portion 90e than in the neck portion 90b. The ratio of the sectional area of the neck portion 90b to that of the trunk portion 90e is, for example, 65% or less, 50% or less, or 35% or less, and for example, 10% or more, or 20% or more. The shoulder portion 90d is a portion between the neck portion 90b and the trunk portion 90e, and has a tapered shape such that the sectional area of the internal space gradually becomes small from the side of the trunk portion 90e to the side of the neck portion 90b. However, the neck portion 90b is only named for the descriptive convenience for a portion closer to the opening 90a than the bottom portion 90f. The sectional area of the internal space is not always larger in the trunk portion 90e than in the neck portion 90b, and the neck portion 90a may be a part of the trunk portion 90e. That is, the extraction container 9 need not have a shape with a narrow portion as shown in FIG. 10 and the like, and may have a cylindrical shape or a cylindrical shape with the opening 90a or a flange portion like the flange portion 90c near the opening 90a.

The lid unit 91 is a unit that opens/closes the opening 90a. The opening/closing operation (elevating operation) of the lid unit 91 is performed by the upper unit 8A.

The container main body 90 includes a main body member 900 and a bottom member 901. The main body member 900 is a tube member that forms the neck portion 90b, the shoulder portion 90d and the trunk portion 90e and is open to the upper and lower sides. The bottom member 901 is a member that forms the bottom portion 90f, and is inserted into the lower portion of the main body member 900 and fixed. A seal member 902 intervenes between the main body member 900 and the bottom member 901 and improves the airtightness in the container main body 90.

A convex portion 901c is provided at the center of the bottom member 901. A shaft hole 901b is formed in the convex portion 901c. In addition, a plurality of communicating holes 901a are formed around the shaft hole 901b. The communicating holes 901a are through holes that make the interior of the container main body 90 communicate with the outside, and are mainly used to discharge a waste liquid and a residue when washing the interior of the container main body 90.

The shaft hole 901b extends through the bottom member 901. A shaft 903a of a plug member 903 is inserted into the shaft hole 901b. The plug member 903 opens/closes the communicating holes 901a from the inside of the container main body 90. A seal member 904 is provided between the plug member 903 and the inner surface (upper surface) of the bottom member 901, and improves the airtightness in the container main body 90 when closing the plug member 903.

On the outer side (lower side) of the bottom member 901, a coil spring 905 and a cylindrical spring bearing 906 are attached to the shaft 903a, and an E ring 907 further engages with an end of the shaft 903a. The coil spring 905 and the spring bearing 906 are held between the bottom member 901 and the E ring 907, and the coil spring 905 biases the plug member 903 in a closing direction. The convex portion 901c is provided with a seal member 908. The seal member 908 is a member configured to maintain the airtightness between the bottom member 901 and the upper unit 8A or the lower unit 8C.

The lid unit 91 includes a hat-shaped base member 911. The base member 911 includes a convex portion 911d and a collar portion 911c that overlaps the flange portion 90c at the time of closing. The base member 911 is provided with an opening/closing mechanism that is the same as the plug member 903 in the container main body 90. More specifically, a shaft hole 911b is formed at the center of the base member 911. A plurality of communicating holes 911a are formed around the shaft hole 911b. The communicating holes 911a are through holes that make the interior of the container main body 90 communicate with the outside, and are mainly used to pour hot water into the container main body 90 and send a coffee beverage.

The shaft hole 911b extends through the base member 911. A shaft 913a of a plug member 913 is inserted into the shaft hole 911b. The plug member 913 opens/closes the communicating holes 911a from the inside of the container main body 90. A seal member 914 is provided between the plug member 913 and the inner surface of the base member 911, and improves the airtightness in the container main body 90 when closing the plug member 913.

On the outer side (upper side) of the base member 911, a coil spring 915 and a cylindrical spring bearing 916 are attached to the shaft 913a, and an E ring 917 further engages with an end of the shaft 913a. The coil spring 915 and the spring bearing 916 are held between the base member 911 and the E ring 917, and the coil spring 915 biases the plug member 913 in a closing direction. The convex portion 911d is provided with a seal member 918a and a ring spring 918b. The seal member 918a is a member configured to maintain the airtightness between the base member 911 and the upper unit 8A or the lower unit 8C. The ring spring 918b is an engaging member configured to hold the lid unit 91 in the upper unit 8A at the time of opening of the lid unit 91.

A fixed member 919 is fixed to the inner side (lower side) of the base member 911. The fixed member 919 supports a filter 910 and a holding member 910a. The filter 910 is a filter used to separate a coffee beverage from the residue of ground beans and is, for example, a metal filter. By using the metal filter, a coffee beverage containing coffee oil can be provided to a user. The holding member 910a is a porous member that suppresses deformation of the filter 910. A seal member 919a is supported by the fixed member 919. In this embodiment, the fixed member 919 is an elastic member, and the fixed member 919 and the seal member 919a improve the airtightness between the lid unit 91 and the container main body 90 at the time of closing of the lid unit 91.

Note that an arrangement that brings the flange portion 90c and the collar portion 911c into hermetic contact, and thus does not use the seal member 919a can also be employed.

<4-3. Upper Unit and Lower Unit>

Figure 13:
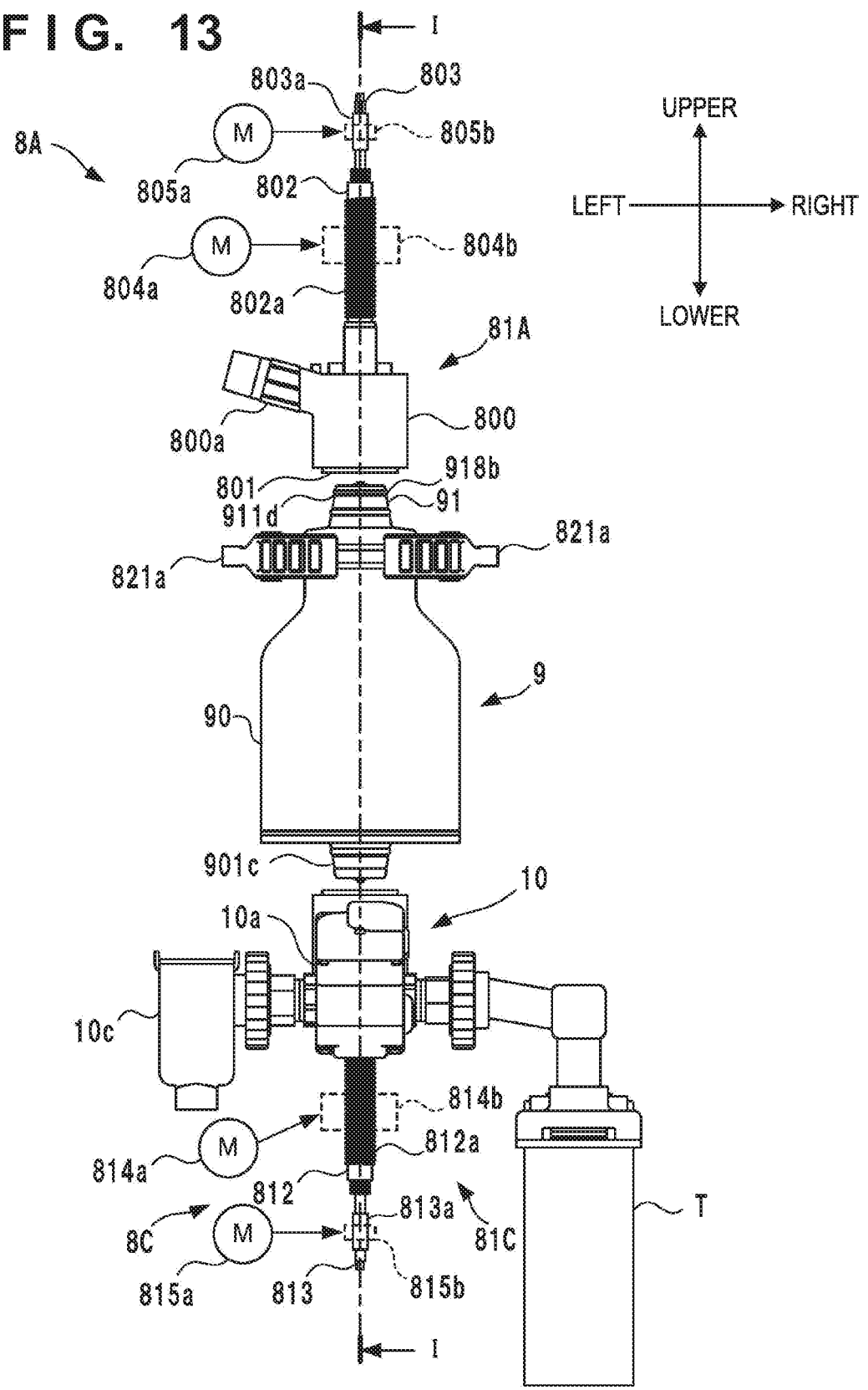
FIG. 13 is a front view showing the arrangements of parts of an upper unit and a lower unit.
Figure 14:
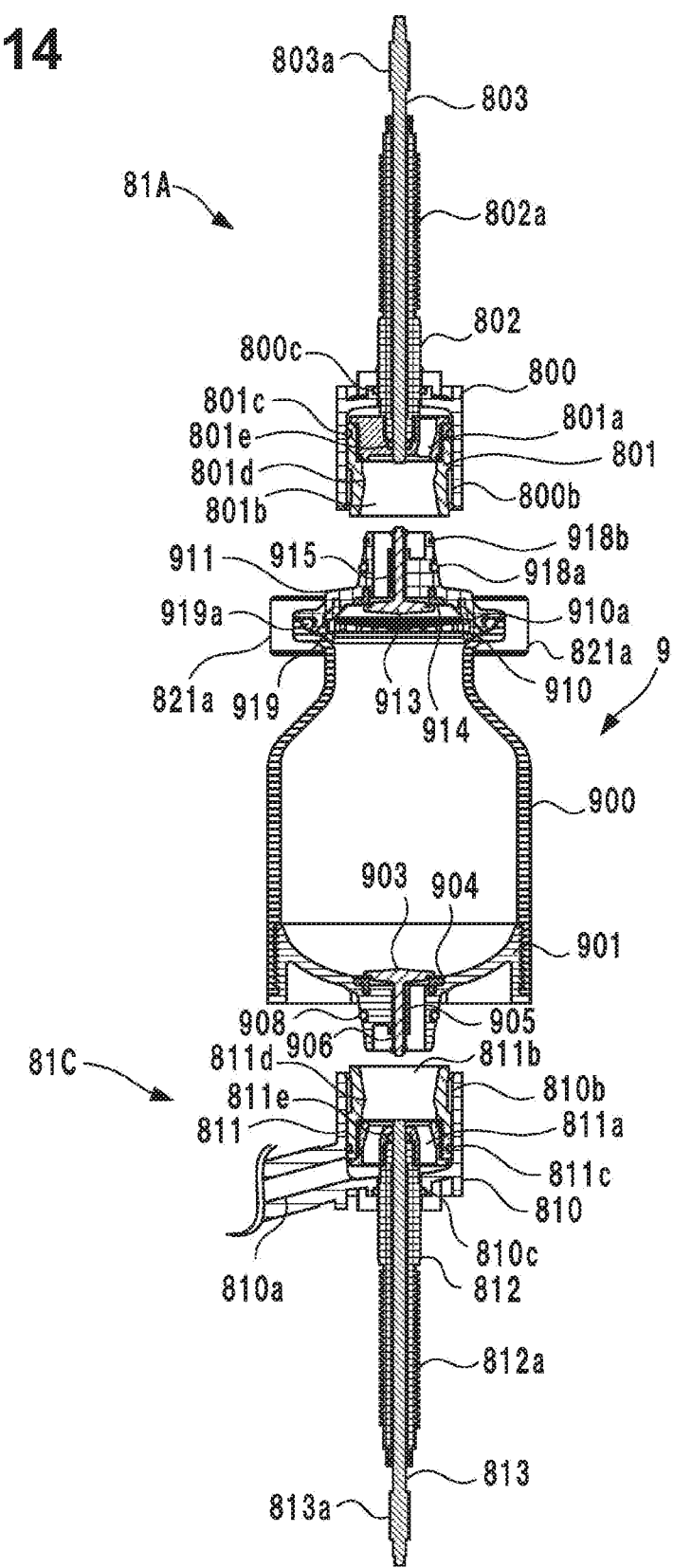
FIG. 14 is a sectional view taken along a line I-I in FIG. 13.

The upper unit 8A and the lower unit 8C will be described with reference to FIGS. 13 and 14. FIG. 13 is a front view showing the arrangements of parts of the upper unit 8A and the lower unit 8B. FIG. 14 is a sectional view taken along a line I-I in FIG. 13.

The upper unit 8A includes an operation unit 81A. The operation unit 81A performs an opening/closing operation (elevating) of the lid unit 91 with respect to the container main body 90 and an opening/closing operation of the plug members 903 and 913. The operation unit 81A includes a support member 800, a holding member 801, an elevating shaft 802 and a probe 803.

The support member 800 is stationarily provided so as not to change the position relative to the frame F. The support member 800 includes a storage portion 800b that stores the holding member 801. The storage portion 800b is a cylindrical space that is open to the lower side and has a closed top. The support member 800 also includes a communicating portion 800a that makes the pipe L3 and the interior of the storage portion 800b communicate with each other. Hot water, tap water and an air pressure supplied from the pipe L3 are introduced into the storage portion 800b via the communicating portion 800a.

The holding member 801 is a member that detachably holds the lid unit 91. The holding member 801 includes a storage portion 801b that receives the convex portion 911d of the lid unit 91 or the convex portion 901c of the bottom member 901. The storage portion 801b is a cylindrical space that is open to the lower side and has a closed top. The holding member 801 also includes a communicating portion 801a that makes the storage portion 800b and the storage portion 801b communicate with each other. Hot water, tap water and an air pressure supplied from the pipe L3 are introduced into the storage portion 801b via the communicating portions 800a and 801a. The holding member 801 is a movable member provided to be slidable in the vertical direction in the storage portion 800b. A seal member 801c that seals between the holding member 801 and the storage portion 800b is formed on the holding member 801, and the airtightness in the storage portion 800b is maintained even during sliding of the holding member 801.

An engaging portion 801d protruding inward in the radial direction is formed on the inner wall of the storage portion 801b. When the engaging portion 801d and the ring spring 918b of the lid unit 91 engage with each other, the lid unit 91 is held by the holding member 801. When a predetermined force or more to separate the holding member 801 and the lid unit 91 in the vertical direction acts, the engagement between the engaging portion 801d and the ring spring 918b is canceled by the elastic deformation of the ring spring 918b. The lid unit 91 and the holding member 801 are thus separated.

The elevating shaft 802 is provided such that its axial direction becomes the vertical direction. The elevating shaft 802 extends through the top portion of the support member 800 in the vertical direction and is provided to freely rise/lower in the vertical direction with respect to the support member 800. A seal member 800c is provided in the portion of a hole of the support member 800 through which the elevating shaft 802 passes, and the airtightness in the storage portion 800b is maintained even during sliding of the elevating shaft 802.

Figure 15:
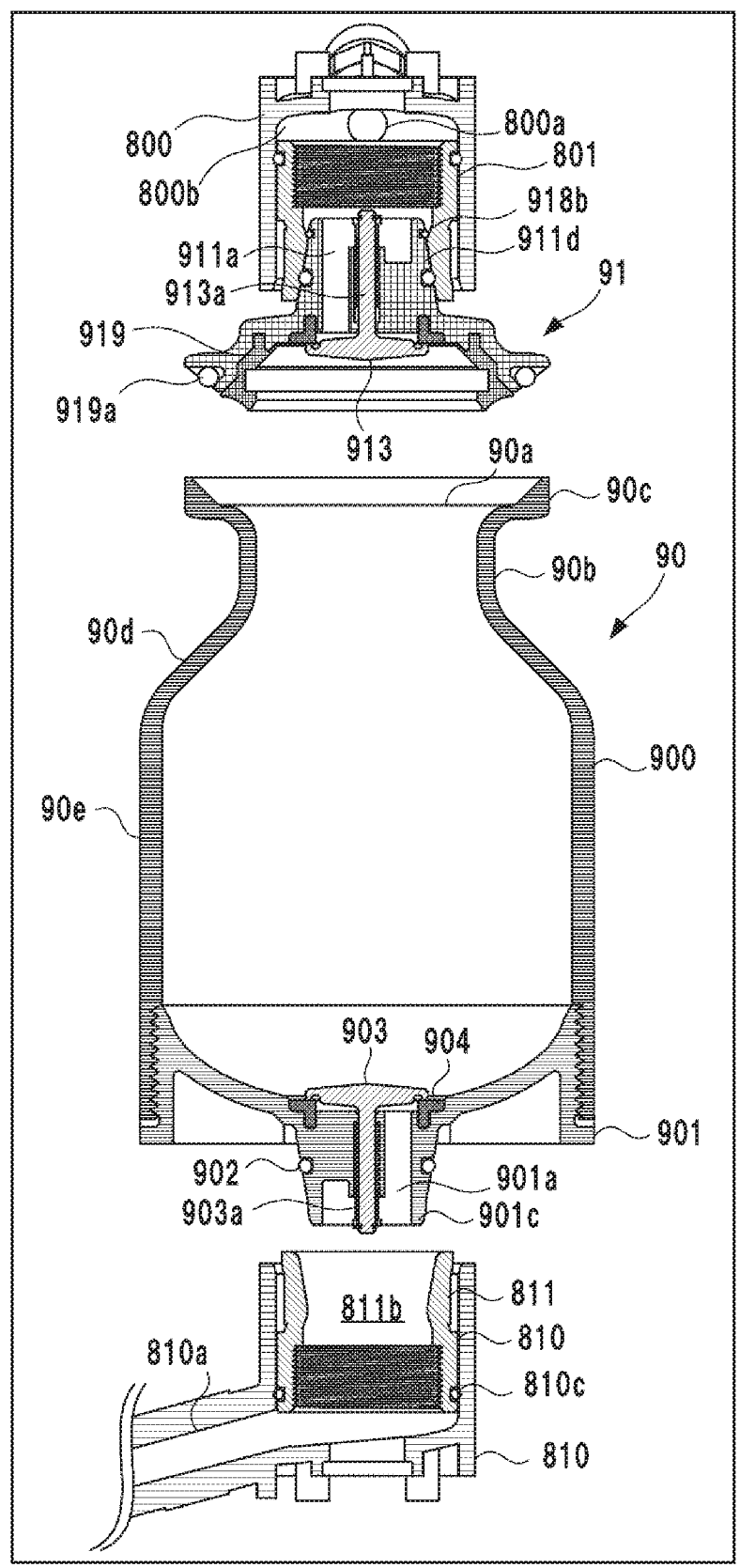
FIG. 15 is a view showing the open state of a lid unit.

The top portion of the holding member 801 is fixed to the lower end of the elevating shaft 802. When the elevating shaft 802 rises/lowers, the holding member 801 slides in the vertical direction, and attachment of the holding member 801 to the convex portion 911d or the convex portion 901c and removal of the holding member 801 can be performed. In addition, opening/closing of the lid unit 91 with respect to the container main body 90 can be done. FIG. 15 shows a case in which the lid unit 91 is in an open state. The holding member 801 that holds the lid unit 91 is located at the raised position, and the held lid unit 91 is separated to the upper side of the container main body 90. Note that some components are not illustrated in FIG. 15.

A screw 802a that forms a lead screw mechanism is formed on the outer peripheral surface of the elevating shaft 802. A nut 804b is threadably engaged with the screw 802a. The upper unit 8A includes a motor 804a, and the nut 804b is rotated at that position (without moving in the vertical direction) by the driving force of the motor 804a. Along with the rotation of the nut 804b, the elevating shaft 802 rises/lowers.

The elevating shaft 802 is a tubular shaft with a through hole in the central axis, and the probe 803 is inserted into the through hole so as to be slidable in the vertical direction. The probe 803 extends through the top portion of the holding member 801 in the vertical direction and is provided to freely rise/lower in the vertical direction with respect to the support member 800 and the holding member 801. A seal member 801e is provided in the portion of a hole of the holding member 801 through which the probe 803 passes, and the airtightness in the storage portion 801b is maintained even during sliding of the probe 803.

The probe 803 is provided on the same axis as the shaft 903a of the plug member 903 (and the shaft 913a of the plug member 913). When the probe 803 lowers, it presses the shaft 903a of the plug member 903 downward, and the plug member 903 can be changed from a closed state to an open state. Note that it is also possible to press the plug member 903 and change it from a closed state to an open state using the air pressure of air or the water pressure of water supplied to the extraction container 9 without using the probe 803. In this case, the air pressure or water pressure is made higher than the biasing force of the coil spring 905.

Figure 16:
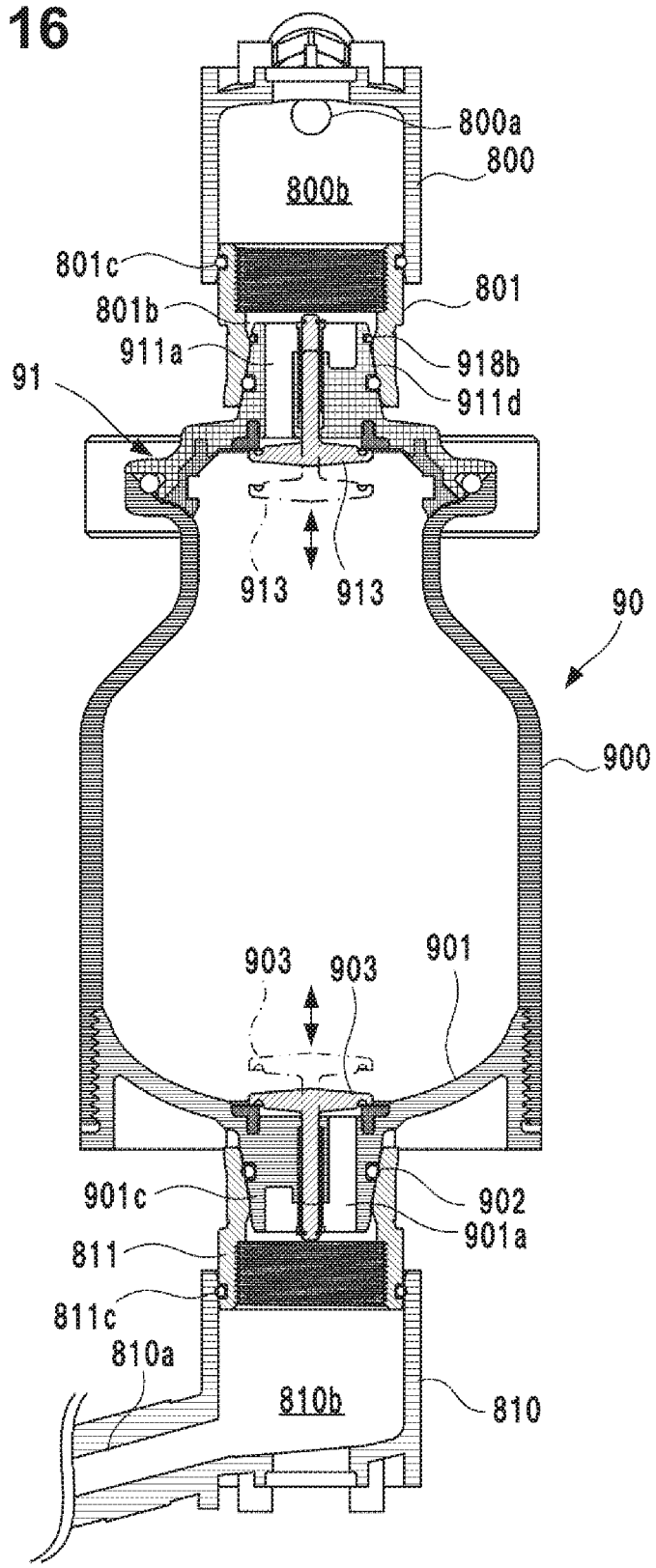
FIG. 16 is a view showing the open/closed form of upper and lower plug members.

FIG. 16 shows the open/closed form of the plug member 903 (and the plug member 913). The holding member 801 is located at the lowered position, and the convex portion 911d is inserted into the holding member 801. It can be understood that the plug member 903 can be displaced to the open state indicated by a broken line by lowering the probe 803 (not shown in FIG. 16). When the extraction container 9 is turned upside down, the plug member 913 can be changed from the close state to the open state. Note that some components are not illustrated in FIG. 16.

A screw 803a that forms a lead screw mechanism is formed on the outer peripheral surface of the probe 803. A nut 805b is threadably engaged with the screw 803a. The upper unit 8A includes a motor 805a, and the nut 805b is provided to be rotated at that position (without moving in the vertical direction) by the driving force of the motor 805*a*. Along with the rotation of the nut 805*b*, the probe 803 rises/lowers.

The lower unit 8C includes an operation unit 81C. The operation unit 81C has an arrangement obtained by turning the operation unit 81A upside down and performs an opening/closing operation of the plug members 903 and 913. The operation unit 81C also has an arrangement capable of opening/closing the lid unit 91. In this embodiment, the operation unit 81C is not used to open/close the lid unit 91.

The followings are almost the same as the description of the operation unit 81A, and the operation unit 81C will be described. The operation unit 81C includes a support member 810, a holding member 811, an elevating shaft 812 and a probe 813.

The support member 810 is stationarily provided so as not to change the position relative to the frame F. The support member 810 includes a storage portion 810*b* that stores the holding member 811. The storage portion 810*b* is a cylindrical space that is open to the upper side and has a closed bottom. The support member 810 also includes a communicating portion 810*a* that makes the selector valve 10*a* of the switching unit 10 and the interior of the storage portion 810*b* communicate with each other. A coffee beverage, tap water and the residue of ground beans in the container main body 90 are introduced into the selector valve 10*a* via the communicating portion 810*a*.

The holding member 811 includes a storage portion 811*b* that receives the convex portion 911*d* of the lid unit 91 or the convex portion 901*c* of the bottom member 901. The storage portion 811*b* is a cylindrical space that is open to the upper side and has a closed bottom. The holding member 811 also includes a communicating portion 811*a* that makes the storage portion 810*b* and the storage portion 811*b* communicate with each other. A coffee beverage, tap water and the residue of ground beans in the container main body 90 are introduced into the selector valve 10*a* via the communicating portions 810*a* and 811*b*. The holding member 811 is a movable member provided to be slidable in the vertical direction in the storage portion 810*b*. A seal member 811*c* that seals between the holding member 811 and the storage portion 810*b* is formed on the holding member 811, and the airtightness in the storage portion 810*b* is maintained even during sliding of the holding member 811.

An engaging portion 811*d* protruding inward in the radial direction is formed on the inner wall of the storage portion 811*b*. When the engaging portion 811*d* and the ring spring 918*b* of the lid unit 91 engage with each other, the lid unit 91 is held by the holding member 811. When a predetermined force or more to separate the holding member 811 and the lid unit 91 in the vertical direction acts, the engagement between the engaging portion 811*d* and the ring spring 918*b* is canceled by the elastic deformation of the ring spring 918*b*. The lid unit 91 and the holding member 811 are thus separated.

The elevating shaft 812 is provided such that its axial direction becomes the vertical direction. The elevating shaft 812 extends through the bottom portion of the support member 810 in the vertical direction and is provided to freely rise/lower in the vertical direction with respect to the support member 810. A seal member 810*c* is provided in the portion of a hole of the support member 810 through which the elevating shaft 812 passes, and the airtightness in the storage portion 810*b* is maintained even during sliding of the elevating shaft 812.

The bottom portion of the holding member 811 is fixed to the lower end of the elevating shaft 812. When the elevating shaft 812 rises/lowers, the holding member 811 slides in the vertical direction, and attachment of the holding member 811 to the convex portion 901*c* or the convex portion 911*d* and removal of the holding member 811 can be performed. A screw 812*a* that forms a lead screw mechanism is formed on the outer peripheral surface of the elevating shaft 812. A nut 814*b* is threadably engaged with the screw 812*a*. The lower unit 8C includes a motor 814*a*, and the nut 814*b* is rotated at that position (without moving in the vertical direction) by the driving force of the motor 814*a*. Along with the rotation of the nut 814*b*, the elevating shaft 812 rises/lowers.

The elevating shaft 812 is a tubular shaft with a through hole in the central axis, and the probe 813 is inserted into the through hole so as to be slidable in the vertical direction. The probe 813 extends through the bottom portion of the holding member 811 in the vertical direction and is provided to freely rise/lower in the vertical direction with respect to the support member 810 and the holding member 811. A seal member 811*e* is provided in the portion of a hole of the holding member 811 through which the probe 813 passes, and the airtightness in the storage portion 811*b* is maintained even during sliding of the probe 813.

The probe 813 is provided on the same axis as the shaft 913*a* of the plug member 913 (and the shaft 903*a* of the plug member 903). When the probe 813 rises, it presses the shaft 913*a* of the plug member 913 upward, and the plug member 913 can be changed from a closed state to an open state. Note that it is also possible to press the plug member 913 and change it from a closed state to an open state using the air pressure of air or the water pressure of water supplied to the extraction container 9 without using the probe 813. In this case, the air pressure or water pressure is made higher than the biasing force of the coil spring 915. For example, in at least one or both of charging of a liquid (for example, hot water) used for steaming and charging of a liquid (for example, pure water, hot water, or a detergent) used for cleaning of the extraction container 9, instead of opening the liquid charging portion (the plug member 913 or the plug member 903) in advance and injecting a liquid, the charging portion (the plug member 913 or the plug member 903) is preferably set in a closed state or open state less than a full open state and opened by the water pressure of the charged liquid in some cases according to the user's taste or to make the manner the interior is shown to the user through the transmissive portion 101 or the degree of the power of a liquid different from the usual. In some cases, for example, a liquid instantaneously enters the extraction container 9 or pours on the inner wall portion of the extraction container 9 or the extraction target (for example, ground beans of roasted coffee) like a shower.

FIG. 16 shows the open/closed form of the plug member 913 (and the plug member 903). The holding member 811 is located at the raised position, and the convex portion 901*c* is inserted into the holding member 811. It can be understood that the plug member 913 can be displaced to the open state indicated by a broken line by raising the probe 813 (not shown in FIG. 16). When the extraction container 9 is turned upside down, the plug member 903 can be changed from the close state to the open state.

A screw 813*a* that forms a lead screw mechanism is formed on the outer peripheral surface of the probe 813. A nut 815*b* is threadably engaged with the screw 813*a*. The lower unit 8C includes a motor 815*a*, and the nut 815*b* is provided to be rotated at that position (without moving in the vertical direction) by the driving force of the motor 815*a*. Along with the rotation of the nut 815*b*, the probe 813 rises/lowers.

<4-4. Middle Unit>

Figure 17:
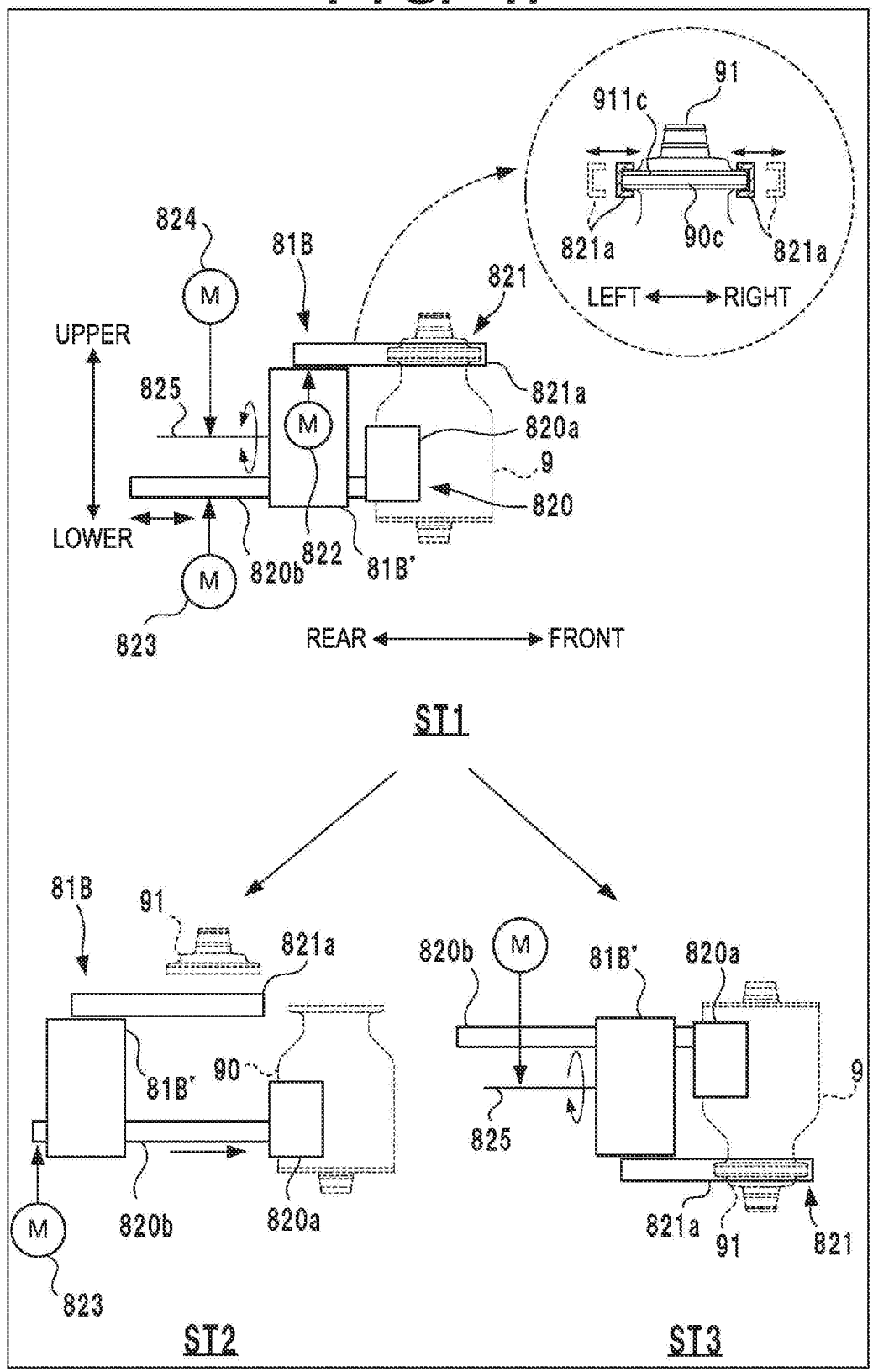
FIG. 17 is a schematic view of a middle unit.

The middle unit 8B will be described with reference to FIGS. 10 and 17. FIG. 17 is a schematic view of the middle unit 8B. The middle unit 8B includes a support unit 81B that supports the extraction container 9. The support unit 81B includes a unit main body 81B' that supports a lock mechanism 821, in addition to the above-described arm member 820.

The lock mechanism 821 is a mechanism that maintains the lid unit 91 in a closed state with respect to the container main body 90. The lock mechanism 821 includes a pair of grip members 821*a* that sandwich the collar portion 911*c* of the lid unit 91 and the flange portion 90*c* of the container main body 90 from the upper and lower sides. The pair of grip members 821*a* have a C-shaped section each that is fitted on the collar portion 911*c* and the flange portion 90*c* so as to sandwich them and are opened/closed in the horizontal direction by the driving force of a motor 822. When the pair of grip members 821*a* are in a closed state, as indicated by solid lines in the encircled view of FIG. 17, each grip member 821*a* is fitted on the collar portion 911*c* and the flange portion 90*c* so as to sandwich them from the upper and lower sides, and the lid unit 91 is hermetically locked to the container main body 90. In the lock state, even if the holding member 801 is raised by the elevating shaft 802 to open the lid unit 91, the lid unit 91 does not move (the lock is not canceled). That is, the force of lock by the lock mechanism 821 is set to be larger than the force of opening the lid unit 91 using the holding member 801. This can prevent the lid unit 91 from being set in an open state with respect to the container main body 90 at the time of abnormality.

Additionally, when the pair of grip members 821*a* are in an open state, as indicated by broken lines in the encircled view of FIG. 17, each grip member 821*a* is separated from the collar portion 911*c* and the flange portion 90*c*, and the lock between the lid unit 91 and the container main body 90 is canceled.

Note that the C-shaped section of the grip member 821*a* has a rectangular shape (the upper side and the lower side are parallel) in the example of FIG. 17, but may have a trapezoidal shape that narrows the sectional area on the opening end side. This can more firmly lock the collar portion 911*c* and the flange portion 90*c*.

When the engaging portion 801*d* of the holding member 801 and the ring spring 918*b* of the lid unit 91 are in an engaging state, and the holding member 801 is raised from the lowered position to the raised position, if the pair of grip members 821*a* are in the open state, the lid unit 91 is separated from the container main body 90. Conversely, if the pair of grip members 821*a* are in the close state, the engagement between the engaging portion 801*d* and the ring spring 918*b* is canceled, and only the holding member 801 rises.

Figure 18:
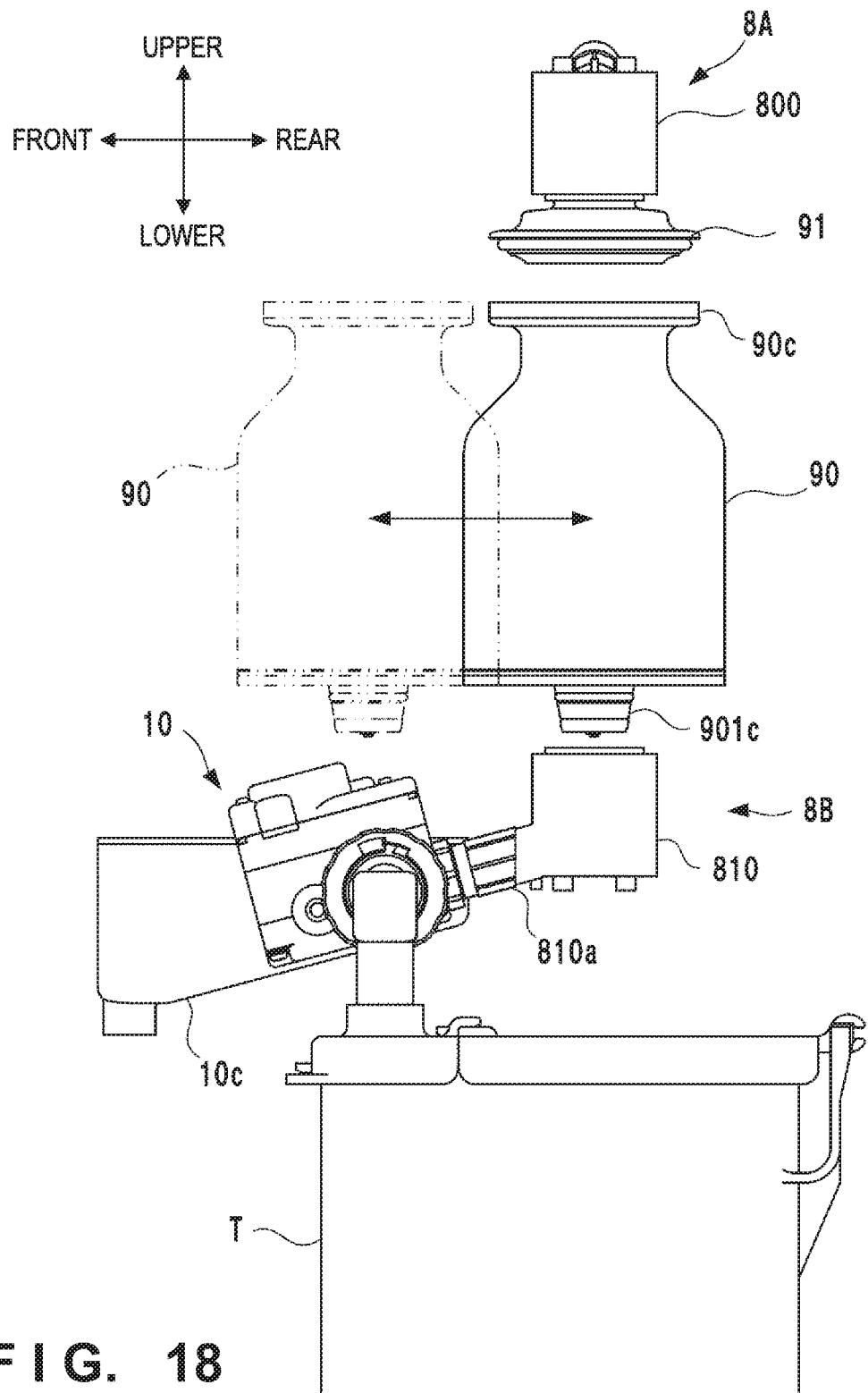
FIG. 18 is a view showing an example of the operation of the middle unit.

The middle unit 8B also includes a mechanism that horizontally moves the arm member 820 in the longitudinal direction using a motor 823 as a driving source. The container main body 90 supported by the arm member 820 can thus be moved between an extraction position (state ST1) on the rear side and a bean charging position (state ST2) on the front side. FIG. 18 shows a moving form of the container main body 90. Referring to FIG. 18, the position of the container main body 90 indicated by a solid line represents the extraction position, and the position of the container main body 90 indicated by a broken line represents the bean charging position. The bean charging position is a position to charge ground beans into the container main body 90. Ground beans ground by the grinder 5B are charged into the opening 90*a* of the container main body 90 from which the lid unit 91 is separated. The extraction position is a position where the operation of the container main body 90 by the operation units 81A and 81C is possible. This is a position on the same axis as the probes 803 and 813 where extraction of a coffee liquid is performed. FIGS. 10 and 13 to 16 all show a case in which the container main body 90 is located at the extraction position. When the position of the container main body 90 is thus changed between ground beans charging and coffee liquid extraction and water supply, steam generated at the time of coffee liquid extraction hardly adheres to the outlet 51*b* of the grinder 5B that is a ground bean supply unit, and the ground beans can be prevented from adhering to the outlet 51*b* due to the water of the steam.

Figure 19:
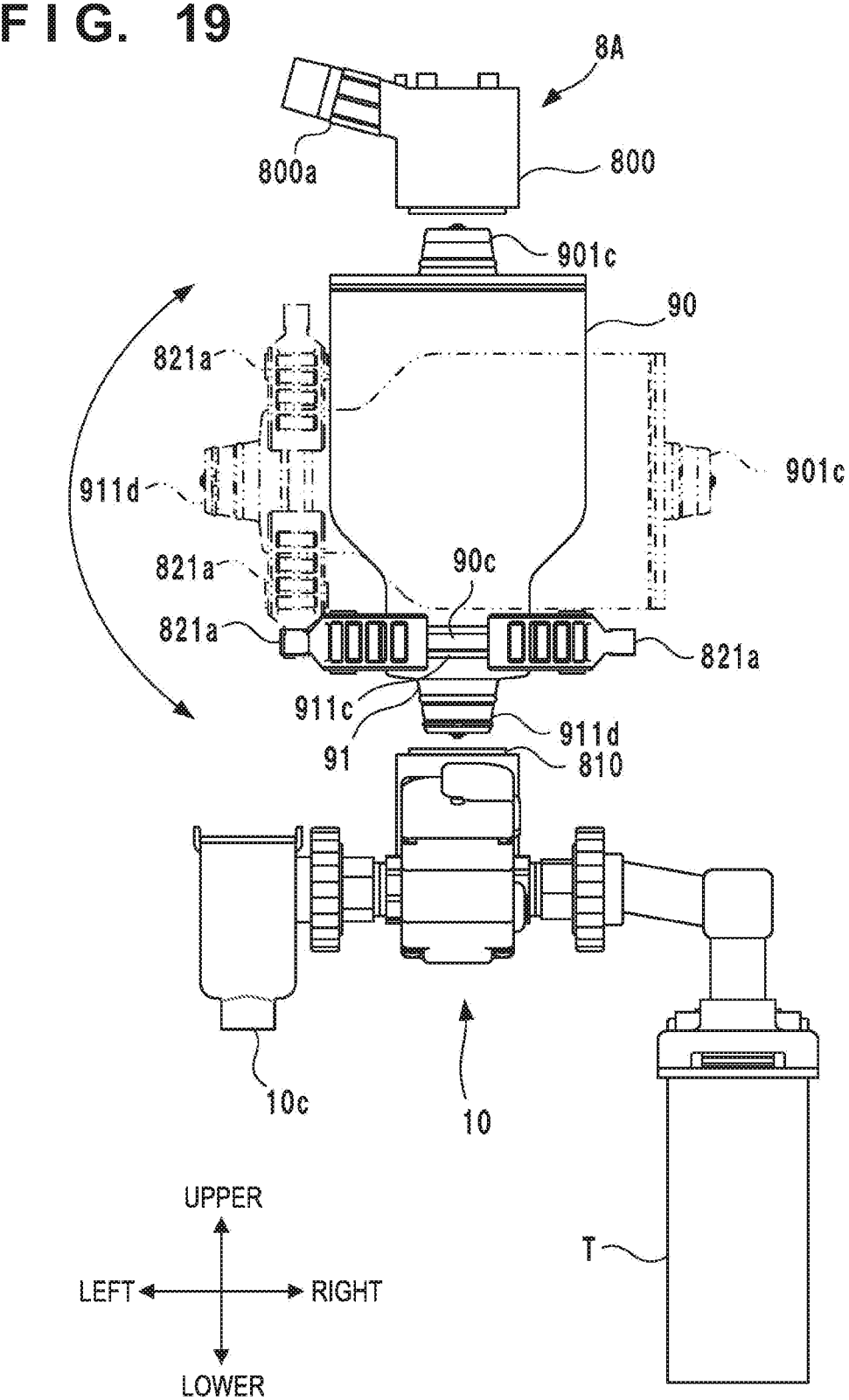
FIG. 19 is a view showing an example of the operation of the middle unit.

Referring back to FIG. 17, the middle unit 8B also includes a mechanism that rotates the support unit 81B about a shaft 825 in the longitudinal direction using a motor 824 as a driving source. The posture of the container main body 90 (extraction container 9) can thus be changed from an erect posture (state ST1) in which the neck portion 90*b* is located on the upper side to an inverted posture (state ST3) in which the neck portion 90*b* is located on the lower side. FIG. 13 shows a state in which the extraction container 9 is in the erect posture. FIG. 19 shows a state in which the posture of the extraction container 9 is changed by making it pivot. During the pivotal movement of the extraction container 9, a state in which the lid unit 91 is locked to the container main body 90 is maintained by the lock mechanism 821. The extraction container 9 indicated by a solid line in FIG. 19 shows the state of the inverted posture, and the extraction container 9 indicated by a broken line shows an intermediate state between the erect posture and the inverted posture (a posture halfway through the pivotal movement). The extraction container 9 is turned upside down between the erect posture and the inverted posture. At the position of the convex portion 901*c* in the erect posture, the convex portion 911*d* is located in the inverted posture. In addition, at the position of the convex portion 911*d* in the erect posture, the convex portion 901*c* is located in the inverted posture. For this reason, in the inverted posture, the opening/closing operation for the plug member 903 can be performed by the operation unit 81A, and the opening/closing operation for the plug member 913 can be performed by the operation unit 81C.

Note that the grip members 821*a* may include a grip portion cover. In this case, to suppress the radius of gyration of the entire lock mechanism 821 in a rotating operation, the grip portion cover may have a shape with a cut portion on the outside in a front view of the plane of rotation. This makes it possible to protect the lock mechanism while preventing interference with other components.

Figure 24:
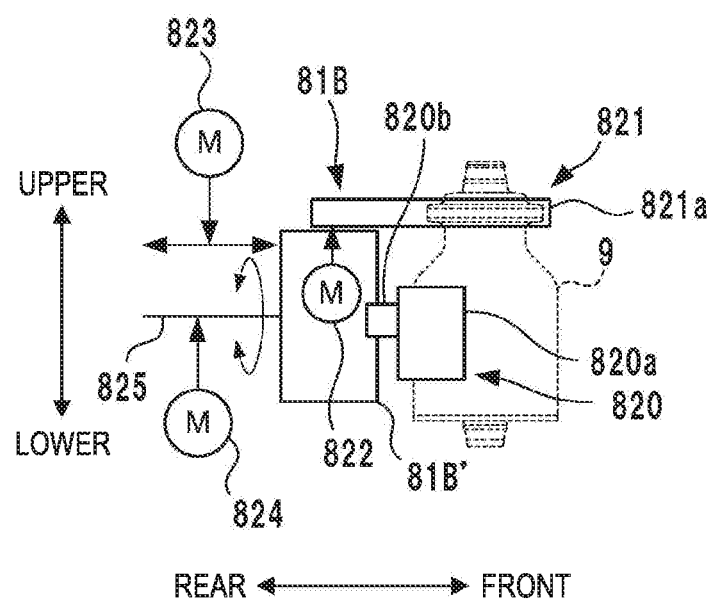
FIG. 24 is a schematic view showing another example of the middle unit.

In the example of FIG. 17, the mechanism moves the arm member 820 in the longitudinal direction relative to the unit main body 81B'. However, a mechanism that fixes the arm member 820 to the unit main body 81B', as shown in the example of FIG. 24, can also be employed. In the example of FIG. 24, a mechanism using the motor 823 as a driving source horizontally moves the unit main body 81B' in the longitudinal direction. Accordingly, since the arm member 820 also moves in the longitudinal direction, the container main body 90 can be moved between the extraction position and the bean charging position.

<5. Example of Operation Control>

Figure 20:
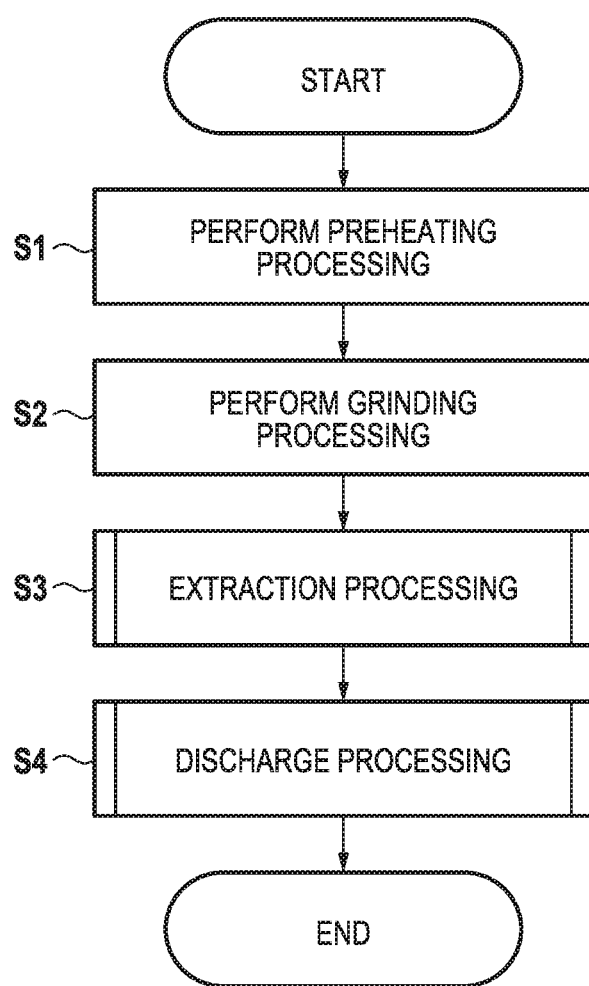
FIG. 20 is a flowchart showing an example of control executed by the control apparatus shown in FIG. 2.
Figure 21:
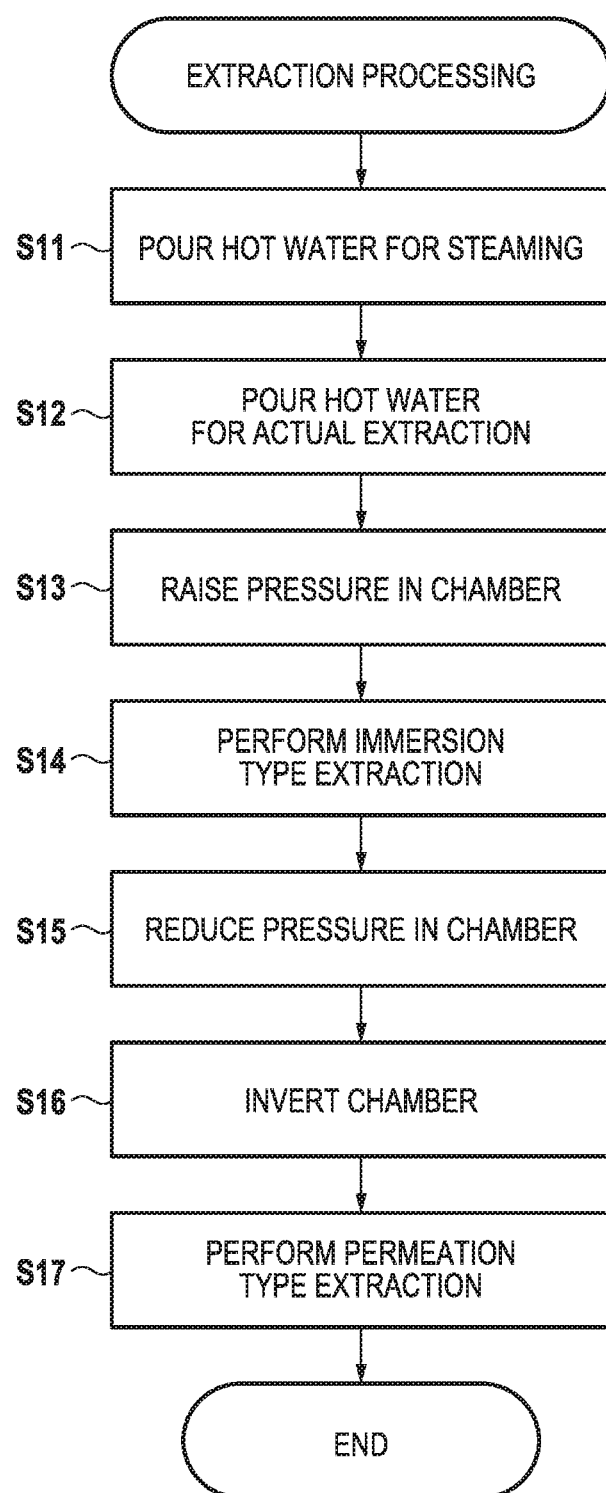
FIG. 21 is a flowchart showing an example of control executed by the control apparatus shown in FIG. 2.

An example of control processing of the beverage producing apparatus 1 executed by the processing unit 11a will be described with reference to FIGS. 20 to 22. FIG. 20 shows an example of control associated with one coffee beverage producing operation. The state of the beverage producing apparatus 1 before a production instruction will be referred to as a standby state. The states of the mechanisms in the standby state are as follows.

The extracting apparatus 3 is in the state shown in FIG. 10. The extraction container 9 is in the erect posture and is located at the extraction position. The lock mechanism 821 is in the closed state, and the lid unit 91 closes the opening 90a of the container main body 90. The holding member 801 is located at the lowered position and attached to the convex portion 911d. The holding member 811 is located at the raised position and attached to the convex portion 901c. The plug members 903 and 913 are in the closed state. The selector valve 10a makes the communicating portion 810a of the operation unit 81C communicate with the waste tank T. The standby state is not limited to the state shown in FIG. 10. For example, the extraction container 9 may be in the erect posture and be located at the extraction position, the lock mechanism 821 may be in the open state, and the lid unit 91 may open the opening 90a of the container main body 90.

In the standby state, when a coffee beverage production instruction is input, processing shown in FIG. 20 is executed. In step S1, preheating processing is executed. This processing is processing of pouring hot water in the container main body 90 to warm the container main body 90 in advance. First, the plug members 903 and 913 are set in the open state. The pipe L3, the extraction container 9, and the waste tank T are thus set in a communicating state.

The solenoid valve 72i is opened for only a predetermined time (for example, 1,500 ms) and then closed. Hot water is thus poured from the water tank 72 into the extraction container 9. Next, the solenoid valve 73b is opened for only a predetermined time (for example, 500 ms) and then closed. The pressure of the air in the extraction container 9 is thus raised to promote discharge of the hot water to the waste tank T. With the above-described processing, the interior of the extraction container 9 and the pipe L2 are preheated, and cooling of the hot water in the subsequent production of a coffee beverage can be reduced.

In addition, when pouring the hot water into the extraction container 9 in this preheating processing, the hot water passes through the filter 910. Even if a residue of ground beans used in the previous coffee beverage production or oil generated by extraction of the coffee liquid adheres to the filter 910, it is washed away and discharged.

In step S2, grinding processing is performed. Here, roasted coffee beans are ground, and the ground beans are charged into the container main body 90. First, the lock mechanism 821 is set in the open state, and the holding member 801 is raised to the raised position. The lid unit 91 is held by the holding member 801 and rises together with the holding member 801. As a result, the lid unit 91 separates from the container main body 90. The holding member 811 lowers to the lowered position. The container main body 90 is moved to the bean charging position. Next, the storage apparatus 4 and the grinding apparatus 5 are operated. Accordingly, roasted coffee beans for one cup are supplied from the storage apparatus 4 to the grinder 5A. The roasted coffee beans are ground in two steps by the grinders 5A and 5B, and the separation apparatus 6 separates unwanted substances. The ground beans are charged into the container main body 90.

The container main body 90 is returned to the extraction position. The holding member 801 is lowered to the lowered position, and the lid unit 91 is attached to the container main body 90. The lock mechanism 821 is set in the closed state, and the lid unit 91 is hermetically locked to the container main body 90. The holding member 811 rises to the raised position. Of the plug members 903 and 913, the plug member 903 is set in the open state, and the plug member 913 is set in the closed state.

In step S3, extraction processing is performed. Here, a coffee liquid is extracted from the ground beans in the container main body 90. FIG. 21 is a flowchart of the extraction processing in step S3.

In step S11, to steam the ground beans in the extraction container 9, hot water in an amount less than a cup of hot water is poured into the extraction container 9. Here, the solenoid valve 72i is opened for a predetermined time (for example, 500 ms) and closed. Hot water is thus poured from the water tank 72 into the extraction container 9. After that, the processing waits for a predetermined time (for example, 5,000 ms), and the process of step S11 ends. The ground beans can be steamed by this processing. Note that the pressure and temperature in the extraction container 9 after this processing slightly rise but do not change much from those before the processing.

By steaming the ground beans, carbon dioxide gas contained in the ground beans can be emitted, and the extraction effect later can be enhanced. To steam the whole ground beans, the amount of hot water for steaming is preferably an amount to evenly moisten the ground beans. To do this, when pouring the hot water for steaming into the extraction container 9, the hot water may be poured while reducing the pressure in the water tank 72 by temporarily opening the solenoid valve 72h. Since this makes it possible to dampen the force of hot water for steaming and moisten the beans with the hot water evenly as much as possible, the effect of steaming can be enhanced. Note that the air pressure in the extraction container 9 at the time of steaming may be an air pressure (an air pressure at which the hot water does not boil) lower than the air pressure in subsequent immersion type extraction to be described later (step S14). This can promote emission of the carbon dioxide gas. When bringing the ground beans with a liquid (for example, hot water), for example, as for the carbon dioxide gas emitted from the ground beans at the time of steaming, immersion, or the like, the release valve 73c may be opened once after steaming to release the extraction container 9 to the atmosphere. Instead of releasing, when immersing the ground beans in a liquid (for example, hot water) later, the immersion may be performed by applying the pressure of the carbon dioxide gas as well. For example, in the beverage producing apparatus 1, steaming of the ground beans is performed at 2 atm (3 atm in the absolute pressure) or 0 atm (1 atm in the absolute pressure). After that, a cup of liquid (for example, hot water) is poured into the extraction container 9 at 2 atm (3 atm in the absolute pressure), the ground beans are immersed at 4 atm (5 atm in the absolute pressure), the liquid is bumped at the atmospheric pressure (0 atm (1 atm in the absolute pressure), the extraction container 9 is rotated, and after that, immersion or sending to the outside of the extraction container 9 is performed while applying a pressure of 0.7 atm (1.7 atm in the absolute pressure) into the extraction container 9. However, the steaming, immersion, or sending of the ground beans may be performed by applying the pressure of the carbon dioxide gas emitted from the ground beans as well. The steaming may be performed after the carbon dioxide gas is emitted to the atmosphere before execution. The carbon dioxide gas may be emitted to the atmosphere before immersion at 4 atm. The carbon dioxide gas may be emitted to the atmosphere before immersion at 2 atm before the immersion at 4 atm. The carbon dioxide gas may be emitted to the atmosphere before immersion at 0.7 atm or sending after the immersion at 4 atm. The steaming may be performed while applying the pressure of the carbon dioxide gas as well, the immersion at 4 atm may be performed while applying the pressure of the carbon dioxide gas as well (for example, the immersion may be performed at 4 atm+pressure of carbon dioxide gas), the immersion at 2 atm before the immersion at 4 atm may be performed while applying the pressure of the carbon dioxide gas as well (for example, the immersion may be performed at 2 atm+pressure of carbon dioxide gas), or the immersion at 0.7 atm after the immersion at 4 atm may be performed while applying the pressure of the carbon dioxide gas as well (for example, the immersion may be performed at 0.7 atm+pressure of carbon dioxide gas).

Note that the presence/absence of steaming may be selectable by a setting. If steaming is not performed, one water pouring operation suffices. Hence, an effect of shortening the time until completion of coffee beverage production can be obtained.

In step S12, the remaining amount of hot water is poured into the extraction container 9 such that a cup of hot water is stored in the extraction container 9. Here, the solenoid valve 72i is opened for a predetermined time (for example, 7,000 ms) and closed. Hot water is thus poured from the water tank 72 into the extraction container 9. Note that in this embodiment, the amount of hot water is managed by the opening time of the solenoid valve 72i. However, the pouring amount of hot water may be managed by measurement using a flow meter or measurement using another method.

By the process of step S12, the interior of the extraction container 9 can be set in a state at a temperature (for example, about 110° C.) more than 100° C. at 1 atm. Next, in step S13, the pressure in the extraction container 9 is raised. Here, the solenoid valve 73b is opened for only a predetermined time (for example, 1,000 ms) and closed to raise the pressure in the extraction container 9 to an air pressure at which the hot water does not boil (for example, about 4 atm (about 3 atm in the gauge pressure)). After that, the plug member 903 is set in the closed state.

Subsequently, this state is maintained for a predetermined time (for example, 7,000 ms), and immersion type coffee liquid extraction is performed (step S14). Extraction of a coffee liquid by the immersion type under a high temperature and high pressure is thus performed. In the immersion type extraction under a high temperature and high pressure, the following effects are expected. As the first effect, when the pressure is raised, the hot water can be readily infiltrated into the ground beans, and extraction of the coffee liquid can be promoted. As the second effect, when the temperature is raised, extraction of the coffee liquid is promoted. As the third effect, when the temperature is raised, the viscosity of oil contained in the ground beans lowers, and extraction of the oil is promoted. An aromatic coffee beverage can thus be produced. Note that there is an opinion that when a coffee liquid is extracted at a high temperature, the taste readily becomes harsh. In this embodiment, an unwanted substance such as chaff that is the cause of harsh taste is removed by the separation apparatus 6. For this reason, even when a coffee liquid is extracted at a high temperature, the harsh taste can be suppressed.

The temperature of hot water (high-temperature water) need only exceed 100° C. However, a higher temperature is advantageous in extracting the coffee liquid. On the other hand, to raise the temperature of hot water, the cost increases in general. Hence, the temperature of hot water may be set to, for example, 105° C. or more, 110° C. or more, or 115° C. or more and, for example, 130° C. or less or 120° C. or less. The air pressure can be any air pressure at which the hot water does not boil.

In step S15, the pressure in the extraction container 9 is reduced. Here, the air pressure in the extraction container 9 is switched to an air pressure at which hot water boils. More specifically, the plug member 913 is set in the open state, and the solenoid valve 73c is opened for a predetermined time (for example, 1,000 ms) and closed. The interior of the extraction container 9 is released to the atmosphere. After that, the plug member 913 is set in the closed state again.

The pressure in the extraction container 9 is abruptly reduced to an air pressure lower than the boiling point pressure, and the hot water in the extraction container 9 boils at once. The hot water and the ground beans in the extraction container 9 scatter explosively in the extraction container 9. This allows the hot water to evenly boil. In addition, breakage of the cell walls of the ground beans can be promoted, and extraction of the coffee liquid after that can further be promoted. Furthermore, since the ground beans and the hot water can be stirred by this boiling, extraction of the coffee liquid can be promoted. In this embodiment, the coffee liquid extraction efficiency can be improved in this way. The open valve (73c) is opened to do rapid pressure reduction in the extraction container 9. The rapid pressure reduction may be, for example, reducing the pressure at a speed at which one of a bumping state and a state close to bumping occurs, and more specifically, reducing the air pressure in the extraction container 9 at a speed at which the pressure lowers to a pressure less than a vapor pressure (a saturated vapor pressure, an equilibrium vapor pressure, or the like) or reducing the pressure at a speed at which the liquid (for example, hot water or a mixture of hot water and a coffee liquid) in the extraction container 9 abruptly boils at a temperature more than the boiling point. Breakage of the cells of the ground beans or stirring of the ground beans and hot water may be done by bumping (for example, a phenomenon in which an unboiled liquid (for example, hot water) abruptly boils at a temperature more than the boiling point).

Figure 23:
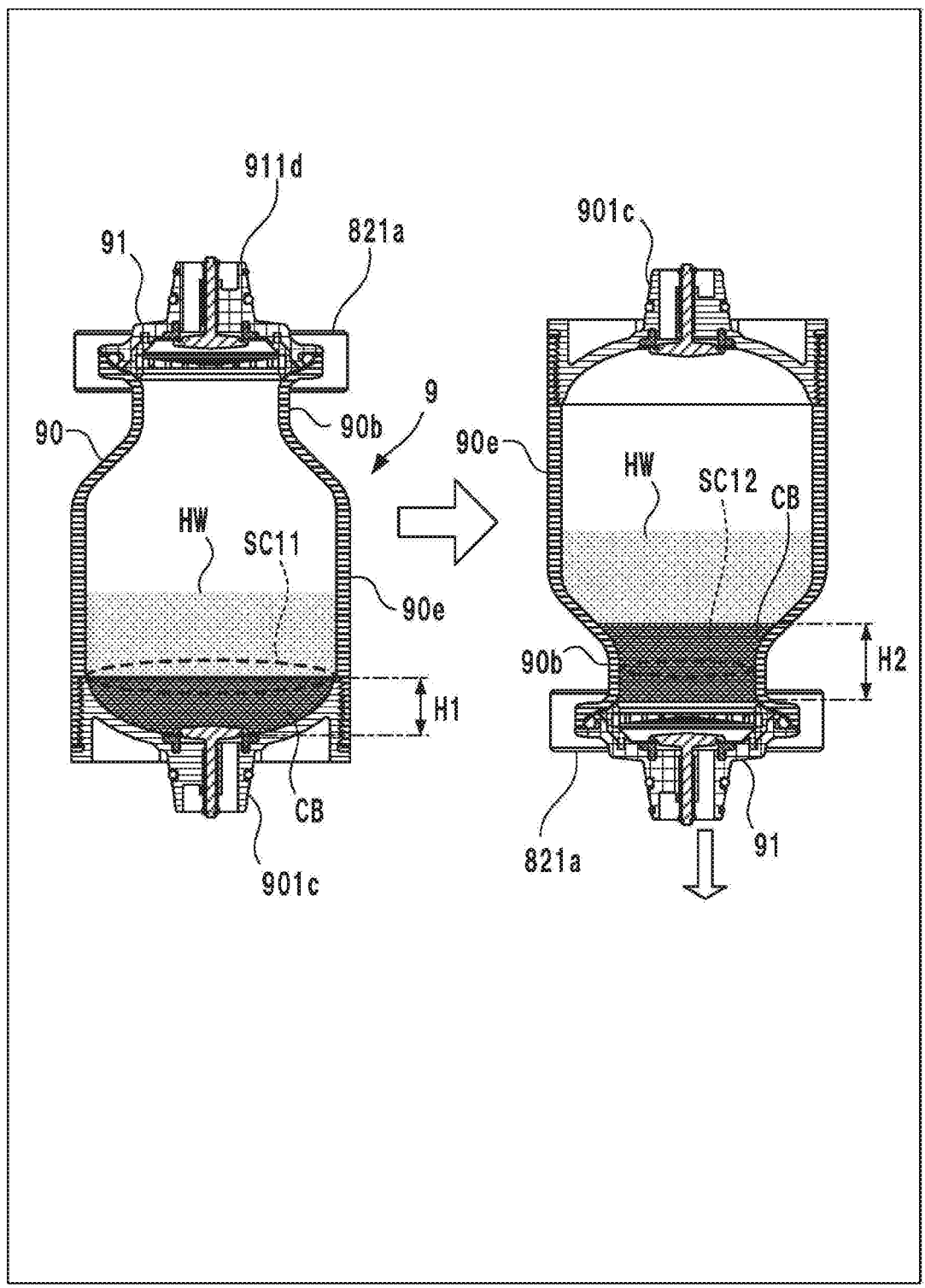
FIG. 23 is a view showing changes in hot water and ground beans caused by a change in the posture of the extraction container.

In step S16, the extraction container 9 is inverted from the erect posture to the inverted posture. Here, the holding member 801 is moved to the raised position, and the holding member 811 is moved to the lowered position. Then, the support unit 81B is rotated. After that, the holding member 801 is returned to the lowered position, and the holding member 811 is returned to the raised position. FIG. 23 shows the states in the extraction container 9 before and after the inversion. The extraction container 9 in the erect posture is shown on the left side of FIG. 23, and the extraction container 9 in the inverted posture is shown on the right side of FIG. 23. The lid unit 91 including the neck portion 90b and the filter 910 is located on the lower side. Inversion from the erect posture to the inverted posture is not limited to rotating the extraction container 9 by 180° by performing an operation with the rotation of the extraction container 9. The extraction container 9 may be rotated to an angle (for example, 170°) smaller than 180° or an angle (for example, 190°) larger than 180°. The extraction container 9 may be rotated to an angle more than ±90°. For example, as for the erect posture or inverted posture, concerning a portion that forms the opening 90$a$ of the extraction container 9 and, of portions that do not form the opening 90$a$ of the extraction container 9, a portion that is farthest from that portion, the erect posture may be a posture in which the portion is located at a position higher than the far portion, and the inverted posture may be a posture in which the portion is located at a position lower than the far portion. The erect posture may be a posture in which the portion stands still in a state in which it is located at a position higher than the far portion, and the inverted posture may be a posture in which the portion stands still in a state in which it is located at a position lower than the far portion. In addition, when rotating from the erect posture to the inverted posture, any action can be performed during the posture change from the erect posture to the inverted posture and, for example, the extraction container 9 is rotated by 360° a predetermined number of times (for example, once or a plurality of times). Furthermore, instead of making a simple rotation, the extraction container 9 in the erect posture and the extraction container 9 in the inverted posture may be located at different positions in the longitudinal direction, vertical direction, and horizontal direction.

In step S17, permeation type coffee liquid extraction is performed, and a coffee beverage is sent to the cup C. Here, the selector valve 10$a$ is switched to make the pouring portion 10$c$ and the communicating portion 810$a$ of the operation unit 81C communicate. In addition, both the plug members 903 and 913 are set in the open state. Furthermore, the solenoid valve 73$b$ is opened for a predetermined time (for example, 10,000 ms) to set the pressure in the extraction container 9 to a predetermined air pressure (for example, 1.7 atm (0.7 atm in the gauge pressure)). In the extraction container 9, a coffee beverage in which the coffee liquid is dissolved in the hot water passes through the filter 910 and is sent to the cup C. The filter 910 restricts the leakage of the residue of the ground beans. By using both immersion type extraction in step S14 and permeation type extraction in step S17, the coffee liquid extraction efficiency can further be improved. The extraction processing thus ends. Here, an example in which the pressure by the carbon dioxide gas is not released to the atmosphere before the permeation type coffee liquid extraction has been described. However, before the permeation type coffee liquid extraction, it is preferable to open the release valve 73$c$ to release the carbon dioxide gas emitted from the ground beans in the extraction container 9 to the atmosphere, thereby releasing the pressure of the carbon dioxide gas to the atmosphere.

Note that when performing the permeation type coffee liquid extraction in step S17, only the plug member 903 may be set in the open state to release the interior to the atmospheric pressure once. The air pressure in the extraction container 9, which is raised by the carbon dioxide gas generated during the immersion type extraction, can be lowered in this way. After this operation is performed, the plug member 913 may be set in the open state, and the solenoid valve 73$b$ may be opened, thereby extracting the coffee liquid.

The end of the extraction processing may be determined based on a change in the pressure in the extraction container 9 during the extraction processing. For example, to maintain 1.7 atm, if the air pressure falls below 1.7 atm, the pressure is raised by opening/closing the solenoid valve 73$b$. When the time interval from the pressure rising to the next pressure rising becomes a half or less from the start of sending, it may be determined that the sending is completed, and the extraction processing may be ended. Alternatively, the determination may be done when the number of times of pressure rising per unit time increases.

The relationship between the inverting operation in step S16 and the permeation type coffee liquid extraction in step S17 will be described here with reference to FIG. 23. In a state in which the extraction container 9 is in the erect posture, the ground beans accumulate from the trunk portion 90$e$ to the bottom portion 90$f$. On the other hand, in a state in which the extraction container 9 is in the inverted posture, the ground beans accumulate from the shoulder portion 90$d$ to the neck portion 90$b$. A sectional area SC11 of the trunk portion 90$e$ is larger than a sectional area SC12 of the neck portion 90$b$, and an accumulation thickness H2 of the ground beans in the inverted posture is larger than an accumulation thickness H1 in the erect posture. That is, the ground beans accumulate relatively thin and widely in the state in which the extraction container 9 is in the erect posture, and accumulate relatively thick and narrowly in the state in which the extraction container 9 is in the inverted posture.

In this embodiment, since the immersion type extraction in step S14 is performed in the state in which the extraction container 9 is in the erect posture, the hot water and the ground beans can be brought into contact in a wide range and the coffee liquid extraction efficiency can be improved. In this case, however, the hot water and the ground beans tend to partially contact. On the other hand, since the permeation type extraction in step S17 is performed in the state in which the extraction container 9 is in the inverted posture, the hot water passes through the accumulated ground beans while contacting more ground beans. The hot water comes into contact with the ground beans more uniformly, and the coffee liquid extraction efficiency can further be improved.

When decreasing the sectional area of the internal space of the extraction container 9 on the side of the opening 90$a$, the neck portion 90$b$ may be formed into a shape that gradually narrows (continuously tilts) up to the opening 90$a$. However, it is preferable that a portion in which the neck portion 90$b$ has a predetermined sectional area is ensured in a predetermined length in the vertical direction, as in this embodiment. Since this can almost uniform the amount of hot water passing through the ground beans per unit area, it is possible to improve the efficiency of permeation type extraction while preventing over-extraction. In addition, the sectional shape of the extraction container 9 is not limited to the cylindrical shape and may be a rectangular tubular shape. However, if the sectional shape is the cylindrical shape, as in this embodiment, the coffee liquid can be extracted more evenly.

Additionally, when inverting the extraction container 9, the hot water and the ground beans are stirred. Hence, the coffee liquid extraction efficiency can further be improved. In this embodiment, since the shoulder portion 90$d$ is formed between the trunk portion 90$e$ and the neck portion 90$b$, the ground beans can be moved smoothly from the trunk portion 90$e$ to the neck portion 90$b$ at the time of inversion.

Note that after pressure reduction, an operation of shaking the extraction container 9 may be performed for the purpose of stirring the contents in the extraction container 9. More specifically, for example, an operation of tilting and returning the posture of the extraction container 9 within the range of 30° may be repeated a plurality of times. This shaking operation may be performed before the inversion of the extraction container 9 or after the inversion.

Additionally, in this embodiment, the immersion type extraction is performed in step S14 before pressure reduction. However, the immersion type extraction may be performed after pressure reduction. In this case, the process of step S14 may be eliminated. Alternatively, the process of step S14 may also be performed, and the immersion type extraction may be performed before and after the pressure reduction.

Furthermore, in this embodiment, as the pressure reduction method in step S15, the interior of the extraction container 9 is released to the atmosphere. However, the present invention is not limited to this, and any method such as a method of connecting a container with a pressure (equal to or higher than the atmospheric pressure or equal to or lower than the atmospheric pressure) lower than the pressure in the extraction container 9 may be employed. However, the method of this embodiment is advantageous from the viewpoint of the temperature in the subsequent extraction, the temperature of the coffee beverage to be sent, the ease of pressure reduction and the pressure reduction width. The open time of the release valve 73c may be adjusted such that the pressure after the pressure reduction becomes a pressure (for example, 1.1 atm) higher than the atmospheric pressure, as a matter of course. The pressure after the pressure reduction may be set to a pressure (for example, 0.9 atm) lower than the atmospheric pressure. The pressure after the pressure reduction may be set to the atmospheric pressure, as a matter of course.

Additionally, to set the interior of the extraction container 9 to a high-temperature/high-pressure state, in this embodiment, a method of pouring hot water at a high temperature and high pressure into the extraction container is employed. However, the present invention is not limited to this. For example, a method of pouring water or hot water at a temperature lower than a desired temperature into the extraction container 9 and, after that, raising the temperature and pressure may be employed.

Referring back to FIG. 20, after the extraction processing in step S3, discharge processing in step S4 is performed. Here, processing associated with cleaning in the extraction container 9 is performed. FIG. 22 is a flowchart of the processing.

In step S21, the extraction container 9 is inverted from the inverted posture to the erect posture. Here, the plug members 903 and 913 are set in the closed state first. The holding member 801 is moved to the raised position, and the holding member 811 is moved to the lowered position. The support unit 81B is rotated. The lid unit 91 including the neck portion 90b and the filter 910 is located on the upper side. After that, the holding member 801 is returned to the lowered position, and the holding member 811 is returned to the raised position. It is possible to perform cleaning in the extraction container 9 without detaching the filter 910. In addition, it is possible to promote separation and fall of the residue of the ground beans adhered to the filter 910 from the filter 910 by a vibration at the time of inversion of the extraction container 9 or an impact at the time of completion of inversion.

In step S22, the plug member 913 is set in the open state. The solenoid valve 73f is opened for a predetermined time (for example, 2,500 ms) and closed. Tap water (pure water) is thus poured into the extraction container 9. The hot water in the water tank 72 can also be used for cleaning. However, when the hot water is consumed, continuous coffee beverage production performance degrades. For this reason, tap water (pure water) is used in this embodiment. However, the hot water in the water tank 72 or a detergent sent from a detergent tank (not shown) may be used for cleaning.

In this embodiment, a portion having a predetermined sectional outer shape exists near the end (neck portion 90b) on the side of the filter 910. For this reason, when pouring water for cleaning into the extraction container 9, the water can be poured along the wall surface of the extraction container 9, and the cleaning effect can be enhanced.

Note that the interior of the extraction container 9 may be released to the atmosphere only for a predetermined time (for example, 500 ms) before the water pouring in step S22 or before the inversion in step S21. The pressure remaining in the extraction container 9 can be released, and the water pouring in step S22 can smoothly be performed.

When the interior of the extraction container 9 is released to the atmosphere in this way, the pressure in the extraction container 9 becomes 0 atm in the gauge pressure. Hence, at the time of water pouring, the plug member 913 may automatically be set in the open state by the water pressure. In this case, the processing of setting the plug member 913 in the open state is unnecessary. When the plug member 913 is set in the open state by the water pressure, the water readily runs along the inner wall surface and the like of the extraction container 9 by the equilibrium between the water pressure and the force of returning the plug member 913 to the closed state, and the water is readily supplied to the enter interior of the extraction container 9.

In step S23, the plug member 903 is set in the open state. The selector valve 10a makes the communicating portion 810a of the operation unit 81C communicate with the waste tank T. The pipe L3, the extraction container 9 and the waste tank T are thus set in a communicating state. The solenoid valve 73b is opened for a predetermined time (for example, 1,000 ms) and closed. The pressure in the extraction container 9 is thus raised, and the water in the extraction container 9 is discharged to the waste tank T together with the residue of the ground beans. After that, the plug members 903 and 913 are set in the closed state, and the processing ends.

Since the water used for cleaning is sent from the communicating holes 901a different from the communicating holes 911a used to send a coffee beverage, the communicating holes 911a can be prevented from being contaminated.

Note that the communicating hole 901a may be larger than ten communicating hole 911a. This facilitates discharge of the residue and the like. In addition, pressure rising in the extraction container 9 may be started halfway through the water pouring in step S22. This makes it possible to more effectively discharge the water and the residue in step S23. As for the pressure rising in the extraction container 9, for example, the pressure is raised to about 5 atm (4 atm in the gauge pressure) at once, the residue can be discharged more powerfully. In addition, the water is whirled up in the extraction container 9 and supplied to every part in the extraction container 9, and the cleaning capability of the entire interior can be improved.

In addition, after the end of the process of step S23, the plug members 903 and 913 may be kept in the open state without being set in the closed state.

One coffee beverage production processing thus ends. The same processing as described above is repeated in accordance with each production instruction. The time needed for one coffee beverage production is for example, about 60 to 90 sec.

Second Embodiment

Another example of processing associated with cleaning in an extraction container 9 will be described.

<Discharge Processing>

Figure 22:
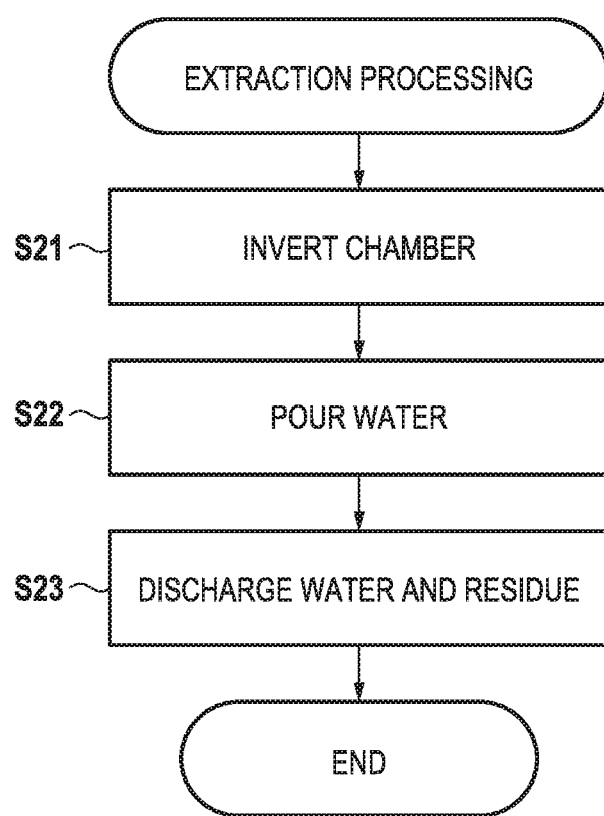
FIG. 22 is a flowchart showing an example of control executed by the control apparatus shown in FIG. 2.
Figure 25:
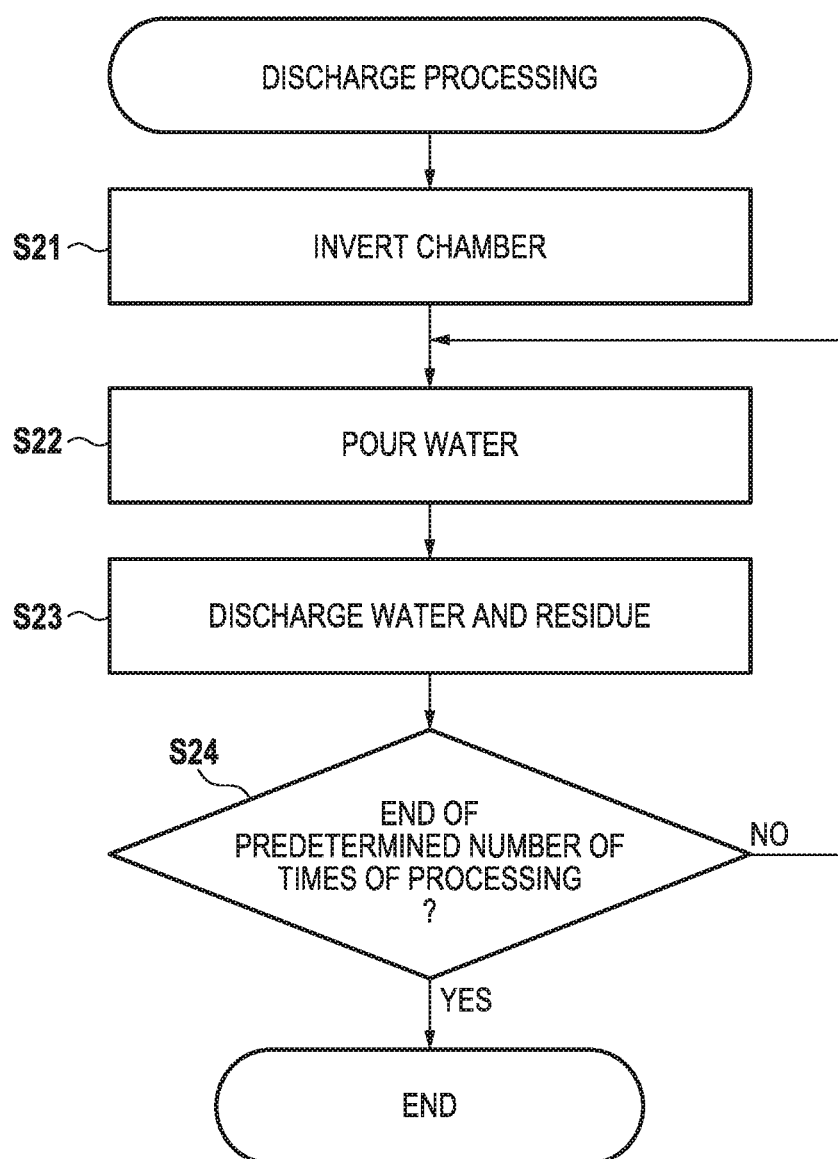
FIG. 25 is a flowchart showing an example of control executed by the control apparatus shown in FIG. 2.

In the discharge processing shown in FIG. 22, the water pouring and the water and residue discharge in steps S22 and S23 are performed only once. However, these processes may be performed a plurality of times. This makes it possible to maintain the interior of the extraction container 9 cleaner. FIG. 25 is a flowchart showing an example of discharge processing that replaces the discharge processing in FIG. 22.

The processes of steps S21 to S23 in FIG. 25 are the same as the processes of steps S21 to S23 in FIG. 22. After the process of step S23, in step S24, it is determined whether a predetermined number of times of cleaning are completed. The predetermined number of times is, for example, two. If the cleaning is not completed, the process returns to step S22, and the processes of steps S22 and S23 are executed again. If the cleaning is completed, one discharge processing ends.

Note that when repeating the processes of steps S22 and S23, the amount of water or the degree or timing of pressure rising may be changed.

In addition, at the time of water pouring in step S22, a plug member 903 may be set in a closed state. In this case, water may be stored in the extraction container 9, a plug member 913 may also be set in the closed state, and the inverting operation of the extraction container 9 may be performed once or a plurality of times. This can improve the cleaning effect in the extraction container 9. Note that when the water pouring processing in step S22 is performed a plurality of times as in the example of FIG. 25, such an inverting operation of the extraction container 9 may be performed in the second and subsequent water pouring processing. This is because a large amount of residue remains in the extraction container 9 in an initial state, and scattering of the residue in the container should be avoided.

<Re-Cleaning Processing>

Figure 26:
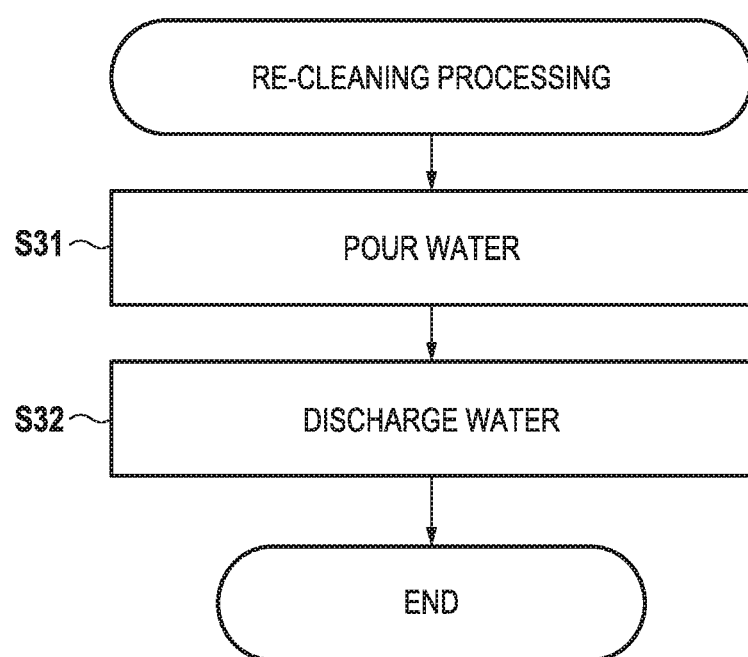
FIG. 26 is a flowchart showing an example of control executed by the control apparatus shown in FIG. 2.

The cleaning of the extraction container 9 may be performed at a timing other than after coffee liquid extraction. For example, the cleaning can be done in a standby state. Alternatively, the cleaning can be done when a user instructs it from an operation unit 12. The cleaning processing of the extraction container 9 performed at a timing other than immediately after the coffee liquid extraction is called re-cleaning processing. FIG. 26 is a flowchart showing an example of re-cleaning processing.

In step S31, water pouring processing is performed. This is the same processing as in step S22. In step S32, the water poured in step S31 is discharged. This is the same processing as in step S23. Processing of one unit thus ends.

Note that at the time of water pouring in step S31, the plug member 903 may be set in the closed state. In the discharge processing shown in FIG. 22 or 25, the plug member 903 may not be set in the closed state at the time of water pouring, and only in the re-cleaning processing shown in FIG. 26, the plug member 903 may be set in the closed state at the time of water pouring. Alternatively, in the discharge processing shown in FIG. 22 or 25 as well, the plug member 903 may be set in the closed state at the time of water pouring, but the water pouring amount may be changed between the discharge processing and the re-cleaning processing. Furthermore, the user may be able to instruct the water pouring amount from the operation unit 12.

In addition, the re-cleaning processing is basically executed in a case in which the extraction container 9 is in the erect posture. However, the re-cleaning processing may be executed after inverting the extraction container 9 to the inverted posture.

When a predetermined time elapses from the production of a coffee beverage, re-washing processing using hot water in a water tank 72 may automatically be executed. When this operation is performed, the oil component of a coffee liquid, which is cooled and solidified in the channel, can be washed away.

Third Embodiment

Another example of the arrangements of a bean processing apparatus 2 and an extracting apparatus 3 will be described. In the following explanation, the same components as in the first embodiment or components having common functions are denoted by the same reference numerals as in the first embodiment, and a description thereof will be omitted. Different components or functions will mainly be described.

In this embodiment, the extracting apparatus 3 is arranged on the lower side of the bean processing apparatus 2, as in the first embodiment, and the basic structures are common. The bean processing apparatus 2 includes a storage apparatus 4 and a grinding apparatus 5. The grinding apparatus 5 includes a grinder 5A for coarse particles, a grinder 5B for fine particles and a separation apparatus 6 that separates an unwanted substance from ground beans between the grinders.

A forming unit 6B of the separation apparatus 6 and the grinder 5B are connected by a conveyance tube 500 extending obliquely downward from the rear side to the front side. The ground beans after the unwanted substance is removed by the separation apparatus 6 are supplied to the grinder 5B through the conveyance tube 500 (substantially makes a free fall).

The grinder 5B is provided with a nozzle type sending tube 501. The ground beans finely ground by the grinder 5B are discharged through the sending tube 501. The sending tube 501 is arranged such that its outlet is located immediately above an opening 90a of a container main body 90 when the container main body 90 is located at the bean charging position. In the form shown in FIG. 27, the container main body 90 is located at the extraction position, and the outlet of the sending tube 501 is located slightly above in front of the container main body 90.

In this embodiment, the container main body 90 at the extraction position is located at a position shifted in the horizontal direction from the point immediately under the grinder 5B. For this reason, the sending tube 501 is curved to send the ground beans to the position shifted from the point immediately under the grinder 5B.

A main body portion 53 is provided with a gear 53b' that adjusts the particle size of the ground beans. The gear 53b' is operated by a particle size adjusting mechanism (not shown).

<Suction Unit>

The arrangement of a suction unit 6A will be described with reference to FIGS. 27 and 28. FIG. 28 is a vertical sectional view of the suction unit 6A. The suction unit 6A according to this embodiment is a centrifugal mechanism, like the suction unit 6A according to the first embodiment. The basic operation is also the same as in the first embodiment. That is, air in a collection container 60B is discharged upward by a blower unit 60A. Accordingly, the air containing an unwanted substance from the forming unit 6B via a connecting portion 61c turns around an exhaust stack 61b. An unwanted substance D falls by the weight of its own in the collection container 60B. When the air turns around the exhaust stack 61*b*, turning of the air and separation of the unwanted substance D are accelerated by fins 61*d*.

In this embodiment, a lower portion 62 of the collection container 60B includes a bending portion 62A on the upper side and a collecting portion 62B on the lower side, which are separably engaged. The bending portion 62A is a cylindrical body extending downward from the upper portion 61 and then bending to the front side.

The collecting portion 62B is a cylindrical body with a closed bottom, which is straight without bending, and is fitted on the lower end of the bending portion 62A. For this reason, the collecting portion 62B is attached while tilting obliquely downward from the rear side to the front side. The unwanted substance D is collected to a portion of the collecting portion 62B (accumulates on the bottom portion). To discard the unwanted substance D, the collecting portion 62B is detached from the bending portion 62A. At this time, pulling the collecting portion 62B downward to the front side suffices. Hence, the user can easily perform the detaching operation of the collecting portion 62B from the front of the apparatus.

An upper portion 61 of the collection container 60B preferably extends in the vertical direction for centrifugal separation. Since the bending portion 62A is provided, centrifugal separation performance and easy detachment of the collecting portion 62B can simultaneously be implemented.

The lower portion 62 of the collection container 60B may have a transmissive portion that makes the interior visible from the outside. Alternatively, the bending portion 62A may be a non-transmissive member, and only the collecting portion 62B may be a member with transparency. In any case, the user can visually confirm the accumulation amount of the unwanted substance D.

<Middle Unit>

Figure 29:
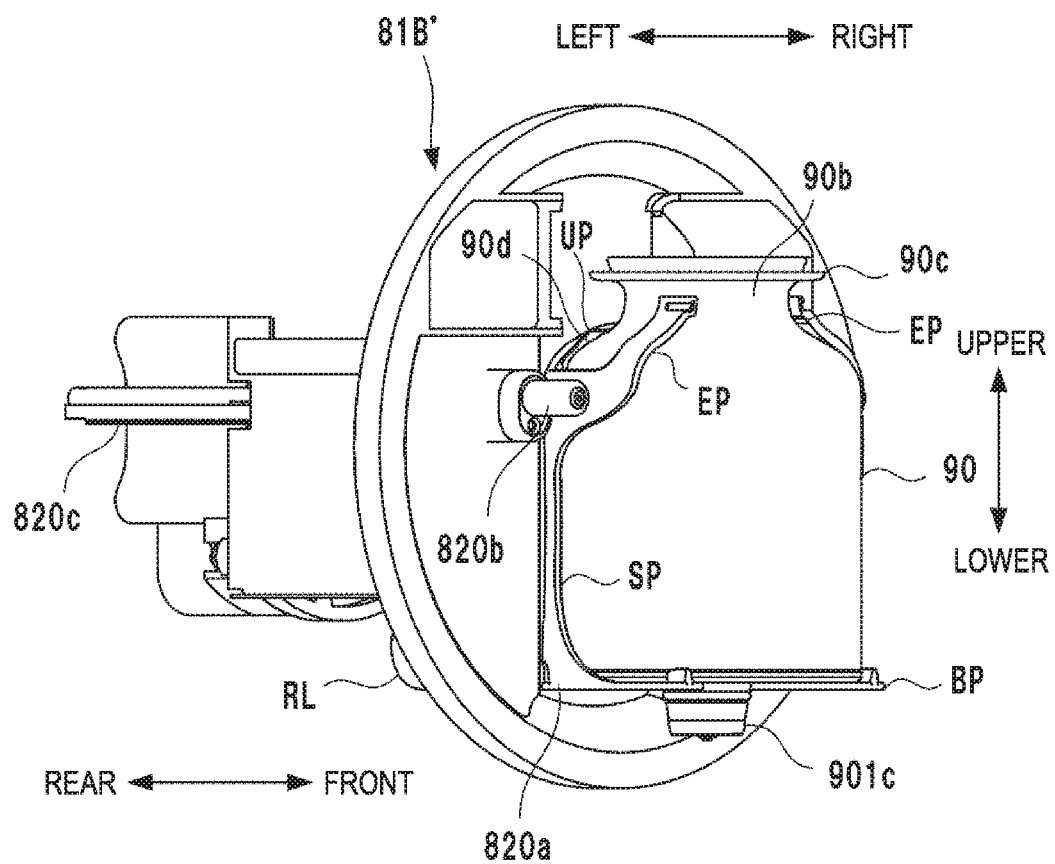
FIG. 29 is a partial perspective view of a horizontal moving mechanism.
Figure 30:
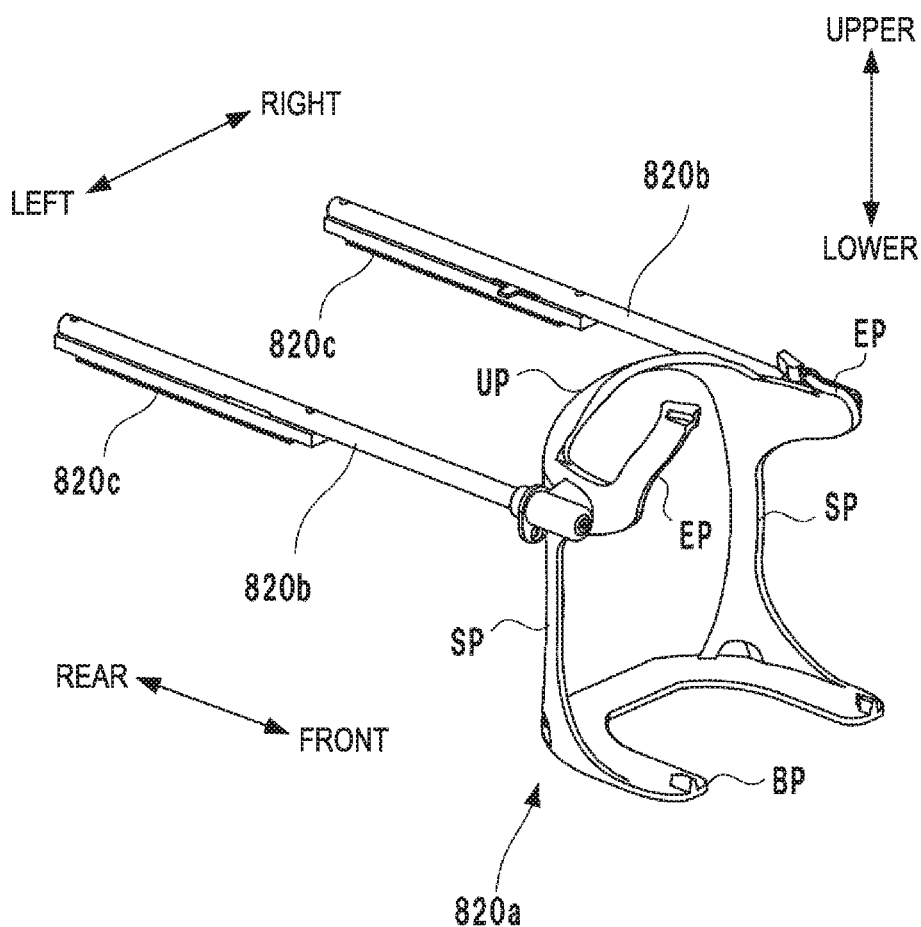
FIG. 30 is a partial perspective view of an arm member.

The arrangement of a middle unit 8B, particularly, the arrangement that moves the container main body 90 in the horizontal direction and the like will be described with reference to FIGS. 27, 29 and 30. FIG. 29 is a partial perspective view of a horizontal moving mechanism provided in the middle unit 8B. FIG. 30 is a partial perspective view of an arm member 820.

As in the first embodiment the arm member 820 includes a holding member 820*a* and a pair of shaft members 820*b* spaced apart to the left and right sides. The pair of shaft members 820*b* are guided and supported by a unit main body 81B' to be movable in the longitudinal direction. Note that in this embodiment, the number of shaft members 820*b* is two. However, the number of shaft members 820*b* may be one or may be three or more.

A rack 820*c* is provided at the rear end of each of the pair of shaft members 820*b*. A pinion driven by a motor 823 (FIG. 17) meshes with the rack 820*c*. The arm member 820 moves in the longitudinal direction when the pinion rotates. The front and rear ends of the rack 820*c* interfere with other components (for example, the disc portion of the unit main body 81B' on the front side and the like), thereby limiting the moving range. Note that in this embodiment, the arm member 820 is moved in the horizontal direction by the rack-pinion mechanism. However, another driving mechanism such as a ball screw mechanism may be used.

The holding member 820*a* is fixed to the front ends of the pair of shaft members 820*b*. As in the first embodiment, the holding member 820*a* is an elastic member made of a resin or the like and holds the container main body 90 by the elastic force. Attachment/detachment of the container main body 90 to/from the holding member 820*a* is done by a manual operation. When the container main body 90 is pressed against the holding member 820*a* rearward in the longitudinal direction, the container main body 90 is attached to the holding member 820*a*. In addition, when the container main body 90 is removed frontward in the longitudinal direction from the holding member 820*a*, the container main body 90 can be separated from the holding member 820*a*.

The holding member 820*a* forms an annular frame body integrally including a bottom portion BP, left and right side portions SP, an upper portion UP and left and right engaging portions EP. When the holding member 820*a* is formed as an annular frame body, it is possible to ensure a high strength as a whole while allowing its elastic deformation.

The bottom portion BP has a C shape open on the front side in a plan view. The container main body 90 is placed on the bottom portion BP. The left and right side portions SP are extended upward from the left and right ends of the bottom portion BP on the rear side and fixed to the front ends of the pair of shaft members 820*b*. In a state in which the container main body 90 is held, the left and right side portions SP are located on the rear side of portions of the container main body 90 right beside. The upper portion UP is formed to connect the upper ends of the left and right side portions SP, and has an arch shape projecting upward in this embodiment. In a state in which the container main body 90 is held, the upper portion UP is located on the rear side of the container main body 90 and its arch portion overlaps a shoulder portion 90*d* a little. This suppresses unintentional upward displacement of the container main body 90.

The left and right engaging portions EP extend upward on the front side from the upper ends of the left and right side portions SP and face inside a little. In a state in which the container main body 90 is held, the left and right engaging portions EP are located from the lateral sides of the container main body 90 to the front side, and their distal ends press a neck portion 90*b* from the front side. This suppresses falling of the container main body 90 from the holding member 820*a* to the front side.

As described above, the holding member 820*a* according to this embodiment is configured to facilitate visual recognition of the front side of the container main body 90 from the front in a state in which the container main body 90 is held, and the user can easily confirm the operation of the container main body 90. In addition, if the container main body 90 has a transmissive portion wholly or partially, the interior can be easily viewed from the front, and the coffee liquid extraction state can be easily visually recognized.

A roller RL is provided on the rear side of the unit main body 81B'. The roller RL is configured to slide on a circular edge provided on the main body frame when the unit main body 81B rotates. Three or four rollers RL may be provided at an interval of 120° or 90° along the circumference of the unit main body 81B'. At any rotation angle of the unit main body 81B', at least one of the rollers RL supports the weight of the unit main body 81B' by the circular edge of the main body frame. When the distance from the roller RL to the holding member 820*a* is made shorter than the distance from the portion to support on the rear side of the unit main body 81B', distortion in the vertical direction can be reduced.

<Storage Apparatus>

<Canister and Attachment/Detachment Structure Thereof (First Example)>

Figure 31:
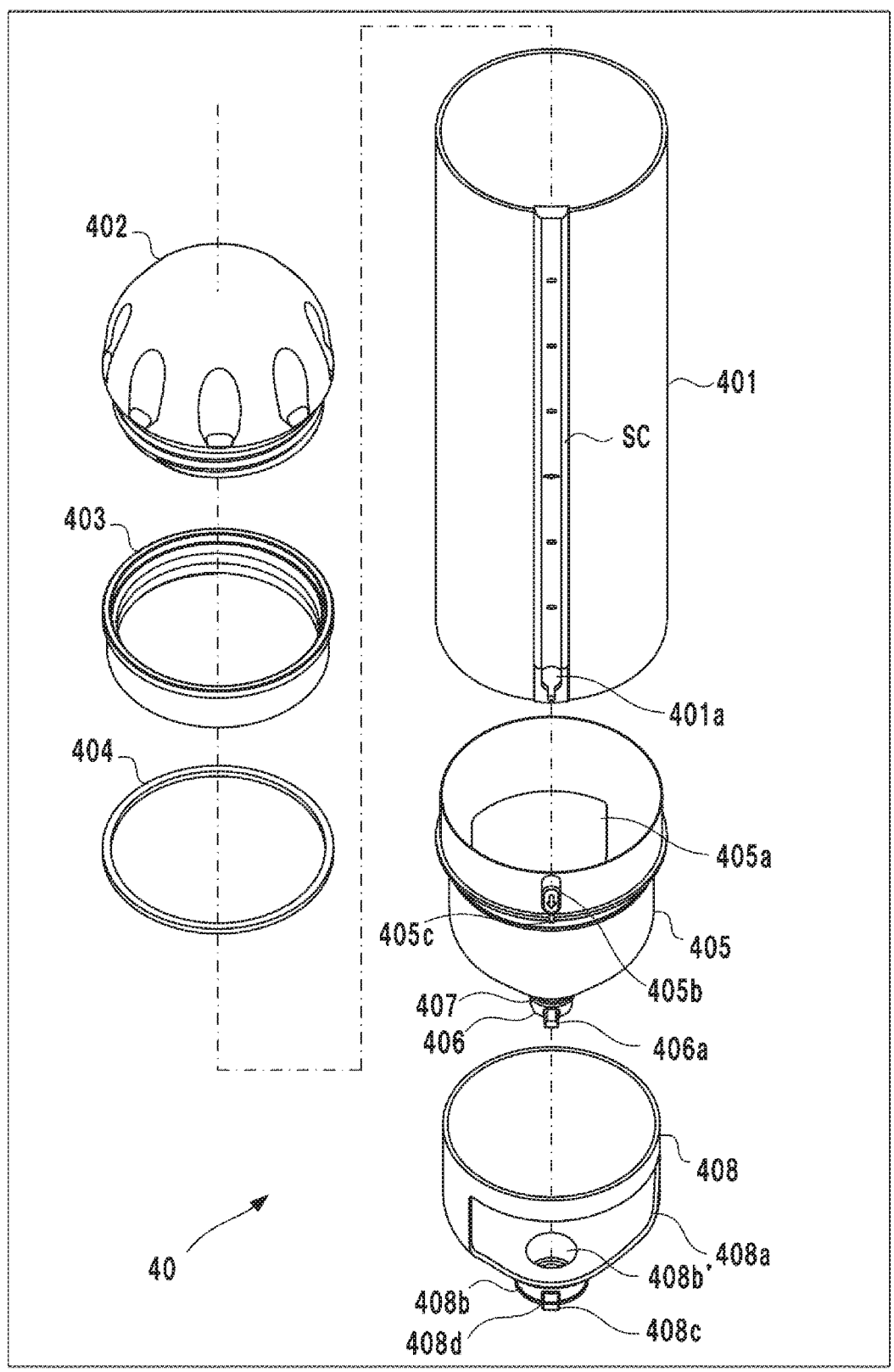
FIG. 31 is an exploded perspective view of a canister.
Figure 32:
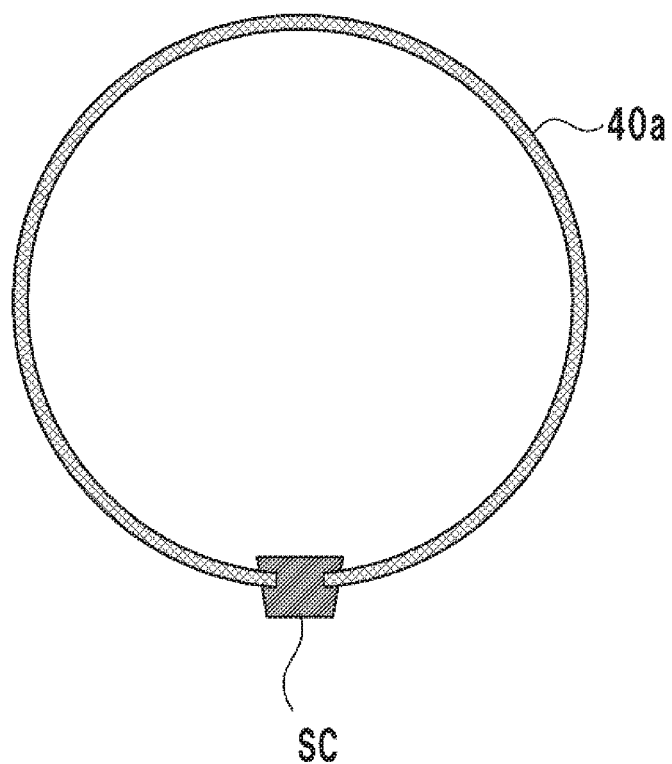
FIG. 32 is a sectional view of the tube portion of the canister.
Figure 33:
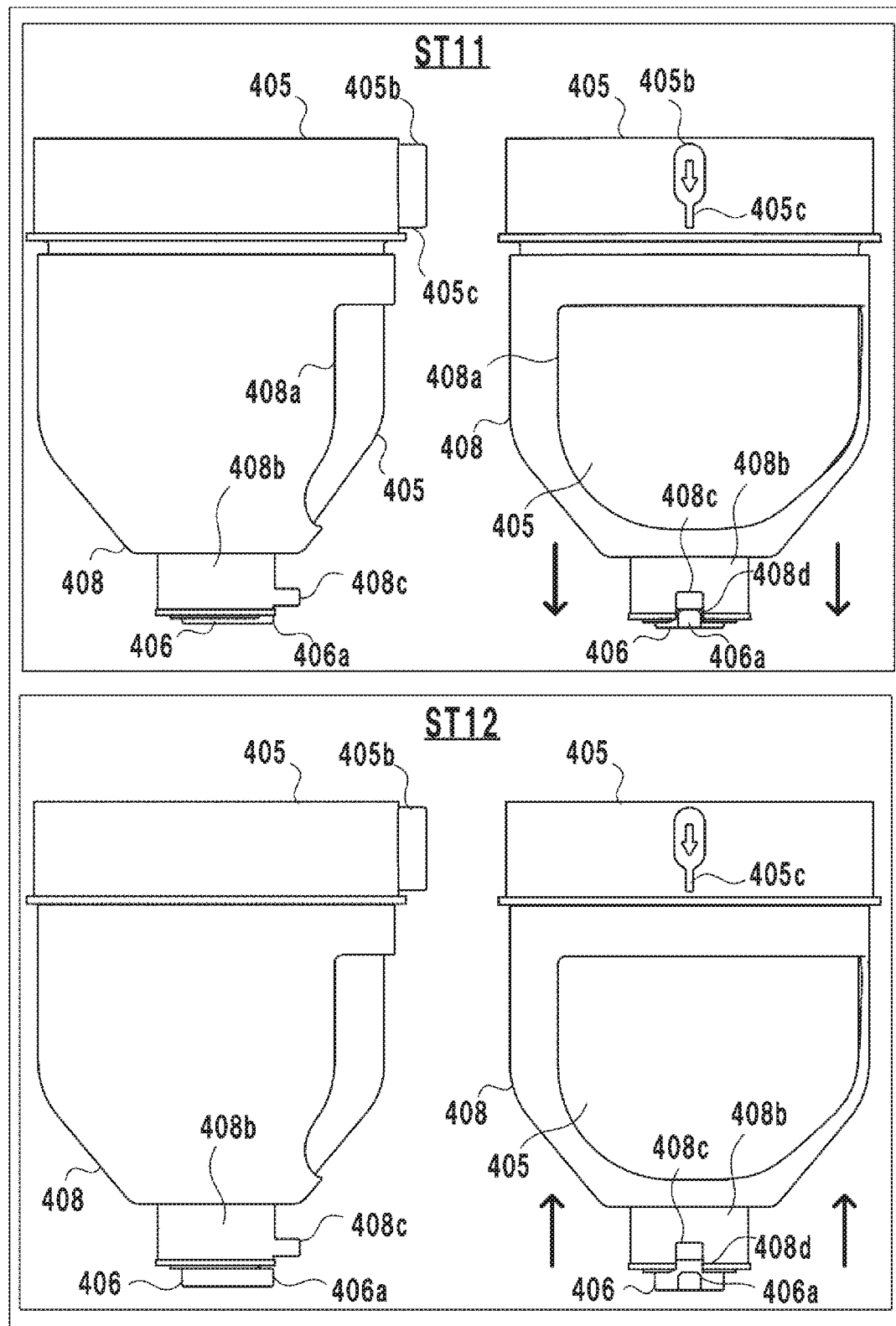
FIG. 33 is an explanatory view of the operations of the constituent components of the canister.
Figure 34:
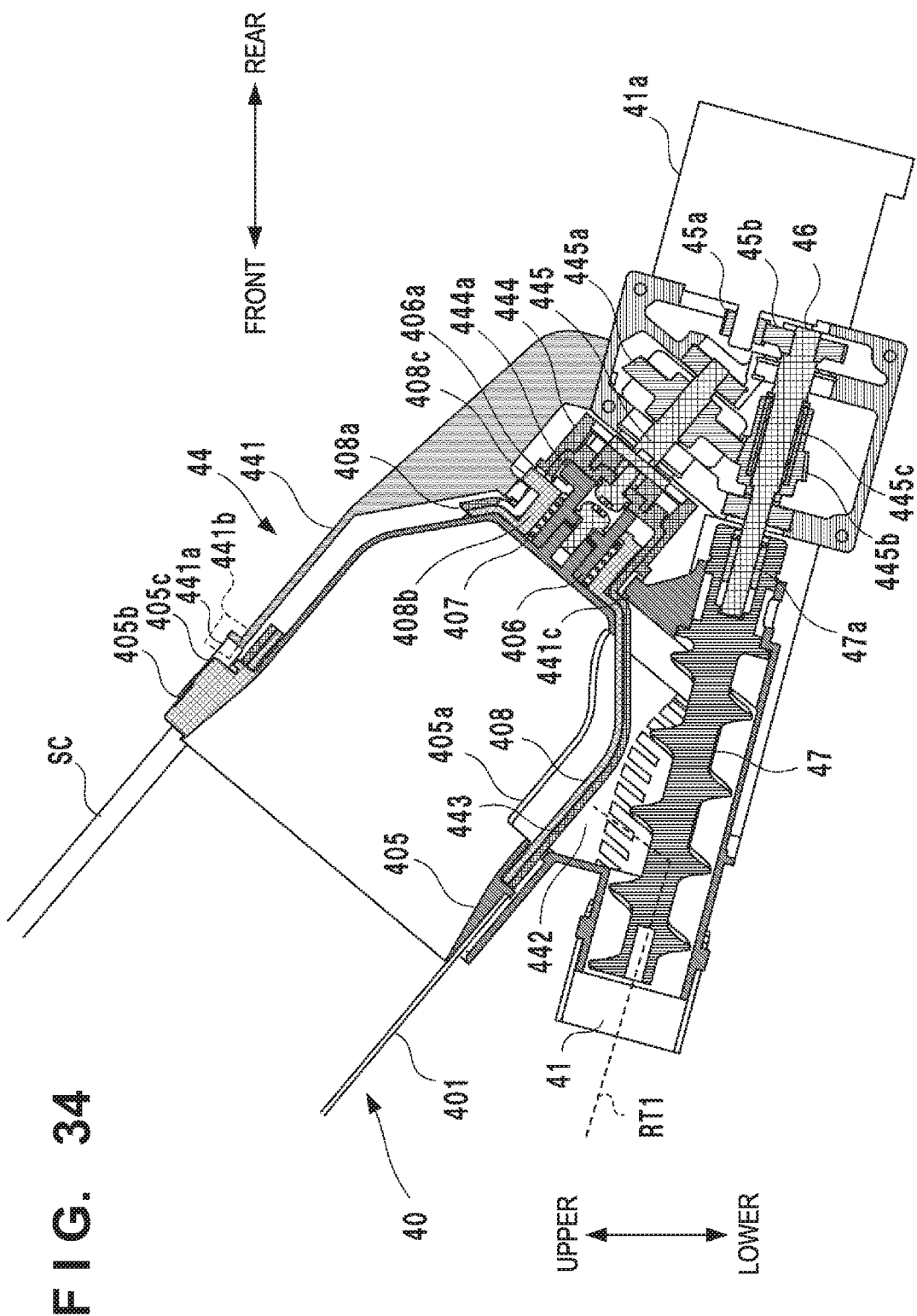
FIG. 34 is a vertical sectional view of the periphery of the canister in an attached state.

The storage apparatus 4 will be described with reference to FIGS. 27 and 31 to 34. In this embodiment, a canister 40 is configured as a cartridge detachable from a holder unit 43. With this arrangement, for example, the type of roasted coffee beans can easily and quickly be exchanged. FIG. 31 is an exploded perspective view of the canister 40. FIG. 32 is a sectional view of the tube portion of the canister 40. FIG. 33 is an explanatory view of the operations of the constituent components of the canister 40. FIG. 34 is a vertical sectional view of the periphery of the canister 40 in an attached state.

The holder unit 43 includes a plurality of attachment portions 44. One canister 40 is detachably attached to one attachment portion 44. In this embodiment, the holder unit 43 includes three attachment portions 44. Hence, three canisters 40 can be attached simultaneously. When discriminating the three canisters 40, they will be referred to as canisters 40A, 40B and 40C.

The canister 40 according to this embodiment is a long hollow bean container that stores roasted coffee beans. The canister 40 includes members such as a tube portion 401, a lid portion 402, a connecting portion 403, a packing 404, an outlet forming portion 405 and an outlet opening/closing portion 408.

The tube portion 401 has a cylindrical shape with two open ends and defines the storage space of roasted coffee beans. Both of the two ends of the tube portion 401 form ports that allow the roasted coffee beans to enter/exit. The port of the tube portion 401 at the end on the side of the lid portion 402 is a port that does not pass the roasted coffee beans when the roasted coffee beans move from the canister 40 into a beverage producing apparatus 1 (to a conveyor 41). This is a port that passes the roasted coffee beans when the lid portion 402 is opened to refill the canister with the roasted coffee beans.

In this embodiment, the tube portion 401 is formed by a member with transparency. This makes the remaining amount of stored roasted coffee beans visible from the outside. A scale SC is extended on the peripheral wall of the tube portion 401 in parallel to the axial direction. Divisions serving as a guideline for the remaining amount of roasted coffee beans are formed on the scale SC. As shown in the sectional view of FIG. 32, the scale SC also functions as a connecting portion for connecting the ends of a plate-shaped member that forms the tube portion 401.

The connecting portion 403 having a cylindrical shape is fitted in one end of the tube portion 401 via the annular packing 404. The packing 404 seals between the flange portion of the connecting portion 403 and the edge of the tube portion 401 but may be omitted. A female screw is formed in the inner circumferential surface of the connecting portion 403. A male screw to be threadably engaged with the female screw is formed in the lid portion 402 so that the lid portion 402 is detachable from the connecting portion 403. Hence, in a state in which the canister 40 is attached to the attachment portion 44, as shown in FIG. 27, it is possible to rotate and detach the lid portion 402 and refill the canister with the roasted coffee beans.

The lid portion 402 has a hemispherical shell shape and closes one end of the tube portion 401. A plurality of concave portions are formed in the outer peripheral surface of the lid portion 402 in the circumferential direction, and the user can easily rotate the lid portion 402 by placing fingers on the concave portions.

The outlet forming portion 405 is fixed to the other end of the tube portion 401 by adhesion or the like. The outlet forming portion 405 is a cup-shaped member that is open upward, and has an outlet 405a formed in the peripheral wall. The outlet 405a is a port that allows the roasted coffee beans to enter/exit. The roasted coffee beans stored in the tube portion 401 can be discharged from the outlet 405a to the outside. That is, the outlet 405a is a port that passes the roasted coffee beans when the roasted coffee beans move from the canister 40 into the beverage producing apparatus 1 (to the conveyor 41). This is a port used to supply the beans to the grinding apparatus 5.

In addition, a projecting portion 405b is formed on the outlet forming portion 405, and projects to the outside of the peripheral wall of the tube portion 401 through an opening portion 401a of the tube portion 401. A mark representing the attaching direction of the canister 40 to the attachment portion 44 is formed on the projecting portion 405b.

Furthermore, a detection piece 405c extending downward from the projecting portion 405b is formed on the outlet forming portion 405. The detection piece 405c also projects to the outside of the peripheral wall of the tube portion 401 through the opening portion 401a. The detection piece 405c is used to detect the presence/absence of attachment of the canister 40 to the attachment portion 44.

A coil spring 407 is provided on the bottom portion of the outlet forming portion 405. In addition, a fixed member 406 is assembled to the bottom portion of the outlet forming portion 405. FIG. 31 shows a state in which the fixed member 406 is assembled to the outlet forming portion 405. In fact, after the outlet opening/closing portion 408 is attached to the outlet forming portion 405, the fixed member 406 is assembled to the outlet forming portion 405 such that the outlet opening/closing portion 408 is sandwiched by the outlet forming portion 405 and the fixed member 406.

The outlet opening/closing portion 408 is a cup-shaped member that is open upward and receives the outlet forming portion 405, and forms a lid mechanism or a lid member that opens/closes the outlet 405a. An opening portion 408a is formed in the peripheral wall of the outlet opening/closing portion 408. When the opening portion 408a overlaps the outlet 405a, the outlet 405a is set in an open state. When the peripheral wall of the outlet opening/closing portion 408 overlaps the outlet 405a, the outlet 405a is set in a closed state. That is, the outlet opening/closing portion 408 is attached to the outlet forming portion 405 to be rotatable relative to the outlet forming portion 405 about the central axis of the tube portion 401. In this embodiment, the outlet opening/closing portion 408 is operated by a mechanism on the side of the attachment portion 44 (to be described later) and opens/closes the outlet 405a.

A tube portion 408b projecting downward is provided on the bottom portion of the outlet opening/closing portion 408. A space 408' inside the tube portion 408b forms a concave portion in which the coil spring 407 is arranged. The above-described fixed member 406 is assembled to the outlet forming portion 405 through the tube portion 408b. The coil spring 407 always biases the outlet opening/closing portion 408 in a direction to separate from the outlet forming portion 405.

A projection 408c is formed on the periphery of the tube portion 408b, and a notch 408d with which a pawl portion 406a formed on the fixed member 406 engages is formed on the lower side of the projection 408c.

The rotation restriction state and the rotation permission state of the outlet opening/closing portion 408 will be described with reference to FIG. 33. FIG. 33 shows a state in which the outlet forming portion 405, the outlet opening/closing portion 408 and the fixed member 406 are assembled.

A state ST11 shows views of the outlet forming portion 405, the outlet opening/closing portion 408 and the like viewed from two directions in a state in which the canister 40 is not attached to the attachment portion 44. The pawl portion 406a engages with the notch 408d, and the rotation of the outlet opening/closing portion 408 relative to the outlet forming portion 405 about the central axis of the tube portion 401 is restricted. The outlet 405a is in the closed state. By biasing of the coil spring 407, the outlet forming portion 405 is biased in a direction to separate from the outlet opening/closing portion 408, as indicated by arrows. The engagement between the notch 408d and the pawl portion 406a is thus firmly maintained. The notch 408d and the pawl portion 406a thus function as a restriction mechanism that restricts opening of the outlet 405a by the outlet opening/closing portion 408 in a case in which the canister 40 is not attached to the attachment portion 44.

A state ST12 shows views of the outlet forming portion 405, the outlet opening/closing portion 408 and the like viewed from two directions in a state in which the canister 40 is attached to the attachment portion 44. The attachment portion 44 is provided with an abutment portion (a shutter portion 443 to be described later) that abuts against the outlet opening/closing portion 408. When the canister 40 is attached to the attachment portion 44, the outlet opening/closing portion 408 relatively displaces to the side of the outlet opening/closing portion 408 against the biasing of the coil spring 407, as indicated by arrows.

Accordingly, the notch 408d separates from the pawl portion 406a, and the engagement between them is canceled. The rotation of the outlet opening/closing portion 408 relative to the outlet forming portion 405 about the central axis of the tube portion 401 is permitted. In the state ST12 shown in FIG. 33, the outlet 405a is in the closed state. However, the outlet 405a can be set in the open state by rotating the outlet opening/closing portion 408.

FIG. 34 is a vertical sectional view including a peripheral structure in a state in which the canister 40 is attached to the attachment portion 44. The attachment portion 44 includes a cup-shaped main body portion 441 into which an end of the canister 40 is inserted. The main body portion 441 is open upward on the front side where the end of the tube portion 401, the outlet forming portion 405 and the outlet opening/closing portion 408 of the canister 40 are stored. The rear side of the main body portion 441 is formed into a lattice shape (rib shape).

A groove 441a with which the projecting portion 405b engages is formed in the edge of the peripheral wall of the main body portion 441. A sensor 441b that detects the detection piece 405c is arranged next to the groove 441a. The sensor 441b is, for example, a photointerrupter. When the sensor 441b detects the detection piece 405c, a processing unit 11a recognizes that the canister 40 is attached. If the sensor 441b does not detect the detection piece 405c, the processing unit 11a recognizes that the canister 40 is not attached.

A receiving portion 442 that receives the roasted coffee beans from the canister 40 is formed on the peripheral wall of the main body portion 441. In this embodiment, the receiving portion 442 is an opening communicating with the interior of the conveyor 41. The roasted coffee beans discharged from the outlet 405a of the canister 40 are guided to the conveyor 41 via the receiving portion 442.

The shutter portion 443 that is a cup-shaped member fitting the outer shape of the outlet opening/closing portion 408 is provided in the main body portion 441. In the main body portion 441, the shutter portion 443 is supported to be rotatable about the central axis of the canister 40 and opens/closes the receiving portion 442. In this embodiment, a plurality of rollers 441d are arranged in the circumferential direction on the peripheral wall of the main body portion 441 (see FIG. 27). Openings that expose the rollers 441d to the inside are formed in the peripheral wall of the main body portion 441. The rollers 441d are supported to be rotatable about axes parallel to the radial direction of the canister 40. The shutter portion 443 has the outer peripheral surface abutting against the plurality of rollers 441d inside the main body portion 441 and is rotatably supported.

When the canister 40 is not attached, the shutter portion 443 closes the receiving portion 442 and prevents a foreign substance from entering the conveyor 41. FIG. 34 shows a state in which the shutter portion 443 closes the receiving portion 442. After the canister 40 is attached, the receiving portion 442 can be opened by driving a motor 41a and rotating the shutter portion 443.

The shutter portion 443 is attached to a rotating member 444. The rotating member 444 is rotated by operating the outlet opening/closing portion 408 to open/close the outlet 405a. The rotating member 444 is connected to a drive shaft 445. The drive shaft 445 is one element that is arranged to be located on the same axis as the central axis of the canister 40 when the canister 40 is attached and transmits the driving force of the motor 41a to the rotating member 444. The rotating member 444 is a cylindrical member open upward on the front side. A groove 444a is formed in the edge of the peripheral wall of the rotating member 444. The projection 408c of the outlet opening/closing portion 408 engages with the groove 444a. By the engagement, when the rotating member 444 is rotated, the outlet opening/closing portion 408 also rotates, and opens/closes the outlet 405a. FIG. 34 shows a state in which the outlet opening/closing portion 408 sets the outlet 405a in the closed state.

With the above arrangement, the state of the storage apparatus 4 can be switched by the rotation of the rotating member 444 between a state (the state shown in FIG. 34, which is called a closed state) in which the shutter portion 443 closes the receiving portion 442, and the outlet opening/closing portion 408 sets the outlet 405a in the closed state and a state (a state in which the roasted coffee beans are supplied into the apparatus, which is called an open state) in which the shutter portion 443 opens the receiving portion 442, and the outlet opening/closing portion 408 sets the outlet 405a in the open state. When the rotation position of the shutter portion 443 is detected by a sensor (not shown), the processing unit 11a can recognize these states (feedback control). As another example, a stepping motor may be used as the motor 41a, and recognition and switching of the state of the storage apparatus 4 may be done by the control amount (number of steps) (open loop control).

A bevel gear 445a is provided on the drive shaft 445. The bevel gear 445a meshes with a bevel gear 445b provided on a drive shaft 46.

The drive shaft 46 is provided with a gear 45b that meshes with a pinion gear 45a provided on the output shaft of the motor 41a, and rotated by driving of the motor 41a. A one-way clutch 445c intervenes between the drive shaft 46 and the bevel gear 445b. The one-way clutch 445c transmits only rotation of the drive shaft 46 in one direction to the bevel gear 445b. That is, when the motor 41a is rotated in one direction, the driving force of the motor 41a is transmitted to the rotating member 444 via the path of the bevel gear 445b, the bevel gear 445a, and the drive shaft 445. However, when the motor 41a is rotated in the other direction, the driving force is not transmitted.

The conveyor 41 is a conveyance mechanism that conveys the roasted coffee beans from the canister 40. In this embodiment, the conveyor 41 is provided not on the side of the canister 40 but on the side of the attachment portion 44. That is, the conveyor 41 is provided to remain on the side of the attachment portion 44 when the canister 40 is detached from the attachment portion 44. An arrangement that integrates the canister 40 and the conveyor 41 can also be employed. However, if they are formed as separate members, as in this embodiment, the canister 40 can be simplified and made lightweight.

The screw shaft of the conveyor 41 is connected to the drive shaft 46 via a one-way clutch 47a. The driving transmission direction of the one-way clutch 47a is reverse to that of the one-way clutch 445c. That is, when the motor 41a is rotated in the other direction, the driving force of the motor 41a is transmitted to a screw shaft 47, and the roasted coffee beans are conveyed. However, when the motor 41a is rotated in one direction reverse to the other direction, the driving force is not transmitted.

In this embodiment, the rotation direction of the motor 41a is switched between forward rotation and reverse rotation, thereby exclusively performing the rotation of the rotating member 444 (that is, the rotation of the shutter portion 443 and the outlet opening/closing portion 408) and the rotation of the screw shaft 47.

An example of control of the processing unit 11a concerning attachment and detachment of the canister 40 will be described. When the user attaches the canister 40 to the attachment portion 44, the sensor 441b detects this. The processing unit 11a drives the motor 41a to set the shutter portion 443 and the outlet opening/closing portion 408 in the open state. The projection 408c engages with a stopper 441c provided on the inner circumferential wall of the main body portion 441 in the axial direction of the canister 40, so the canister 40 does not fall from the attachment portion 44 even if the user takes the hand off. In other words, the projection 408c functions as a restricting portion that restricts detachment of the canister 40 from the attachment portion 44 in a case in which the outlet opening/closing portion 408 opens the outlet 405a. This makes it possible to prevent the canister 40 from being detached to cause the roasted coffee beans in the canister 40 to spill out in a state in which the outlet 405a is kept open.

Since the shutter portion 443 and the outlet opening/closing portion 408 are set in the open state, the roasted coffee beans in the canister 40 are introduced into the conveyor 41 via the receiving portion 442. The processing waits in this state.

When producing a coffee beverage, the motor 41a is driven to rotate and stop the screw shaft 47. The roasted coffee beans are thus conveyed to a collective conveyance path 42. The amount of roasted coffee beans to be used to produce the coffee beverage is automatically calculated by the rotation amount of the screw shaft 47. When producing a coffee beverage by blending a plurality of types of roasted coffee beans in one coffee beverage production, the ratio of conveyance amounts to the collective conveyance path 42 by the conveyors 41 may be changed between the canisters 40. Accordingly, ground beans in which the plurality of types of roasted coffee beans are blended can be supplied to the extraction container 9.

When exchanging the canister 40, the user inputs an exchange instruction from an operation unit 12. The processing unit 11a drives the motor 41a to return the shutter portion 443 and the outlet opening/closing portion 408 to the closed state. The user can detach the canister 40 from the attachment portion 44.

<Canister and Attachment/Detachment Structure Thereof (Second Example)>

The canister 40 and the attachment portion 44 according to the second example, which are partially different from the canister 40 and the attachment portion 44 according to the first example described with reference to FIGS. 31 to 34, will be described with reference to FIGS. 35 to 47. In the components of the second example, the same components as in the first example or components having common functions are denoted by the same reference numerals as in the first example, and a description thereof will be omitted. Different components or functions will mainly be described.

Figure 35:
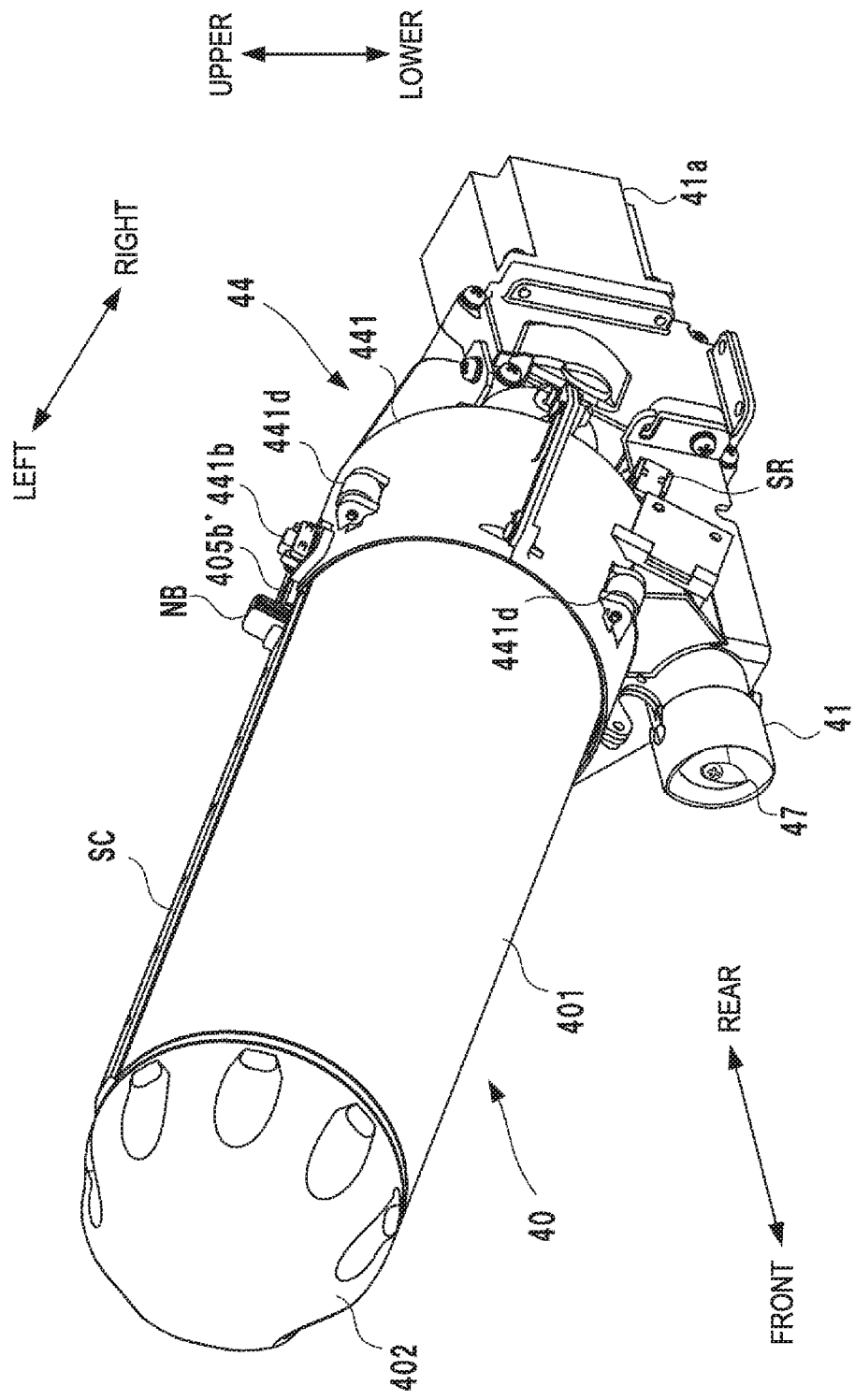
FIG. 35 is a perspective view of the periphery of a canister according to another example in the attached state.
Figure 36:
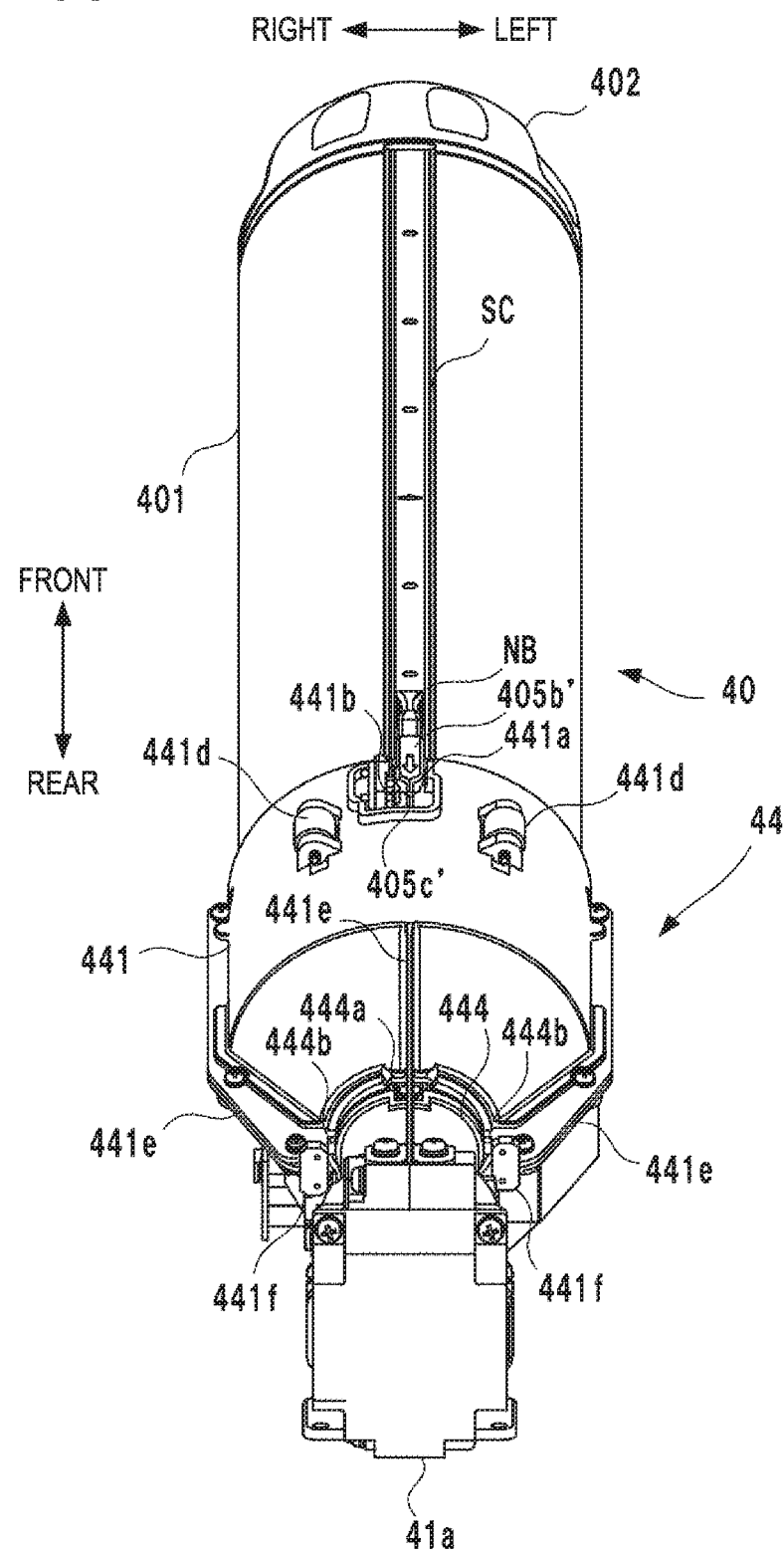
FIG. 36 is a view showing the periphery of the canister according to another example viewed from the upper side in the attached state.
Figure 37:
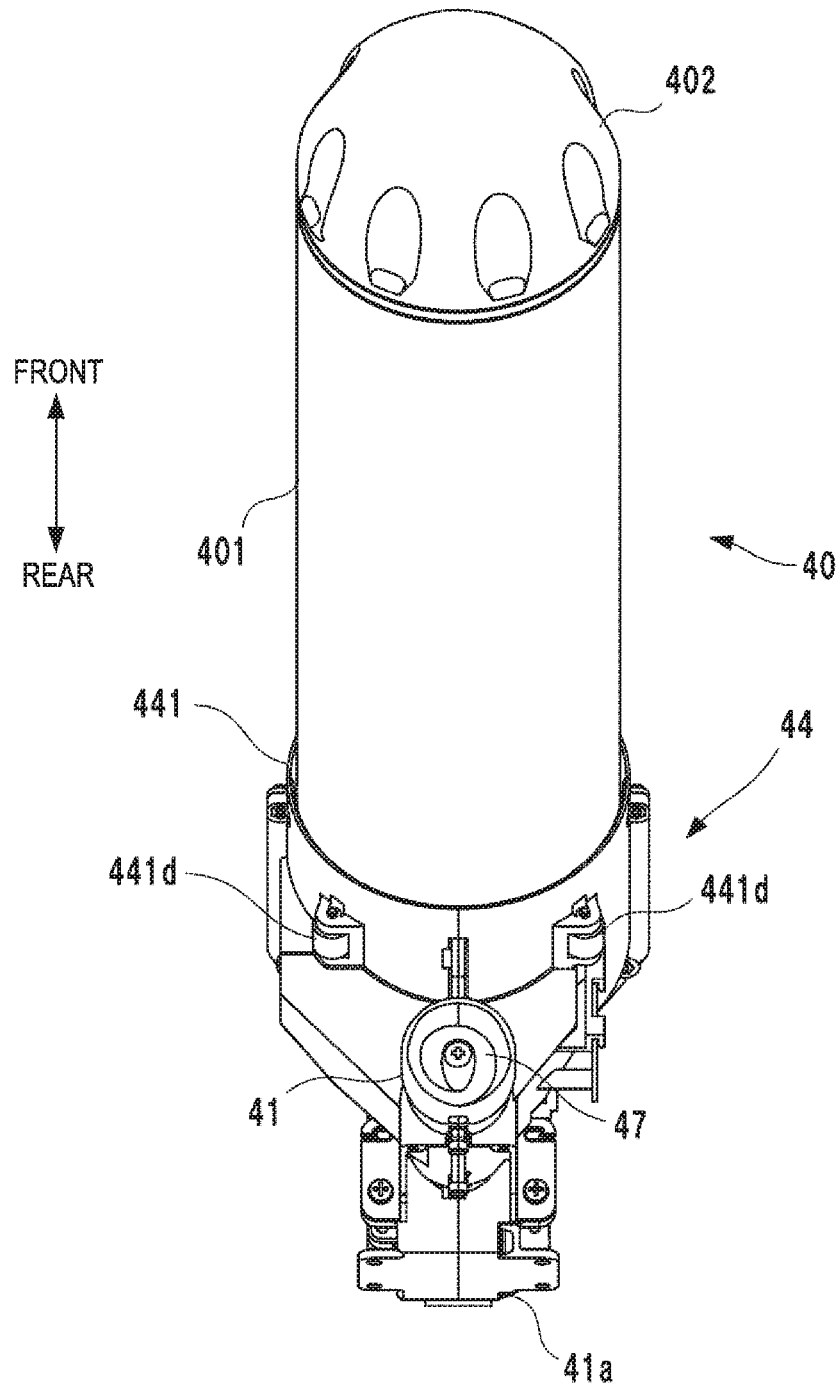
FIG. 37 is a view showing the periphery of the canister according to another example viewed from the lower side in the attached state.

FIGS. 35 to 37 are views showing the outer appearance of the canister 40 and the attachment portion 44 according to the second example viewed from multiple directions. The rear side of the main body portion 441 of the attachment portion 44 according to the first example is formed into a lattice shape (rib shape), as described above. The main body portion 441 according to the second example also has the same arrangement, and the structure is understood from FIG. 36 and the like. The rear side of the main body portion 441 is formed by a plurality of ribs 441e, and the rotating member 444 and the like on the inner side are visible.

The rotating member 444 includes two detection pieces 444b spaced apart by 180° in the circumferential direction. Two sensors 441f such as photointerrupters are provided. They detect the two detection pieces 444b. The processing unit 11a recognizes the rotation position of the rotating member 444 based on the detection results of the sensors 441f. That is, the processing unit 11a recognizes whether the shutter portion 443 and the outlet opening/closing portion 408 described in the first example are in the closed state or open state.

Figure 38:
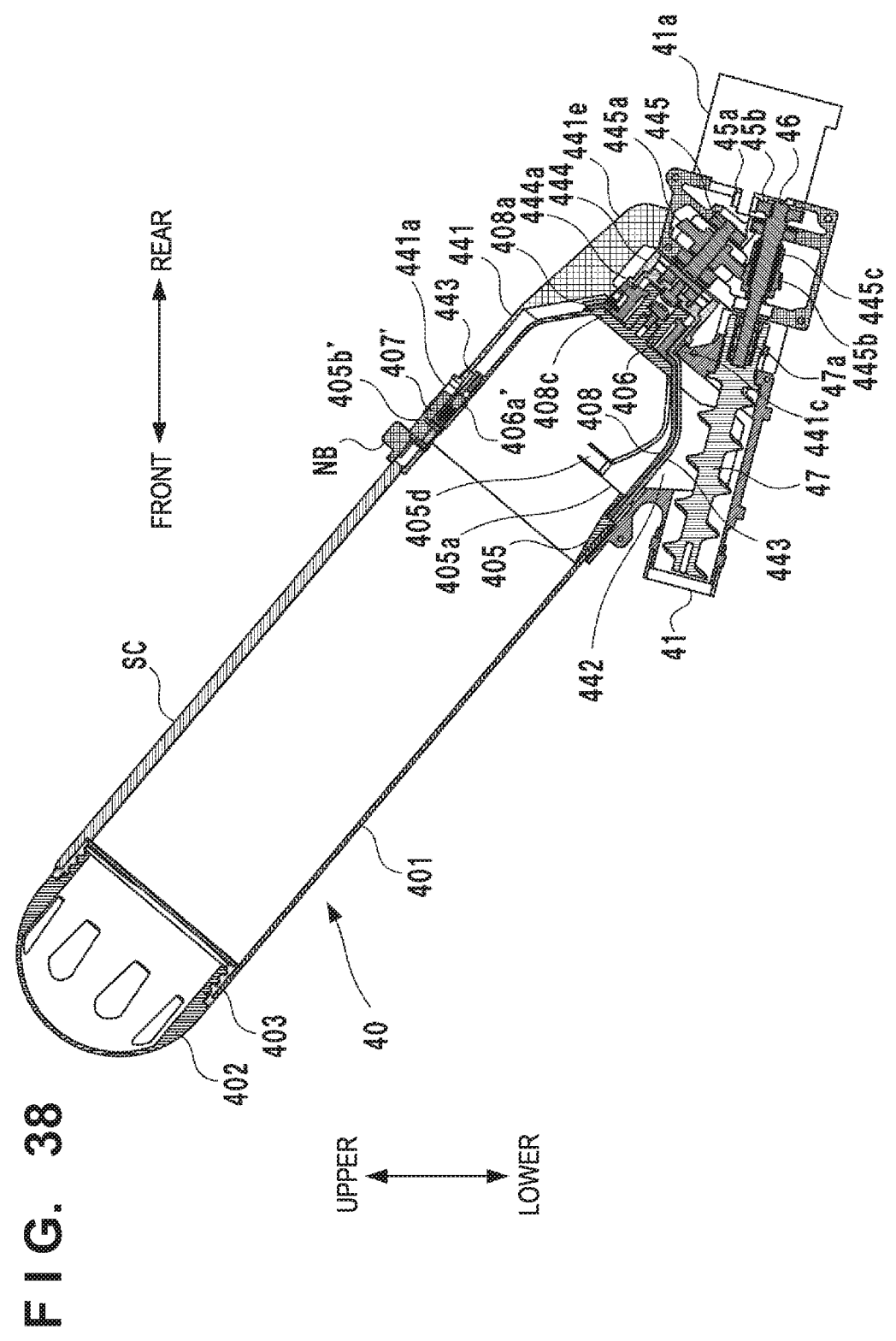

FIG. 38 is a vertical sectional view including the peripheral structure in a state in which the canister 40 is attached to the attachment portion 44. The structure of the second example is basically the same as that of the first example except that at the edge of the outlet 405a, an elastic deforming portion 405d is formed in the peripheral wall of the outlet forming portion 405. The elastic deforming portion 405d is a portion formed by forming parallel slits in the peripheral wall of the outlet forming portion 405 from the edge of the outlet 405a and is configured to be deformed more readily than the peripheral portion. The function of the elastic deforming portion 405d will be described later.

Figure 39:
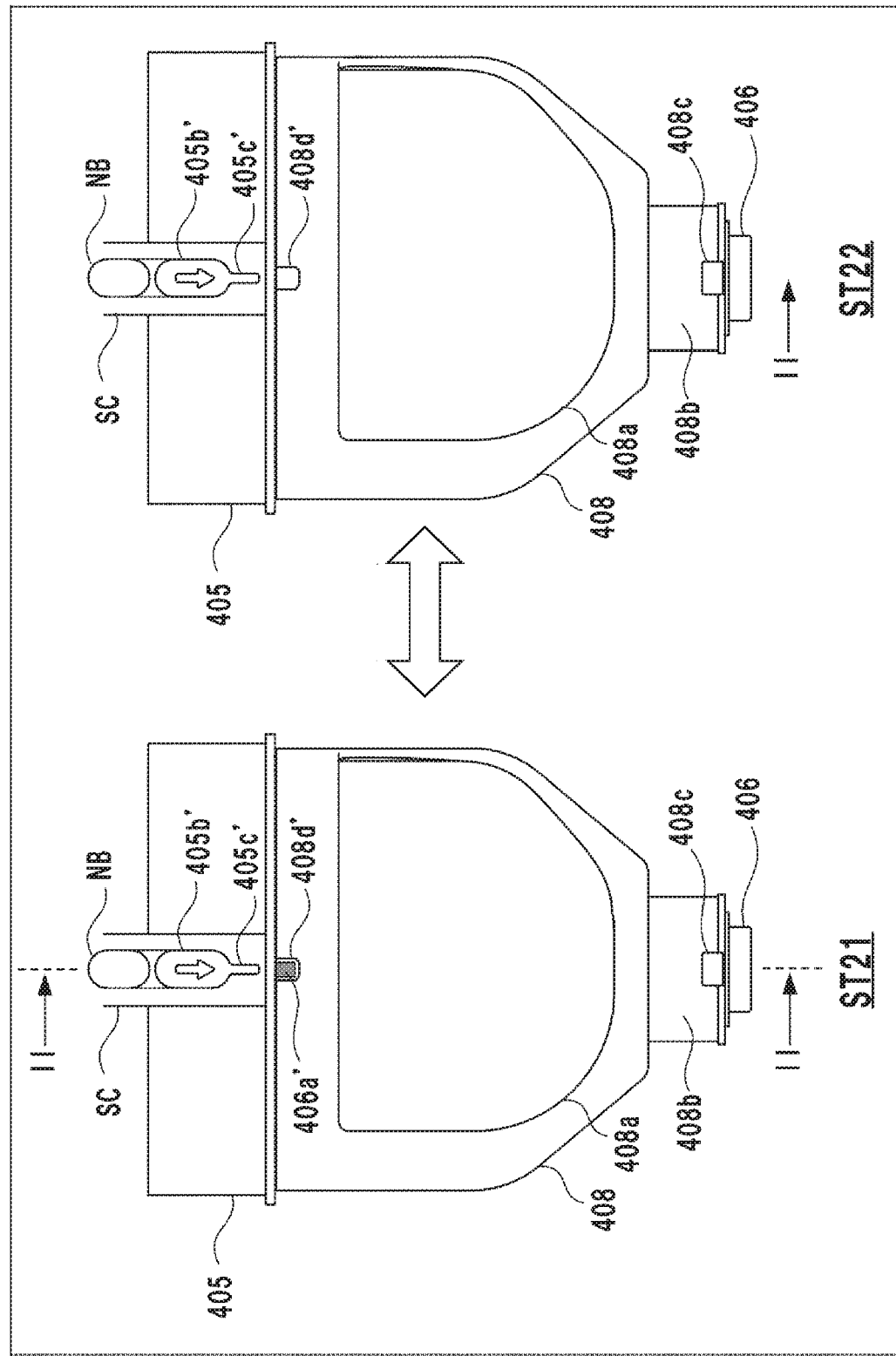
FIG. 39 is an explanatory view of the operations of the constituent components of the canister according to another example.
Figure 40:
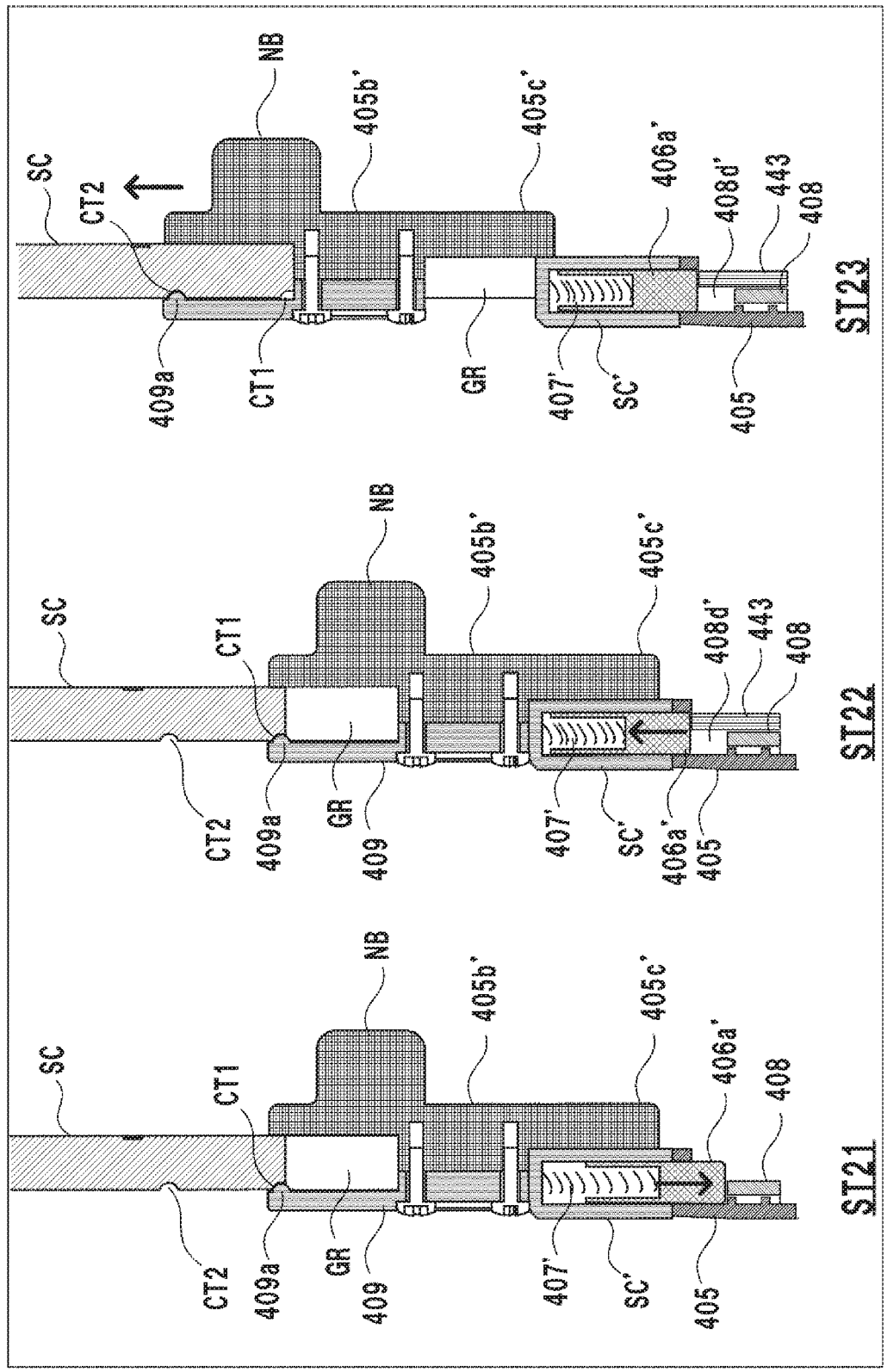
FIG. 40 is an explanatory view of the operations of the constituent components of the canister according to another example.

The second example is different from the first example in the arrangement associated with rotation restriction and rotation permission of the outlet opening/closing portion 408. This point will be described with reference to FIGS. 39 and 40. A state ST1 shown in FIG. 39 represents a case in which the outlet opening/closing portion 408 is in a rotation restriction state, and a state ST22 shown in FIG. 39 represents a case in which the outlet opening/closing portion 408 is in a rotation permission state. FIG. 40 shows sectional views taken along a line II-II in FIG. 39. The states ST21 and ST22 in FIG. 40 correspond to steps ST21 and ST22 in FIG. 39.

In the second example, the coil spring 407 of the outlet forming portion 405 and the pawl portion 406a of the fixed member 406 in the first example are not provided. The outlet opening/closing portion 408 is not be relatively displaced in the axial direction of the tube portion 401 with respect to the outlet forming portion 405 and can only relatively rotate about the axis.

A scale SC of the second example includes a groove GR, and a slider 409 is assembled in it. The slider 409 is formed by fastening the member on the obverse side and the member on the reverse side of the scale SC by two bolts and can slide along the groove GR in the longitudinal direction of the scale SC. As components corresponding to the projecting portion 405b and the detection piece 405c of the first example, the slider 409 includes a projecting portion 405b' and a detection piece 405c'. The slider 409 also includes a grip portion NB that the user grips by fingers.

The slider 409 includes a convex portion 409a that can engage with one of concave portions CT1 and CT2 formed on the scale SC. The slider 409 can slide between a first position at which the convex portion 409a engages with the concave portion CT1 and a second position at which the convex portion 409a engages with the concave portion CT2. The state ST21 or ST22 represents a state in which the slider 409 is located at the first position, and a state ST23 shown in FIG. 40 represents a state in which the slider 409 is located at the second position. The slider 409 is basically located at the first position and manually slid to the second position at the time of roasted coffee bean biting cancel to be described later.

A tubular support portion SC' that is open to the side of the outlet forming portion 405 is fixed to the end of the scale SC according to the second example. A coil spring 407' and a movable member 406a', which replace the coil spring 407 and the pawl portion 406a according to the first example, are supported by the support portion SC'. A notch 408d' that replaces the notch 408d according to the first example is formed at the edge of the outlet opening/closing portion 408. As shown in the state ST21, when the movable member 406a' engages with the notch 408d', the rotation of the outlet opening/closing portion 408 relative to the outlet forming portion 405 about the central axis of the tube portion 401 is restricted. At this time, the outlet 405a is in the closed state. The movable member 406a' is always biased by the coil spring 407' to the side of the notch 408d'. The engagement between the notch 408d' and the movable member 406a' is thus firmly maintained. The notch 408d' and the movable member 406a' thus function as a restriction mechanism that restricts opening of the outlet 405a by the outlet opening/closing portion 408 in a case in which the canister 40 is not attached to the attachment portion 44.

When the canister 40 is attached to the attachment portion 44, as shown in the state ST22, the movable member 406a' abuts against the edge of the shutter portion 443 and is pressed into the support portion SC' against the biasing of the coil spring 407'. Accordingly, the engagement between the movable member 406a' and the notch 408d' is canceled, and the rotation of the outlet opening/closing portion 408 relative to the outlet forming portion 405 about the central axis of the tube portion 401 is permitted.

An example of control of the processing unit 11a concerning attachment and detachment of the canister 40 in the second example will be described mainly with reference to FIGS. 38 to 41. When the user attaches the canister 40 to the attachment portion 44, the movable member 406a' abuts against the edge of the shutter portion 443, and accordingly, the engagement between the movable member 406a' and the notch 408d' is canceled (a state of the state ST22).

Figure 41:
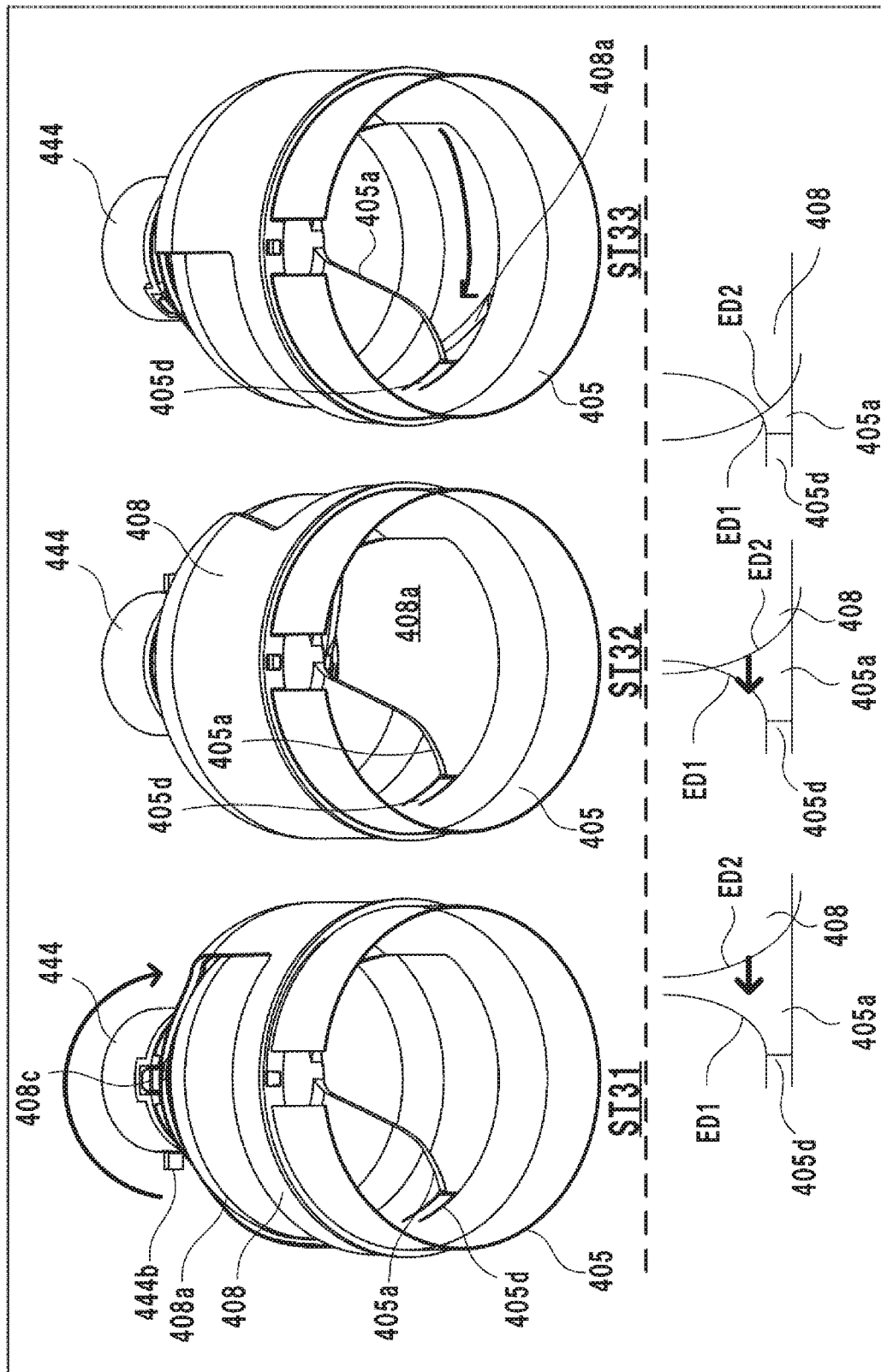
FIG. 41 is an explanatory view of the operations of the constituent components of the canister according to another example.

The attachment of the canister 40 is detected by the sensor 441b. The processing unit 11a drives the motor 41a to set the shutter portion 443 and the outlet opening/closing portion 408 in the open state. A state ST31 shown in FIG. 41 represents a case in which the outlet opening/closing portion 408 is in the closed state, and a state ST32 shows a case in which the outlet opening/closing portion 408 shifts from the state ST31 to the open state.

When the shutter portion 443 and the outlet opening/closing portion 408 are set in the open state, the projection 408c engages with the stopper 441c provided on the inner circumferential wall of the main body portion 441 in the axial direction of the canister 40, so the canister 40 does not fall from the attachment portion 44 even if the user takes the hand off. In other words, the projection 408c functions as a restricting portion that restricts detachment of the canister 40 from the attachment portion 44 in a case in which the outlet opening/closing portion 408 opens the outlet 405a. This makes it possible to prevent the canister 40 from being detached to cause the roasted coffee beans in the canister 40 to spill out in a state in which the outlet 405a is kept open.

Since the shutter portion 443 and the outlet opening/closing portion 408 are set in the open state, the roasted coffee beans in the canister 40 are introduced into the conveyor 41 via the receiving portion 442. The processing waits in this state.

When producing a coffee beverage, the motor 41a is driven to rotate and stop the screw shaft 47. The roasted coffee beans are thus conveyed to the collective conveyance path 42. The amount of roasted coffee beans to be used to produce the coffee beverage is automatically calculated by the rotation amount of the screw shaft 47.

A remaining bean amount detection sensor SR is provided at the base of the receiving portion 442. The remaining bean amount detection sensor SR is, for example, a transmissive sensor (photointerrupter). When the absence of beans is detected at this position, and coffee beverage production is performed a predetermined number of times (for example, twice) after that, the user may be notified that the canister 40 is empty.

When exchanging the canister 40, for example, the user inputs an exchange instruction from the operation unit 12. The processing unit 11a drives the motor 41a to return the shutter portion 443 and the outlet opening/closing portion 408 to the closed state. A state ST33 shown in FIG. 41 represents a state in which the outlet opening/closing portion 408 is returning from the state ST32 to the closed state.

When the shutter portion 443 and the outlet opening/closing portion 408 are set in the closed state, the engagement between the projection 408c and the stopper 441c is canceled, and the user can detach the canister 40 from the attachment portion 44. When the canister 40 is detached from the attachment portion 44, the movable member 406a' engages with the notch 408d' again by the biasing of the coil spring 407' (a state of the state ST21). Accordingly, the rotation of the outlet opening/closing portion 408 relative to the outlet forming portion 405 about the central axis of the tube portion 401 is restricted again, and the roasted coffee beans remaining in the canister 40 are prevented from unintentionally spilling out from the outlet 405a.

<Measure Against Biting>

When returning the shutter portion 443 and the outlet opening/closing portion 408 from the open state to the closed state, the degree of exposure (opening area) of the outlet 405a gradually decreases as it overlaps the peripheral wall of the outlet opening/closing portion 408. The view on the lower side of the broken line in FIG. 41 shows a change in the degree of exposure of the outlet 405a in the process of returning the outlet opening/closing portion 408 from the open state to the closed state.

An edge ED1 of the peripheral wall of the outlet forming portion 405, which defines the outlet 405a, and an edge ED2 of the peripheral wall of the outlet opening/closing portion 408, which defines the opening portion 408a are formed into shapes that project in directions to face each other and make the width of the outlet 405a larger on the side of the tube portion 401. With this structure, the roasted coffee beans located between the edge ED1 and the edge ED2 are readily pushed to the side of the tube portion 401, and biting of beans hardly occurs at a plurality of points. Note that the edges ED1 and ED2 may have not the projecting shapes but linear shapes and make the width of the outlet 405a larger on the side of the tube portion 401.

An end of the edge ED1 is formed by the elastic deforming portion 405d. For this reason, if the roasted coffee beans are going to be bitten between the elastic deforming portion 405d and the edge ED2 immediately before the outlet 405a is closed, the elastic deforming portion 405d is deformed to readily flip the beans. This can further prevent biting of the roasted coffee beans.

Figure 42:
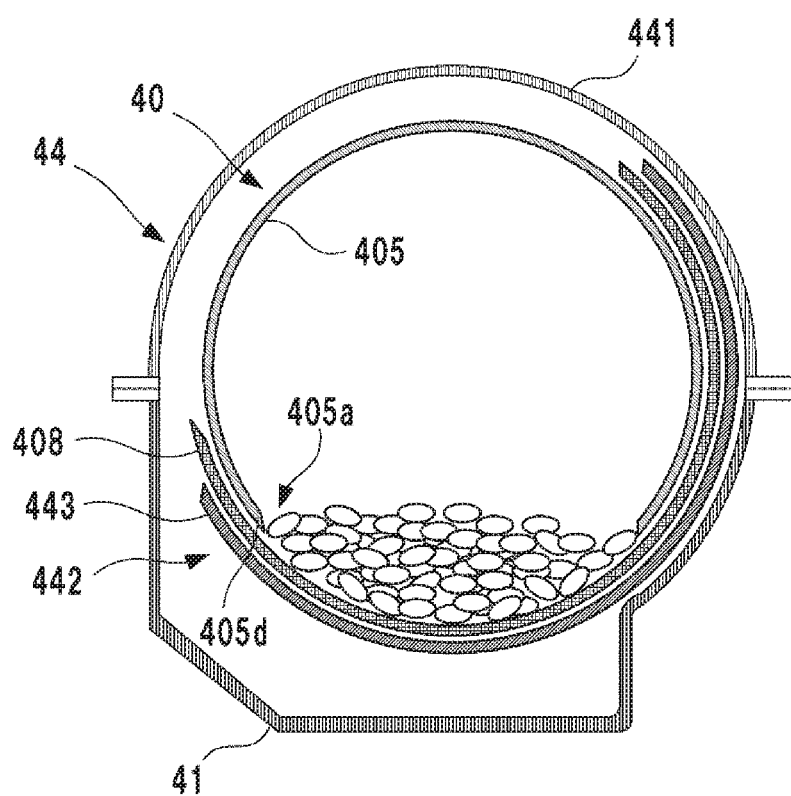
FIG. 42 is an explanatory view of the operations of the constituent components of the canister according to another example.
Figure 43:
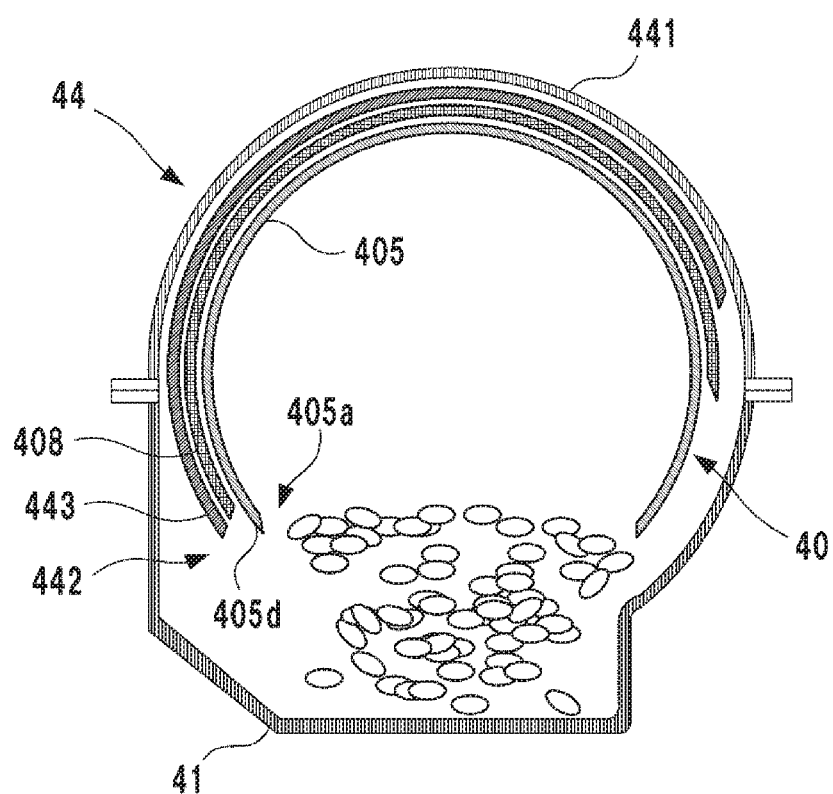
FIG. 43 is an explanatory view of the operations of the constituent components of the canister according to another example.
Figure 44:
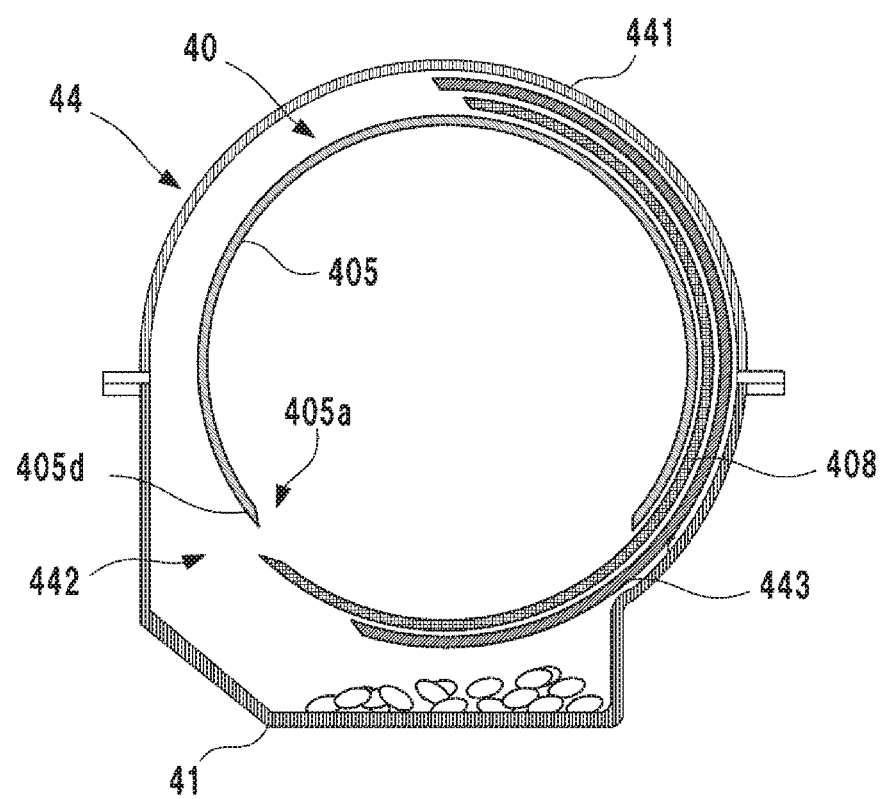
FIG. 44 is an explanatory view of the operations of the constituent components of the canister according to another example.

An example of control associated with roasted coffee bean biting prevention will be described here. FIGS. 42 to 44 are sectional views of the canister 40 in the radial direction, and the state of stored roasted coffee beans is shown. FIGS. 42 to 44 show control from attachment to detachment of the canister 40.

FIG. 42 shows a state immediately after the canister 40 is attached to the attachment portion 44. The shutter portion 443 and the outlet opening/closing portion 408 are in the closed state. FIG. 43 shows a state in which the shutter portion 443 and the outlet opening/closing portion 408 are switched from the state shown in FIG. 42 to the open state. The outlet 405a and the receiving portion 442 are opened, and the roasted coffee beans flow into the conveyor 41.

FIG. 44 shows again a state in which the shutter portion 443 and the outlet opening/closing portion 408 are returned to the closed state. Before the outlet 405a is completely closed, the rotation of the shutter portion 443 and the outlet opening/closing portion 408 is temporarily stopped. The outlet 405a is set in a state in which it is partially closed, and opened so as to allow, for example, one roasted coffee bean to pass. If the motor 41a is a stepping motor, the degree of opening of the outlet 405a can be controlled by the control amount (the number of steps).

In this state, the conveyor 41 is driven, and the roasted coffee beans are removed from the periphery of the receiving portion 442. After that, the conveyor 41 is stopped, and the shutter portion 443 and the outlet opening/closing portion 408 are wholly closed and completely returned to the closed state. This can more reliably prevent biting of the roasted coffee beans.

As shown in FIGS. 42 to 44, the sectional shapes of the edges of the outlet forming portion 405, the outlet opening/closing portion 408 and the shutter portion 443 are wedge shapes or tapered shapes. Since the contact area between the edges and the roasted coffee beans becomes small, this contributes to prevention of biting.

Additionally, as shown in the sectional view of FIG. 34 or 38, the space on the periphery of the receiving portion 442 has a larger capacity on the front side than on the rear side. Hence, when returning the shutter portion 443 and the outlet opening/closing portion 408 from the open state to the closed state, a larger space can be ensured on the periphery of the outlet 405a that gradually narrows, and biting of the roasted coffee beans can be prevented. When the rear side is made narrow, the amount of roasted coffee beans remaining there can be decreased. When the conveyor 41 is driven in the state shown in FIG. 44, the amount of roasted coffee beans (for example, beans to be wasted) taken out by the conveyor 41 can be decreased.

Figure 45:
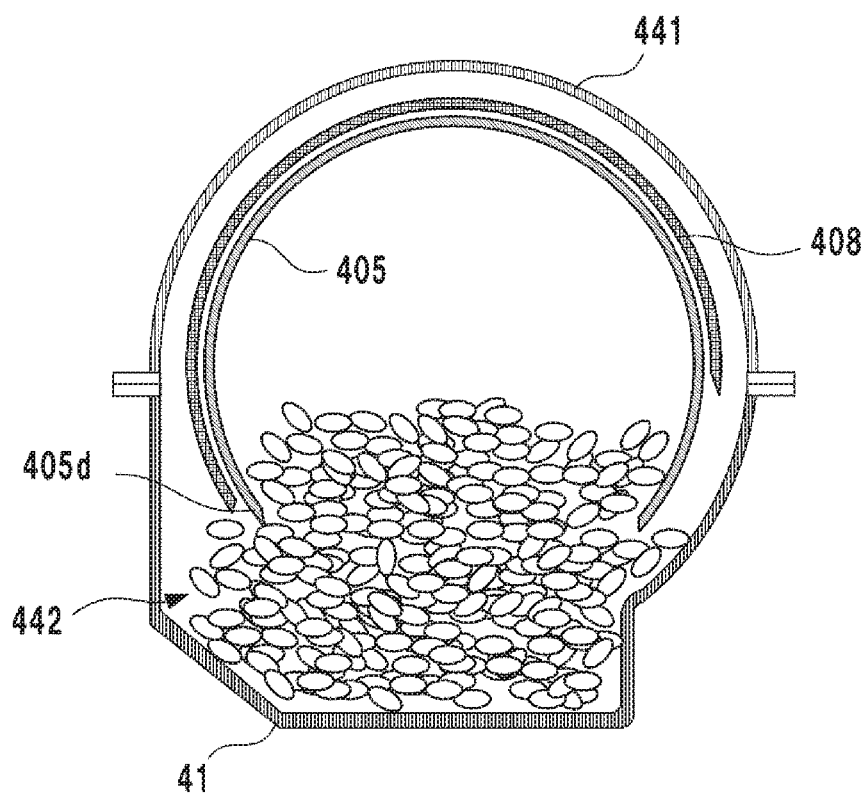
FIG. 45 is an explanatory view of the operations of the constituent components of the canister according to another example.
Figure 46:
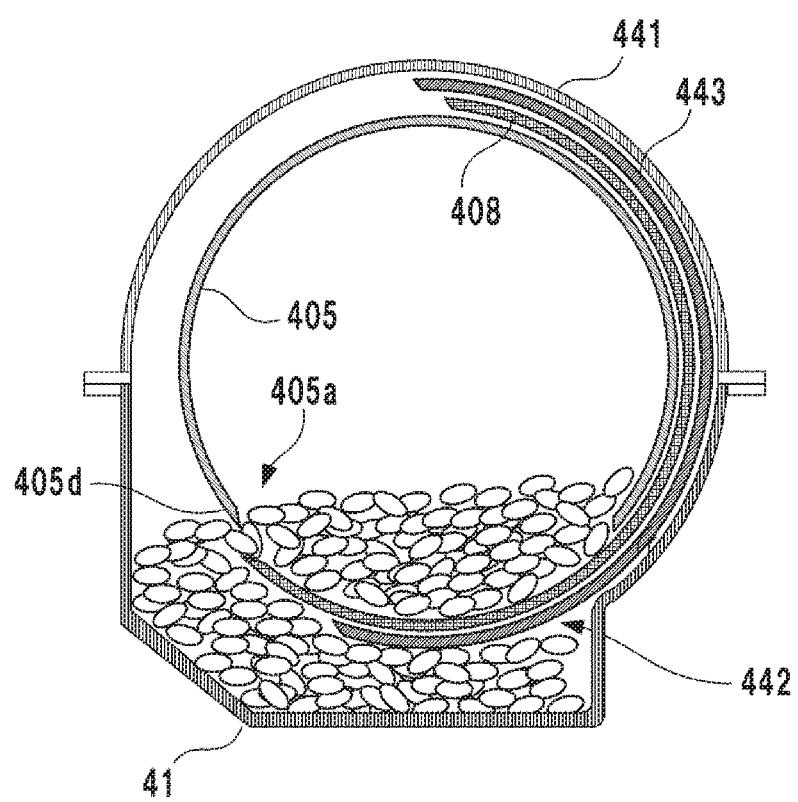
FIG. 46 is an explanatory view of the operations of the constituent components of the canister according to another example.
Figure 47:
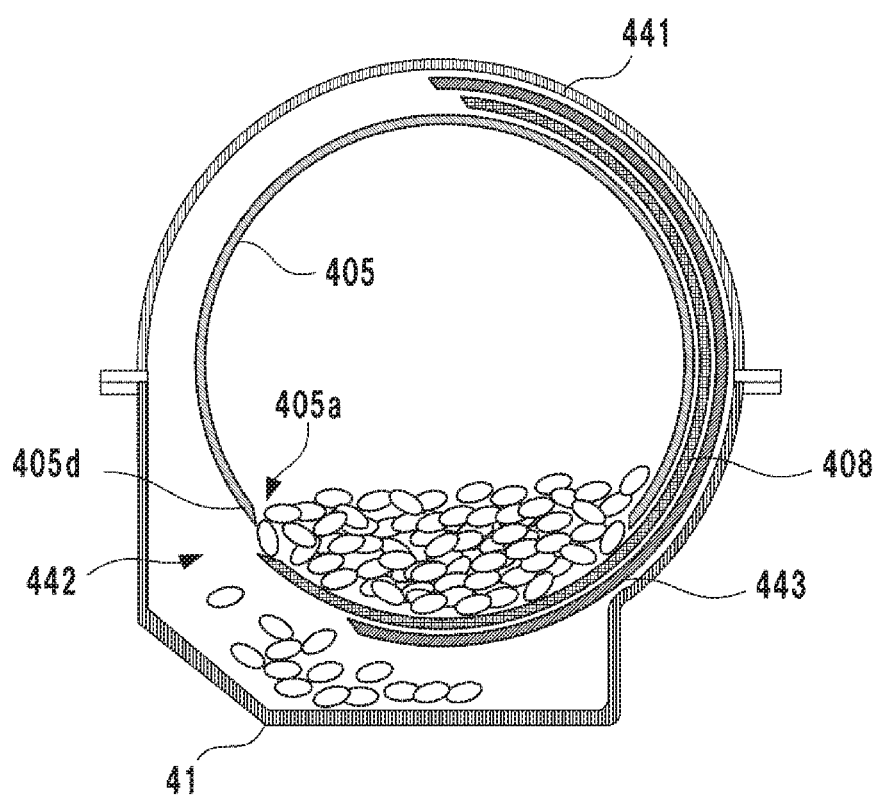
FIG. 47 is an explanatory view of the operations of the constituent components of the canister according to another example.

FIGS. 45 to 47 are also sectional views of the canister 40 in the radial direction, and show the state of the stored roasted coffee beans. FIGS. 45 to 47 show a state in which a relatively large amount of roasted coffee beans remains in the receiving portion 442 and the canister 40, and show a case in which the shutter portion 443 and the outlet opening/closing portion 408 are returned from the open state to the closed state.

FIG. 45 shows a case in which the shutter portion 443 and the outlet opening/closing portion 408 are in the open state. A relatively large amount of roasted coffee beans remains near the outlet 405a and the receiving portion 442.

FIG. 46 shows a state in which the shutter portion 443 and the outlet opening/closing portion 408 are returned to the closed state. As in the example of FIG. 44, before the outlet 405a is completely closed, the rotation of the shutter portion 443 and the outlet opening/closing portion 408 is temporarily stopped. In this state, the conveyor 41 is driven, and the roasted coffee beans are removed from the periphery of the receiving portion 442. After that, the conveyor 41 is stopped, and the shutter portion 443 and the outlet opening/closing portion 408 are completely returned to the closed state. However, the roasted coffee beans are bitten in some cases, as shown in FIG. 47.

For example, if it is not confirmed that the shutter portion 443 and the outlet opening/closing portion 408 are returned to the closed state within a predetermined time, the processing unit 11a notifies the user of the occurrence of biting. Biting of the roasted coffee beans is often solved by making the outlet 405a slightly larger. Hence, the outlet 405a is made slightly larger by manually rotating the outlet forming portion 405 (tube portion 401) a little. However, in a state in which the canister 40 is attached to the attachment portion 44, the outlet forming portion 405 (tube portion 401) cannot manually be rotated because of the engagement between the projecting portion 405b' and the groove 441a.

Hence, as shown in the state ST23 of FIG. 40, the user manually slides the slider 409 to the second position. Accordingly, the projecting portion 405b' separates from the groove 441a, and the engagement between them is canceled. It is possible to manually rotate the outlet forming portion 405 (tube portion 401) and solve the biting. After that, the user manually returns the slider 409 to the first position and instructs resumption of the operation to the closed state from the operation unit 12. The processing unit 11a drives the motor 41a to completely return the shutter portion 443 and the outlet opening/closing portion 408 to the closed state.

<Receiving Portion and Collective Conveyance Path>

The storage apparatus 4 may include a receiving portion at a part different from the attachment portion 44, independently of the receiving portion 442 for each attachment portion 44. An example of the arrangement will be described with reference to FIG. 27 again.

Figure 27:
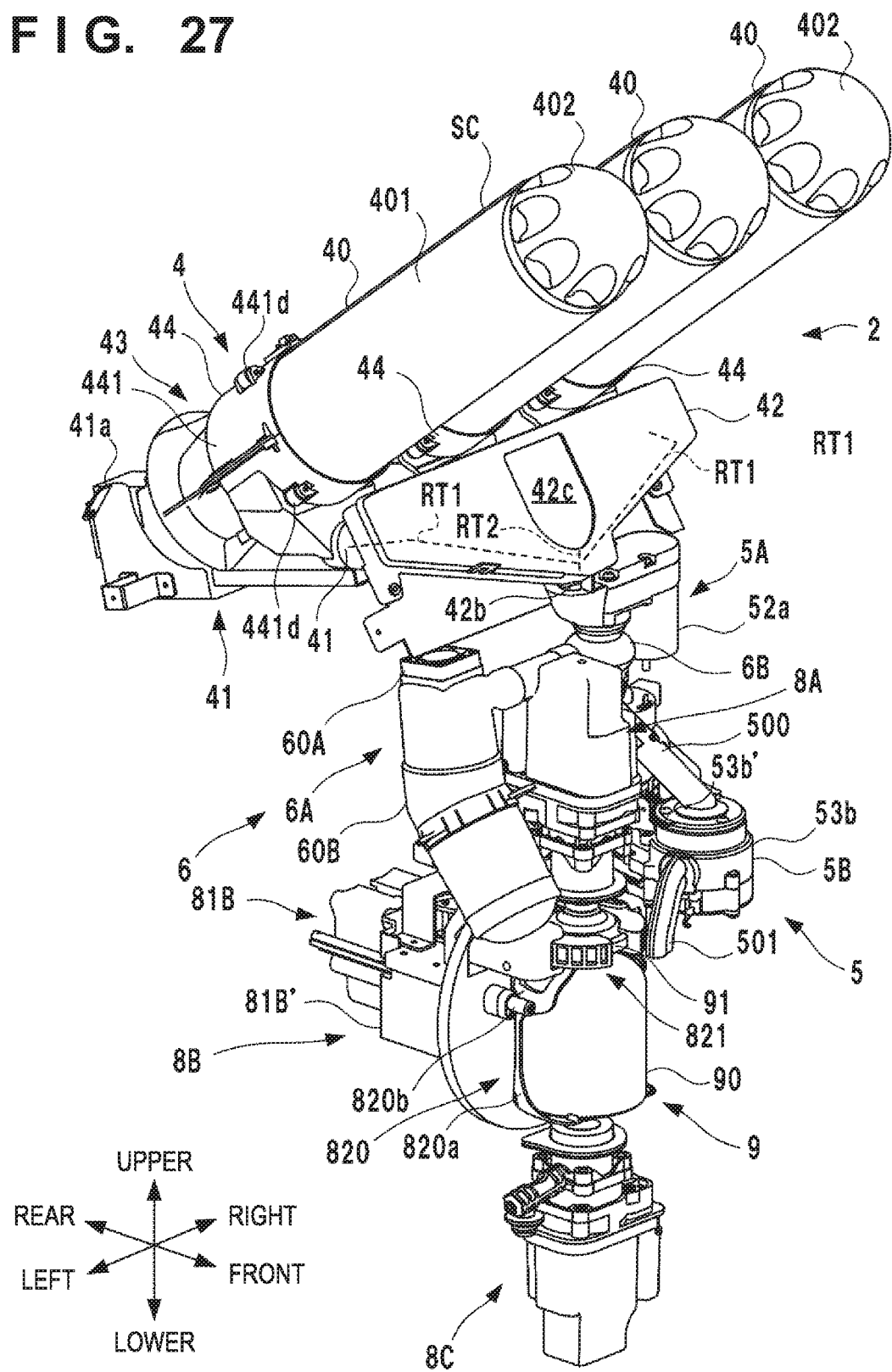
FIG. 27 is a perspective view showing other examples of the arrangements of the bean processing apparatus 2 and an extracting apparatus 3.
Figure 28:
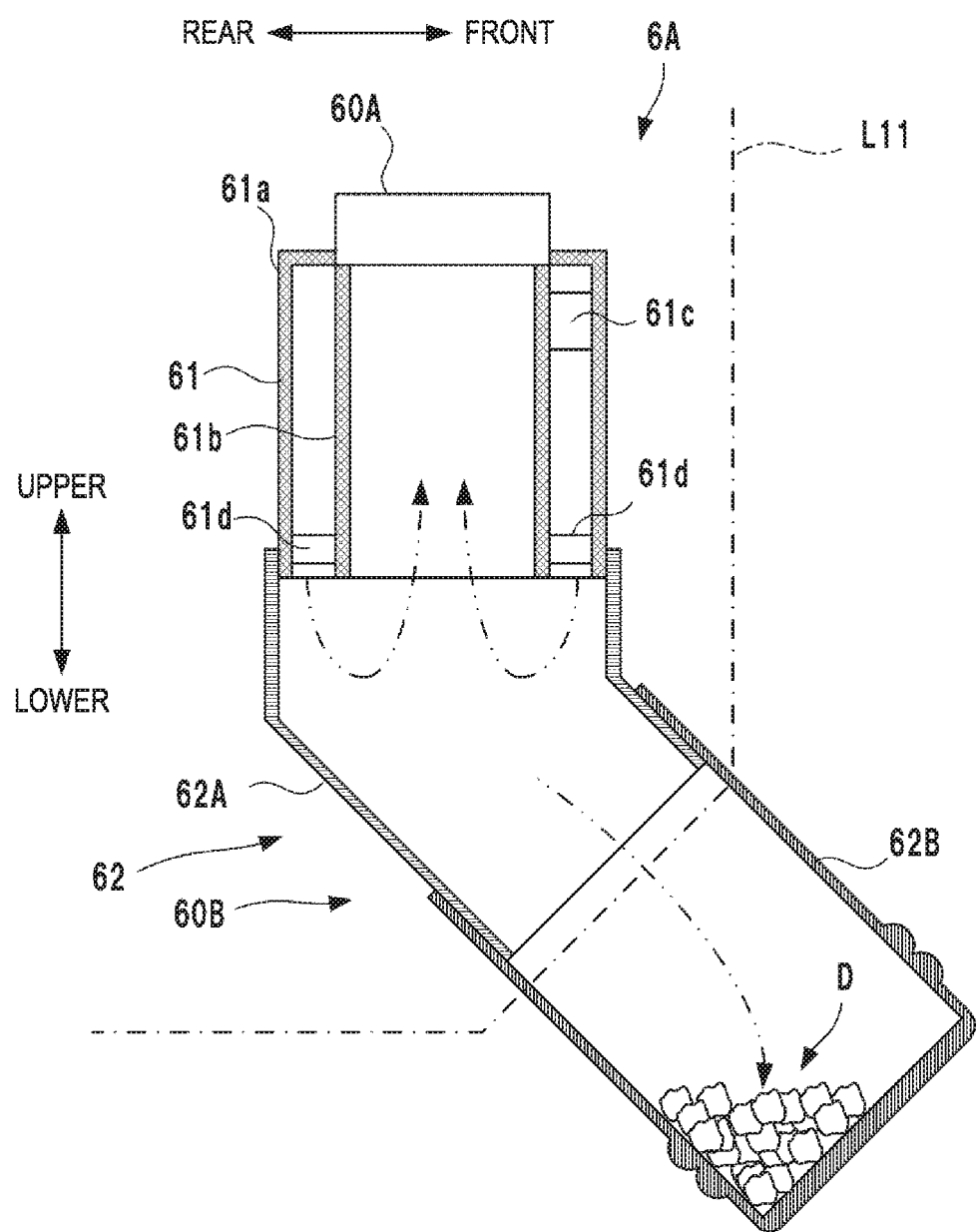
FIG. 28 is a sectional view of a suction unit.

In the example shown in FIG. 27, a receiving portion 42c different from the receiving portion 442 is provided. The receiving portion 42c is an opening portion formed in the wall portion of the collective conveyance path 42 on the front side. The user can charge the roasted coffee beans from the receiving portion 42c into the collective conveyance path 42 manually or using a funnel-shaped tool. The charged roasted coffee beans are supplied by the weight of their own from an outlet 42b to the grinding apparatus 5, and the coffee beverage can be produced.

The receiving portion 42c can be used to, for example, produce a coffee beverage using special roasted coffee beans that are not stored in the canister 40. A production processing program used to manufacture a cup of such special coffee beverage may be selectable or may be a production processing program that operates under production conditions set by the user.

As described above, in this embodiment, the receiving portion 442 that receives supply of roasted coffee beans from the canister 40 and the receiving portion 42c that individually receives supply of roasted coffee beans are provided. It is therefore possible to provide the beverage producing apparatus 1 capable of coping with individual needs by the receiving portion 42c while ensuring the mass productivity of the coffee beverage of the same type by the receiving portion 442.

In this embodiment, the path length of a supply path RT2 from the receiving portion 42c to the grinding apparatus 5 (particularly the coarse grinder 5A) is smaller than the path length of a supply path RT1 (see FIG. 34 as well, in addition to FIG. 27) from the receiving portion 442 to the grinding apparatus 5 (particularly the coarse grinder 5A). When the roasted coffee beans are charged from the receiving portion 42c, they generally directly fall to the outlet 42b and are supplied to the grinding apparatus 5. This makes it possible to supply the total amount of charged roasted coffee beans more reliably to the grinding apparatus 5 and suppress wasted beans or occurrence of a measurement error. The supply path RT2 is a path combined with a halfway point of the supply path RT1. The structure can be simplified as compared to an arrangement in which the paths are independently formed.

The conveyor 41 does not exist on the supply path RT2. Hence, the roasted coffee beans charged from the receiving portion 42c are not automatically measured. For this reason, the user can freely measure and charge the roasted coffee beans as much as he/she wants from the receiving portion 42c, thereby producing a coffee beverage. However, a mechanism that automatically measures the roasted coffee beans can be provided on the supply path RT2.

The collective conveyance path 42 according to this embodiment has a front wall tilting upward on the front side and is arranged in a tilting posture as a whole. When the collective conveyance path 42 is tilted, the receiving portion 42c readily receives the roasted coffee beans. In addition, the roasted coffee beans conveyed from the conveyor 41 can also be directed to the grinding apparatus 5.

Since the receiving portion 42c is an opening portion, the state of the conveyor 41 can also be visually inspected through the receiving portion 42c. That is, the receiving portion 42c can also be used as an inspection window.

Other examples of the collective conveyance path 42 and the receiving portion 42c will be described below.

Figure 48:
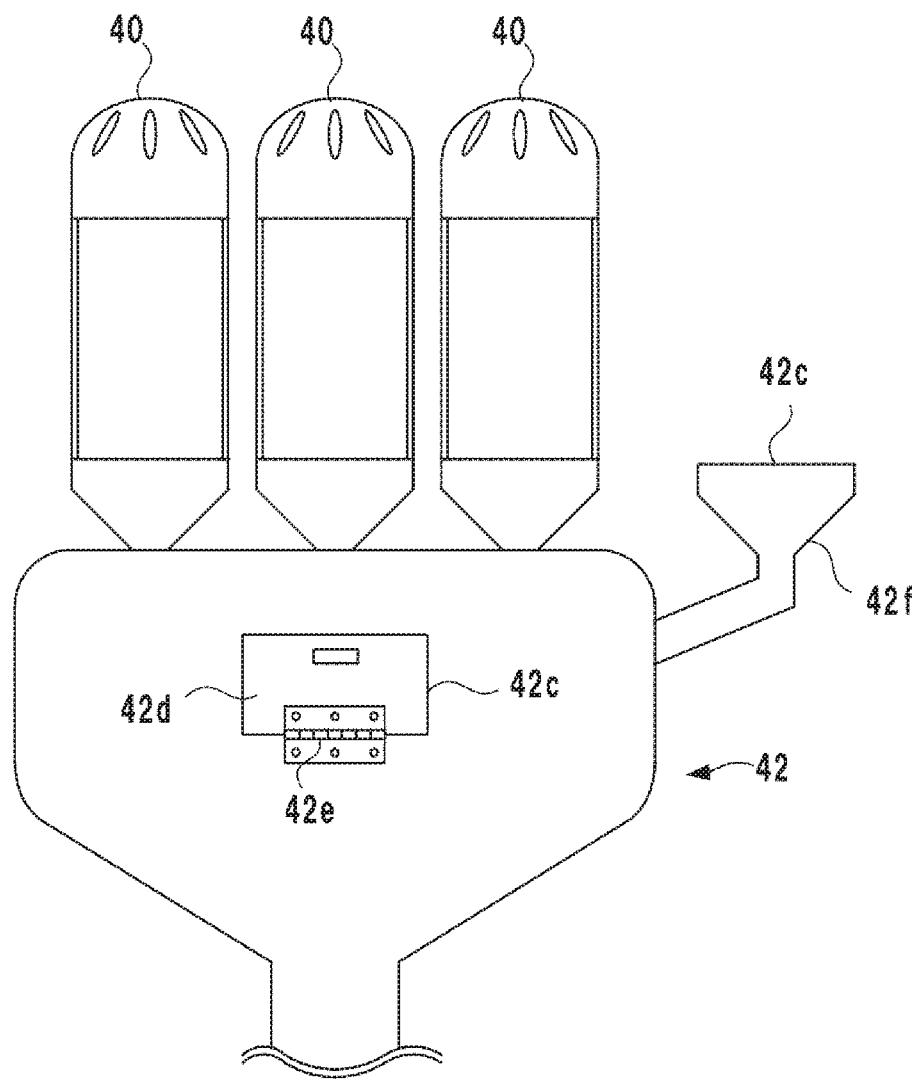

In the example shown in FIG. 48, two receiving portions 42c are provided. In this way, a plurality of receiving portions 42c may be provided. One receiving portion 42c is provided with a lid 42d configured to be opened/closed by a hinge 42e. When the receiving portion 42c is not used, the receiving portion 42 is closed by the lid 42d, thereby preventing a foreign substance from entering the collective conveyance path 42. The portion where the hinge 42e is provided can be any one of the upper side, lower side, reverse side and obverse side of the lid 42d. The other receiving portion 42c is formed by a hopper-shaped tube member 42f.

Figure 49:
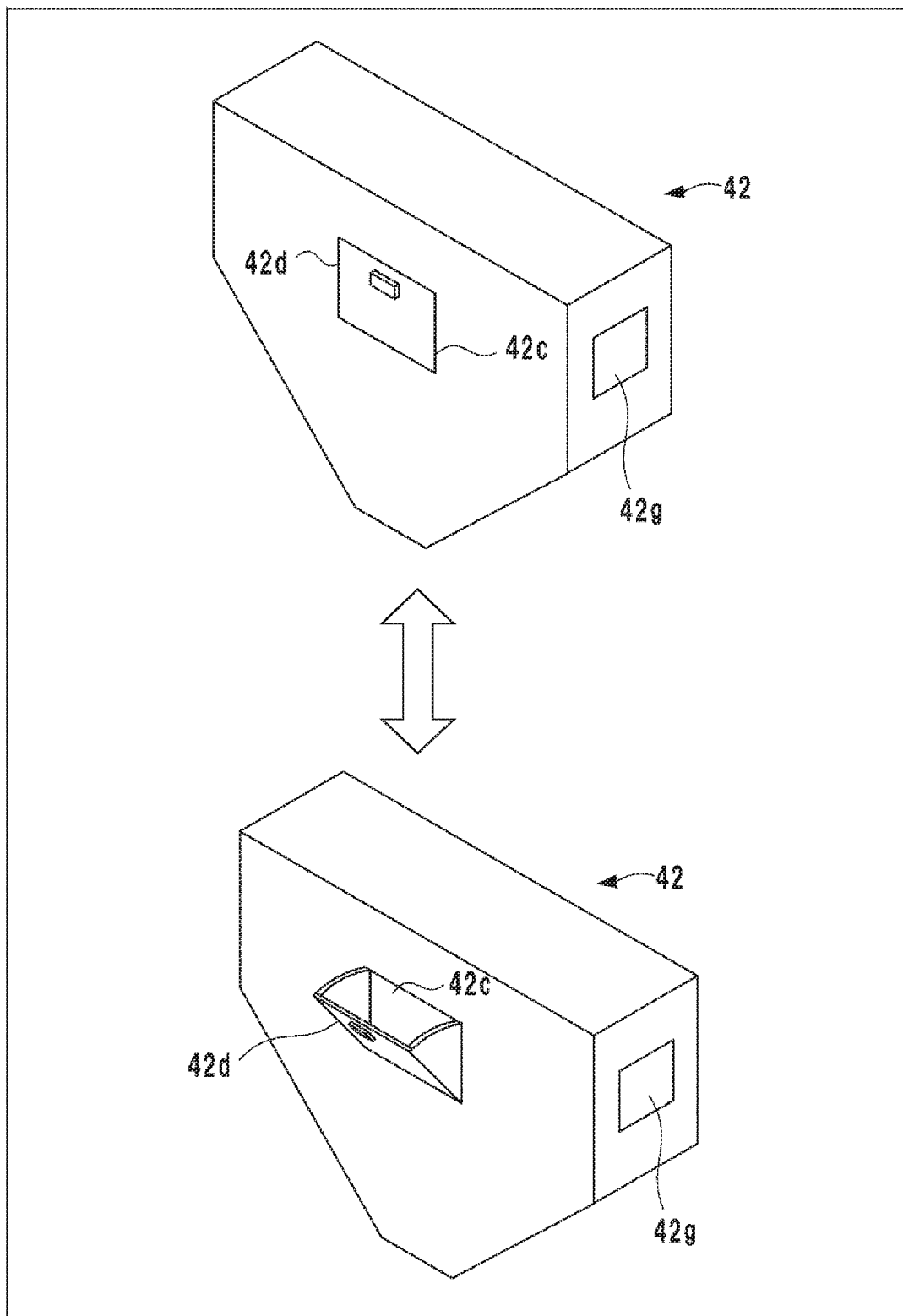

As shown in FIG. 49, the tube member 42f may be separable from the collective conveyance path 42. An opening portion 42g is a hole used to attach the tube member 42f. The opening portion 42g can also be used as an inspection hole used to visually inspect the interior of the collective conveyance path 42 or the conveyor 41. FIG. 49 also shows the lid 42d including wall portions on the left and right sides. Since the left and right wall portions are provided, when the lid 42d is opened to charge the roasted coffee beans, the roasted coffee beans hardly spill out to the sides of the lid 42d. The user can visually recognize, via the receiving portion 42c, not only the state of the conveyor 41 but also the state of the roasted coffee beans received from the receiving portion 442, a state in which the roasted coffee beans received from the receiving portion 442 are sent into the machine, a state in which the roasted coffee beans are not sent although an operation of sending the roasted coffee beans received from the receiving portion 442 into the machine is performed or an operation of instructing sending is performed and the like. In addition, a state in which the roasted coffee beans received from the receiving portion 442 flow to the downstream side (for example, mill side) can visually be recognized. Furthermore, the user may be able to impede, via the receiving portion 42c, the flow of the roasted coffee beans received from the receiving portion 442 to downstream side (for example, mill side). Furthermore, the roasted coffee beans received from the receiving portion 42c may be made invisible from the receiving portion 442.

In an arrangement example EX11 shown in FIG. 50, the outlet 42b is located at a position shifted in the horizontal direction with respect to a center line CL of the width of the receiving portion 42c or the collective conveyance path 42 in the horizontal direction. In addition, the tilt changes between a bottom portion LB on the left side of the collective conveyance path 42 and a bottom portion RB on the right side. When the collective conveyance path 42 has the asymmetrical shape in the horizontal direction, it may be possible to suppress stay of the roasted coffee beans at a specific portion in the collective conveyance path 42.

An arrangement example EX12 shown in FIG. 50 shows an example in which the outlet 42b is connected to a side portion of the grinding apparatus 5 (particularly the coarse grinder 5A) to supply the roasted coffee beans. According to the arrangement of the grinder, the operation becomes smoother when the roasted coffee beans are supplied from a lateral side of the cutter than in a case in which the coffee beans are supplied from above. The position of the outlet 42b can be not the bottom portion of the collective conveyance path 42 but the left or right side portion, the front portion and the rear portion.

Figure 51:
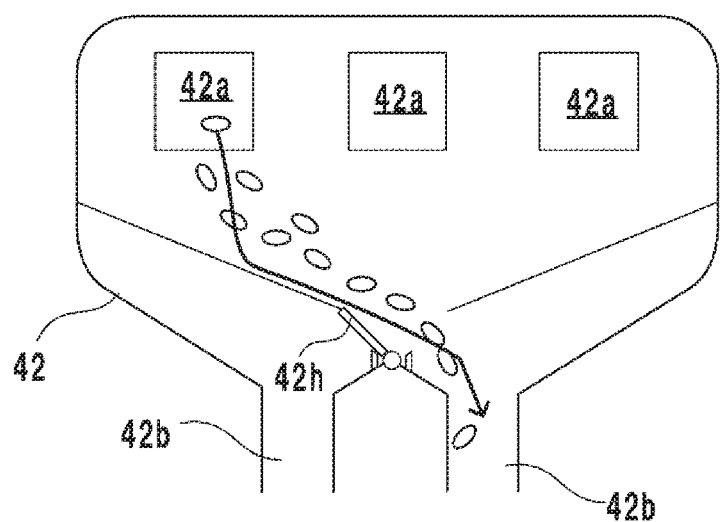

The example shown in FIG. 51 shows an example in which a plurality of outlets 42b are provided, and a distribution mechanism 42h that distributes the roasted coffee beans to one of the outlets 42b is provided in the collective conveyance path 42. In the example shown in FIG. 51, two outlets 42b are provided. For example, one is connected to the grinding apparatus 5, and the other is connected to a disposal box. For example, when discarding the roasted coffee beans remaining in the conveyor 41, the distribution mechanism 42h distributes the roasted coffee beans introduced into the collective conveyance path 42 to the outlet 42b on the disposal box side. In addition, the roasted coffee beans charged via the receiving portion 42c (not shown in FIG. 51) are distributed to the outlet 42b on the side of the grinding apparatus 5.

Figure 52:
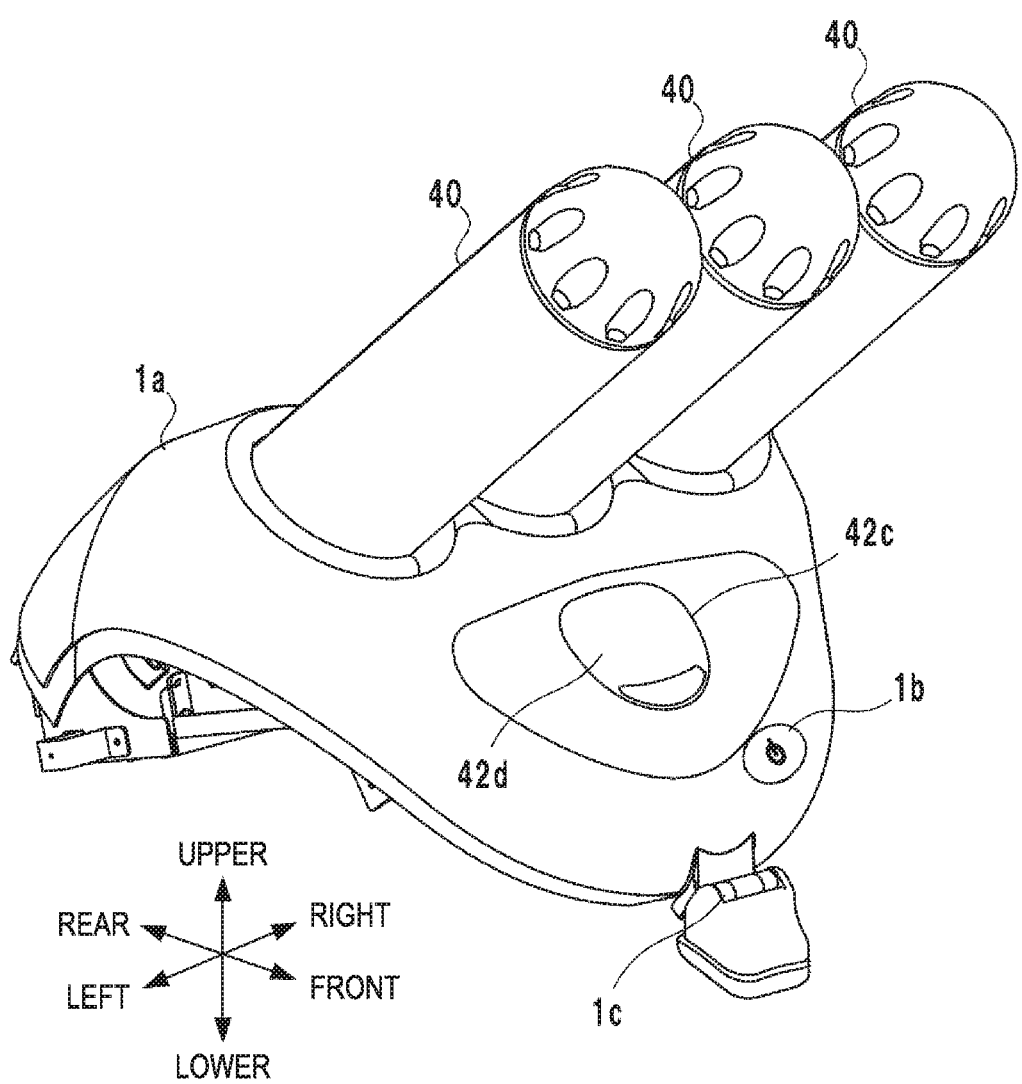
Figure 53:
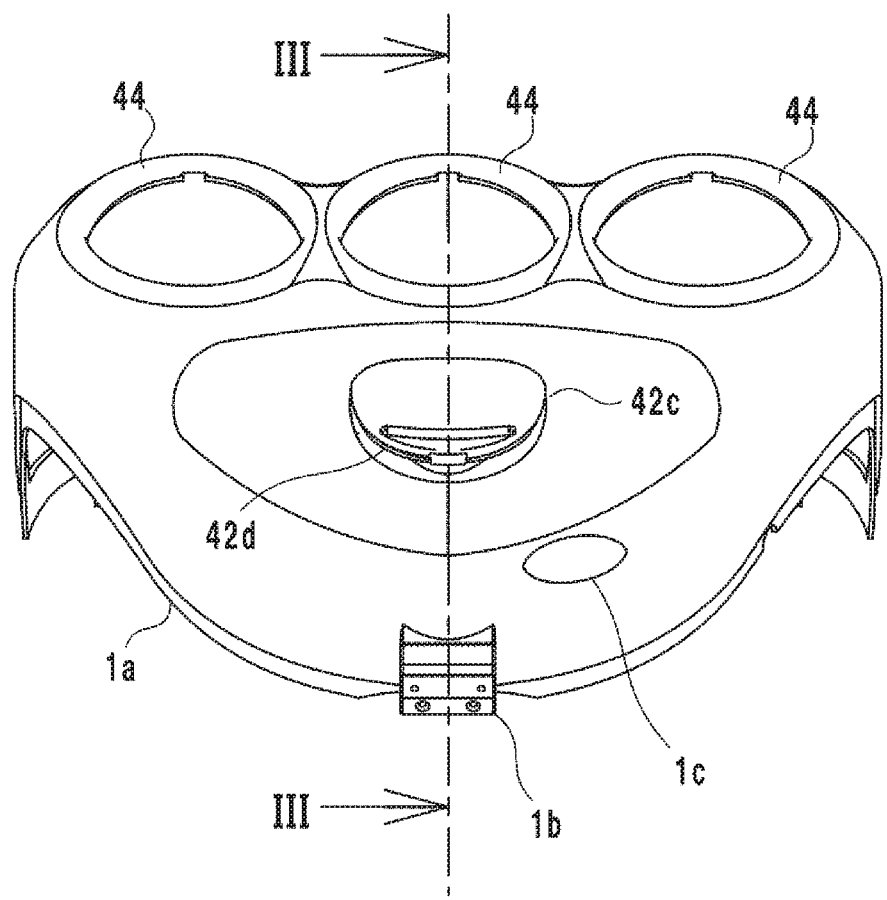
Figure 54:
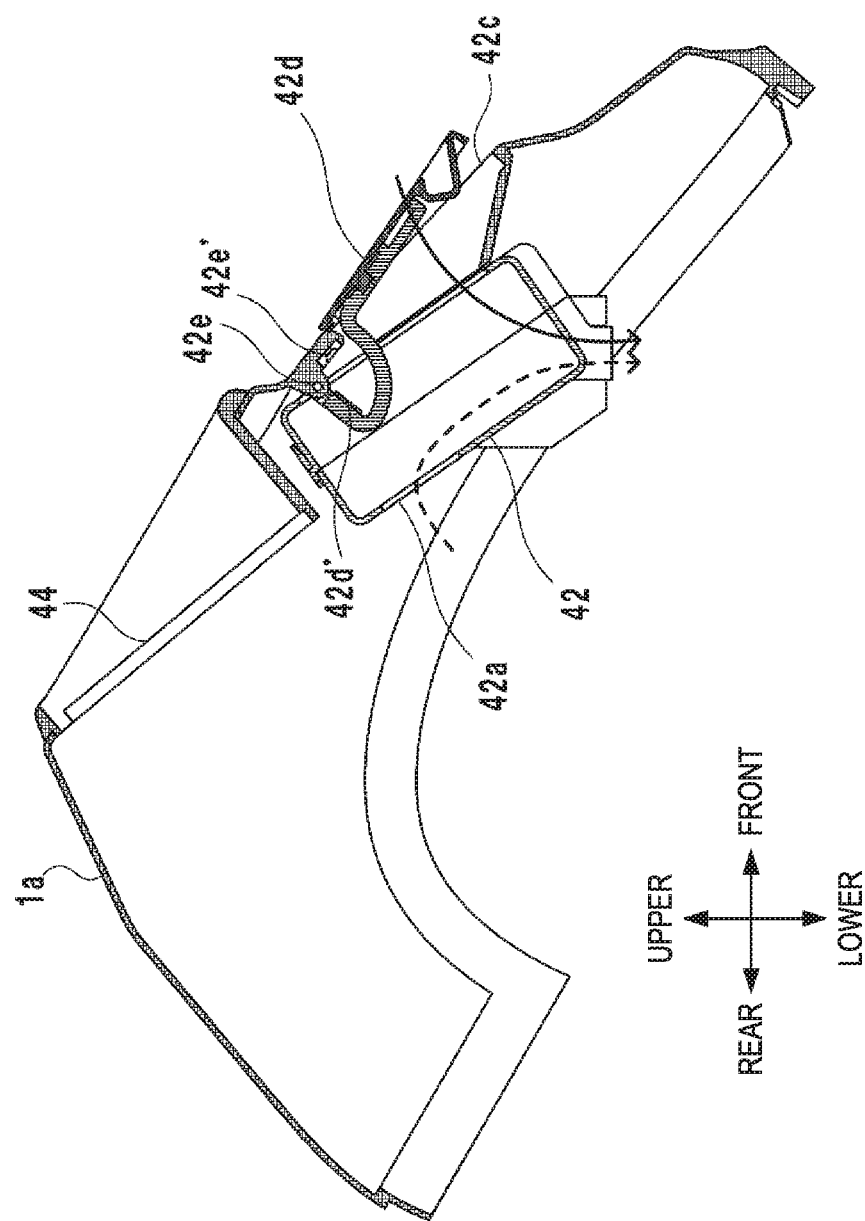

FIGS. 52 to 54 show an example of a housing 1a that covers the storage apparatus 4. The housing 1a forms the exterior of the beverage producing apparatus 1. FIG. 52 is a perspective view of the housing 1a in a state in which the canister 40 is attached. FIG. 53 is a front view of the housing 1a. FIG. 54 is a sectional view taken along a line III-III in FIG. 53

The housing 1a is configured to freely close/open with respect to a main body housing (not shown) by a hinge portion 1c. A case in which the housing 1a is in a closed state will be described below. In addition, a power switch 1b is disposed on the housing 1a.

The receiving portion 42c is formed in the housing 1a. The receiving portion 42c is opened/closed by the lid 42d. The outline of the opening of the receiving portion 42c is defined by the lid 42d on the upper side and the housing 1a on the lower side.

As shown in FIG. 54, the collective conveyance path 42 is disposed behind the receiving portion 42c, and the receiving portion 42c communicates with the collective conveyance path 42. When the lid 42d is opened, and the roasted coffee beans are charged into the receiving portion 42c, the roasted coffee beans are guided to the collective conveyance path 42, as indicated by the solid arrow, and discharged from the collective conveyance path 42 to the grinding apparatus 5 (not shown in FIG. 54). The inner circumferential wall of the receiving portion 42c has a mortar shape tilting toward the front surface of the collective conveyance path 42, and the charged roasted coffee beans are smoothly guided to the collective conveyance path 42.

An inlet 42a of the collective conveyance path 42 is formed in the rear wall of the collective conveyance path 42. The roasted coffee beans conveyed from the canister 40 via the conveyor 41 (not shown) are introduced into the collective conveyance path 42, as indicated by the broken arrow, and discharged to the grinding apparatus 5 (not shown in FIG. 54). When the lid 42d is opened, the internal conveyor 41 (not shown) can visually be recognized via the receiving portion 42c and inspected.

A magnet 42e' is arranged near the hinge 42e. The lid 42d includes a metal plate 42d' at a portion that abuts against the magnet 42e' upon opening. The magnet 42e' attracts the metal plate 42d', thereby easily maintaining the open state of the lid 42d. In addition, concave portions are formed at the distal end of the lid 42d. Hence, the user can easily place fingers on the concave portions and easily operate the lid 42d.

Fourth Embodiment

An example of the arrangement of a housing that forms the exterior of a beverage producing apparatus 1 will be described.

<Housing Arrangement Example 1>

Figure 55:
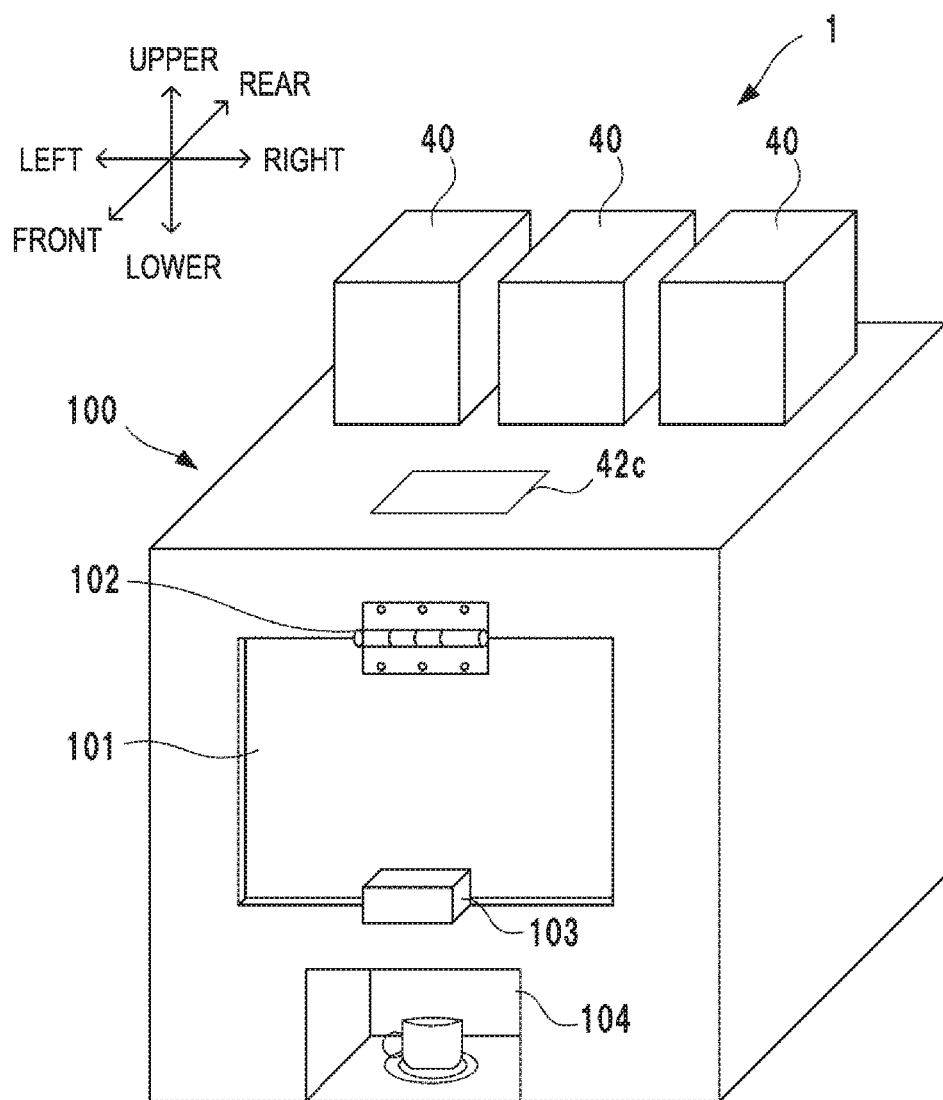
FIG. 55 is a view showing an example of the arrangement of a housing.

FIG. 55 is a perspective view schematically showing the beverage producing apparatus 1 whose internal mechanism is enclosed in a housing 100. The housing 100 has a rectangular parallelepiped shape including a front wall, a rear wall, an upper wall and left and right side walls. On the upper wall, canisters 40 are arranged, and a receiving portion 42c is arranged. An extraction outlet 104 is formed in the lower portion of the front wall, and a coffee beverage is poured into a cup placed here.

A transmissive portion 101 through which the interior of the housing 100 is visible from the outside is formed in the front wall. When the transmissive portion 101 is provided, the internal mechanism can visually be recognized from the front side of the beverage producing apparatus 1, and the operation can easily be confirmed. Additionally, the buyer of a coffee beverage or the like can observe the process of coffee beverage production. In the housing 100, portions other than the transmissive portion 101 are basically non-transmissive portions. However, other transmissive portions may be included.

The transmissive portion 101 can be formed by a through hole or a transparent member. When the transmissive portion 101 is formed by a transparent member such as glass or an acrylic resin, leakage of steam or the like in the housing 100 to the outside can be suppressed. The transparent member may be colorless transparent or color transparent. A steam path that sends steam to the outside of the housing 100 may be provided. The steam path may be formed from, for example, a steam inlet provided at a predetermined location in the housing 100, a steam outlet in the rear surface portion of the beverage producing apparatus 1, a steam tube that connects the steam inlet and the steam outlet and a steam sending fan that sends air or steam in the steam path at or near the stem outlet to the outside of the beverage producing apparatus 1. The steam inlet may be provided at one position or each of a plurality of positions near the inlet of a grinder 5A, near the outlet of the grinder 5A, near the inlet of a grinder 5B, near the outlet of the grinder 5B, near the opening 90a of the extraction container 9 located at the bean charging position and the like. When the transmissive portion 101 is formed by a transparent member, and a steam release portion formed by providing a hole or a notch to release steam in the transmissive portion 101 or providing a hole, a notch, a gap or the like in the housing is mounted, the steam release portion may have a positional relationship in which the extraction container 9 located at the bean charging position is closer than the steam inlet, the steam release portion may have a positional relationship in which the extraction container 9 located at the extraction position is closer than the steam inlet, the steam release portion may have a positional relationship in which the grinder (for example, at least one of the grinders 5A and 5B) is closer than the steam inlet, the steam release portion may have a positional relationship in which the extraction container 9 located at the bean charging position is farther than the steam inlet, the steam release portion may have a positional relationship in which the extraction container 9 located at the extraction position is farther than the steam inlet, or the steam release portion may have a positional relationship in which the grinder (for example, at least one of the grinders 5A and 5B) is farther than the steam inlet.

In this embodiment, the transmissive portion 101 is formed by a plate-shaped transparent member and configured to be opened/closed by a hinge 102. Accordingly, when the transmissive portion 101 is opened, access to the internal mechanism is possible, and maintenance can also be performed. FIG. 56 shows a state in which the transmissive portion 101 is open.

A handle 103 is provided at the lower portion of the transmissive portion 101. The user can easily open/close the transmissive portion 101 by gripping the handle 103. A stopper 105a that restricts the pivot range of the transmissive portion 101 is provided at a position corresponding to the handle 103 on the lower edge of an opening portion 105 opened/closed by the transmissive portion 101.

In this embodiment, the opening direction of the transmissive portion 101 is the upward direction. However, the hinge 102 may be arranged at the lower portion of the transmissive portion 101 to change the opening direction to the downward direction. Alternatively, the opening/closing direction of the transmissive portion 101 may be not the vertical direction but the horizontal direction. In addition, a mechanism configured to maintain the open state of the transmissive portion 101 may be provided. Such a mechanism may be provided in, for example, the hinge 102. The transmissive portion 101 may be provided in a side wall or the upper wall as well.

<Housing Arrangement Example 2>

Figure 57:
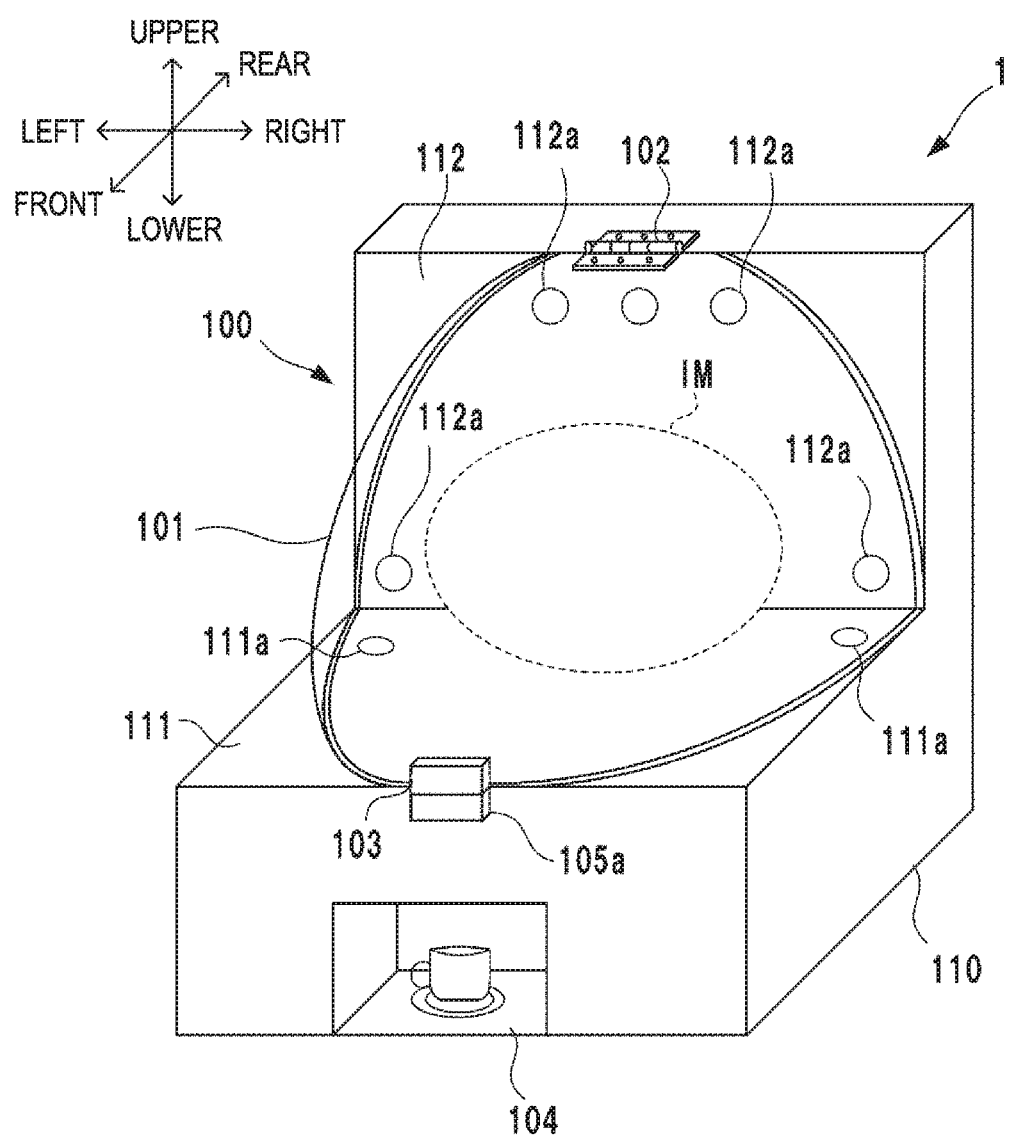
FIG. 57 is a view showing another example of the arrangement of the housing.

Another example of the arrangement of the housing 100 will be described. FIG. 57 is a perspective view schematically showing the beverage producing apparatus 1 whose internal mechanism is enclosed in the housing 100 according to the other arrangement example. As for the housing 100 according to Arrangement Example 2, the same components as in the housing 100 shown in FIGS. 55 and 56 or components having common functions are denoted by the same reference numerals as in the housing 100 shown in FIGS. 55 and 56, and a description thereof will be omitted. Different components will mainly be described.

The housing 100 includes an L-shaped main body 110 and the transmissive portion 101 that encloses an internal mechanism IM arranged on a stage 111 of the main body 110. The transmissive portion 101 is formed by a shell-shaped transparent member, and its surface forms a curved surface from the front side to the rear side. The transmissive portion 101 is extended to the front side, the left and right lateral sides and the upper side of the internal mechanism IM, and the internal mechanism IM can visually be recognized from the front side, the lateral sides and the upper side of the beverage producing apparatus 1.

The transmissive portion 101 is sometimes fogged up by the heat or steam in the internal mechanism IM. To prevent this, ventilation portions 112*a* are formed in a backboard 112 at portions inside the transmissive portion 101. The ventilation portions 112*a* may be holes communicating with the outer air or ducts. In this embodiment, the plurality of ventilation portions 112*a* are provided at the upper and lower portions. As for the arrangement, however, an arrangement other than the illustrated form can also be employed.

The upper surface of the stage 111 sometimes becomes wet due to steam or water leakage from the internal mechanism IM. To prevent this, drain portions 111*a* are provided in the stage 111. A pipe connected to a waste tank (not shown) is connected to the drain portions 111*a*.

In Arrangement Example 2 as well, the transmissive portion 101 is configured to be freely opened/closed by the hinge 102, as in above-described Arrangement Example 1. Accordingly, when the transmissive portion 101 is opened, access to the internal mechanism IM is possible, and maintenance can also be performed. The handle 103 is provided at the lower portion of the transmissive portion 101. The user can easily open/close the transmissive portion 101 by gripping the handle 103. The stopper 105*a* that abuts against the handle 103 is provided at a position corresponding to the handle 103 at the front end of the stage 111. A metal plate attracted by a magnetic force and a magnet may be provided on the handle 103 and the stopper 105*a*, respectively.

Figure 58:
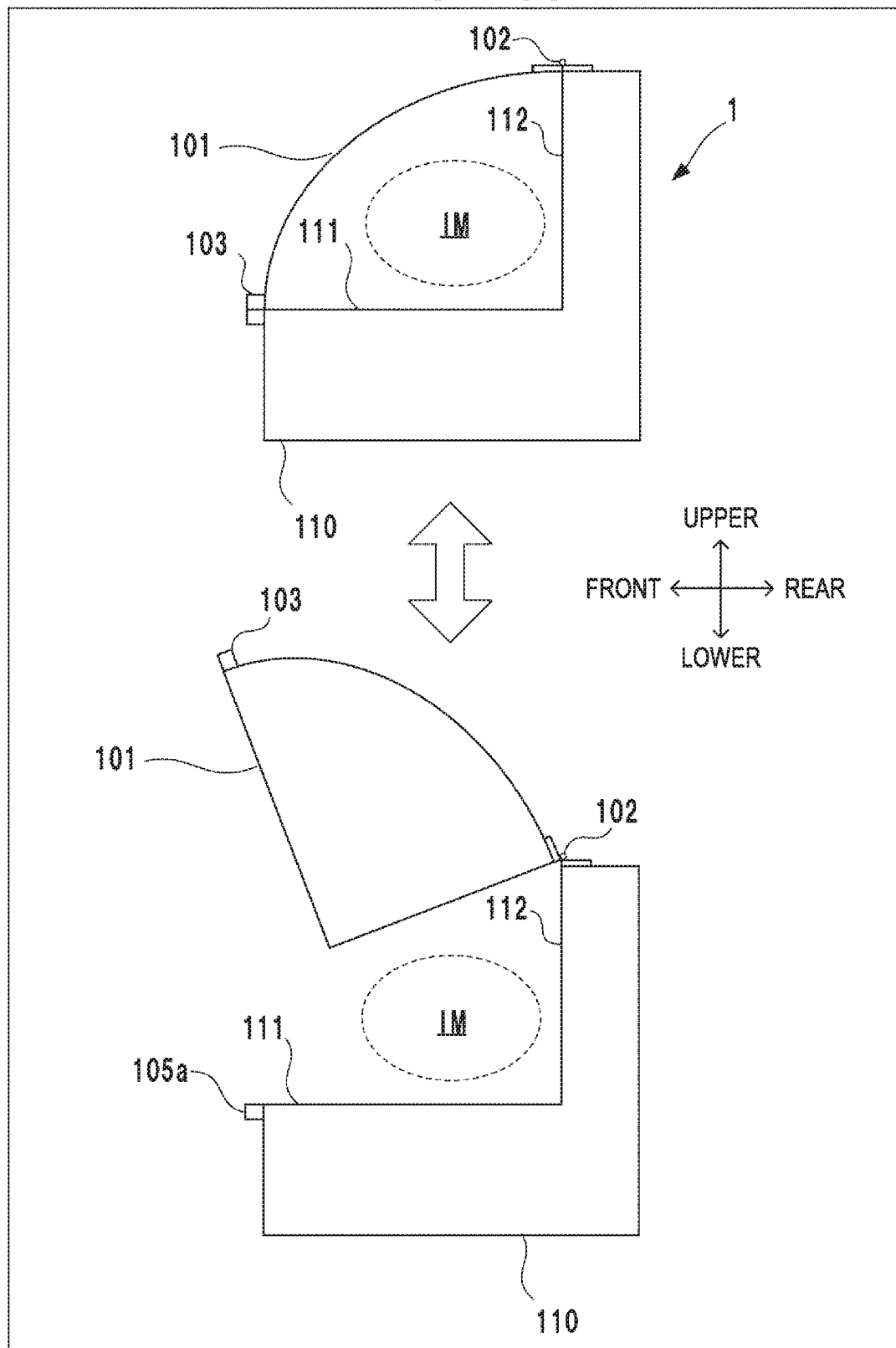
FIG. 58 is an explanatory view of the operation of the housing shown in FIG. 57.

FIG. 58 shows the open and closed states of the transmissive portion 101. In the closed state shown on the upper side of FIG. 58, the beverage producing apparatus 1 can be seen from one lateral side to the other lateral side through the transmissive portion 101 except the portion of the internal mechanism IM. In Arrangement Example 2, the hinge 102 is arranged on the rear side at the upper portion of the transmissive portion 101, and the opening direction of the transmissive portion 101 is the upward direction. However, the hinge 102 may be arranged at the lower portion of the transmissive portion 101 to change the opening direction to the front direction. Alternatively, the opening/closing direction of the transmissive portion 101 may be not the vertical direction but the horizontal direction. In addition, a mechanism configured to maintain the open state of the transmissive portion 101 may be provided. Such a mechanism may be provided in, for example, the hinge 102. A sensor that detects the opening/closing of the transmissive portion 101 may be provided. When the opening operation of the transmissive portion 101 is detected, control to stop the coffee beverage producing operation may be performed. In addition, a lock mechanism that restricts opening/closing of the transmissive portion 101 may be provided. During the coffee beverage producing operation, the lock mechanism may be operated to do control to inhibit opening of the transmissive portion 101.

<Mechanism Enclosed in Housing and Visible Mechanism>

Mechanisms enclosed in the housing 100 shown in Arrangement Example 1 or Arrangement Example 2 may include all or some mechanisms of a bean processing apparatus 2 and an extracting apparatus 3. As in Arrangement Example 1, at least a portion of the canister 40 may be located outside the housing 100. The extraction outlet 104 may be located outside the housing 100 or may be located inside. Ground beans sent from the grinder 5A may be invisible from the outside of the housing 100 via the transmissive portion 101, and ground beans sent from the grinder 5B may be visible from the outside of the housing 100 via the transmissive portion 101.

Internal mechanisms visible from the outside via the transmissive portion 101 can include all or some mechanisms of a storage apparatus 4, a grinding apparatus 5 and the extracting apparatus 3. Mechanisms adjacent in the longitudinal direction may be arranged while being shifted to the left and right sides such that as many mechanisms as possible are visible from the front side of the beverage producing apparatus 1 via the transmissive portion 101.

More about the grinding apparatus 5, the internal mechanisms can include all or some mechanisms of a separation apparatus 6.

In the separation apparatus 6, particularly, if all or some parts of a collection container 62B can visually be recognized from the outside via the transmissive portion 101, an unwanted substance in the collection container 62B can visually be recognized from the outside of the housing 100. A state in which the unwanted substance in the collection container 62B is swirled by a wind from a blower unit 60A can also visually be recognized from the outside of the housing 100 via the transmissive portion 101. In the arrangement example shown in FIG. 28, it may be possible to visually recognize only portions on the front side of a broken line L11 from the outside of the housing 100 via the transmissive portion 101.

Additionally, more about the grinding apparatus 5, it may be possible to visually recognize all or some parts of the coarse grinder 5A or the fine grinder 5B from the outside of the housing 100 via the transmissive portion 101.

More about the extracting apparatus 3, it may be possible to visually recognize all or some parts of the extraction container 9 from the outside of the housing 100 via the transmissive portion 101. It may be possible to visually recognize all or some operations such as a change in the posture of the extraction container 9 caused by an inverting operation of the extraction container 9 and the horizontal movement of the extraction container 9 (container main body 90) in the longitudinal direction from the outside of the housing 100 via the transmissive portion 101. It may be possible or impossible to visually recognize opening/closing of a first plug member (for example, 913) in the extraction container 9 from the outside of the housing 100 via the transmissive portion 101. It may be possible or impossible to visually recognize opening/closing of a second plug member (for example, 903) in the extraction container 9 from the outside of the housing 100 via the transmissive portion 101. It may be possible or impossible to visually recognize opening/closing of a lid unit (for example, 91) in the extraction container 9 from the outside of the housing 100 via the transmissive portion 101.

Fifth Embodiment

Figure 59:
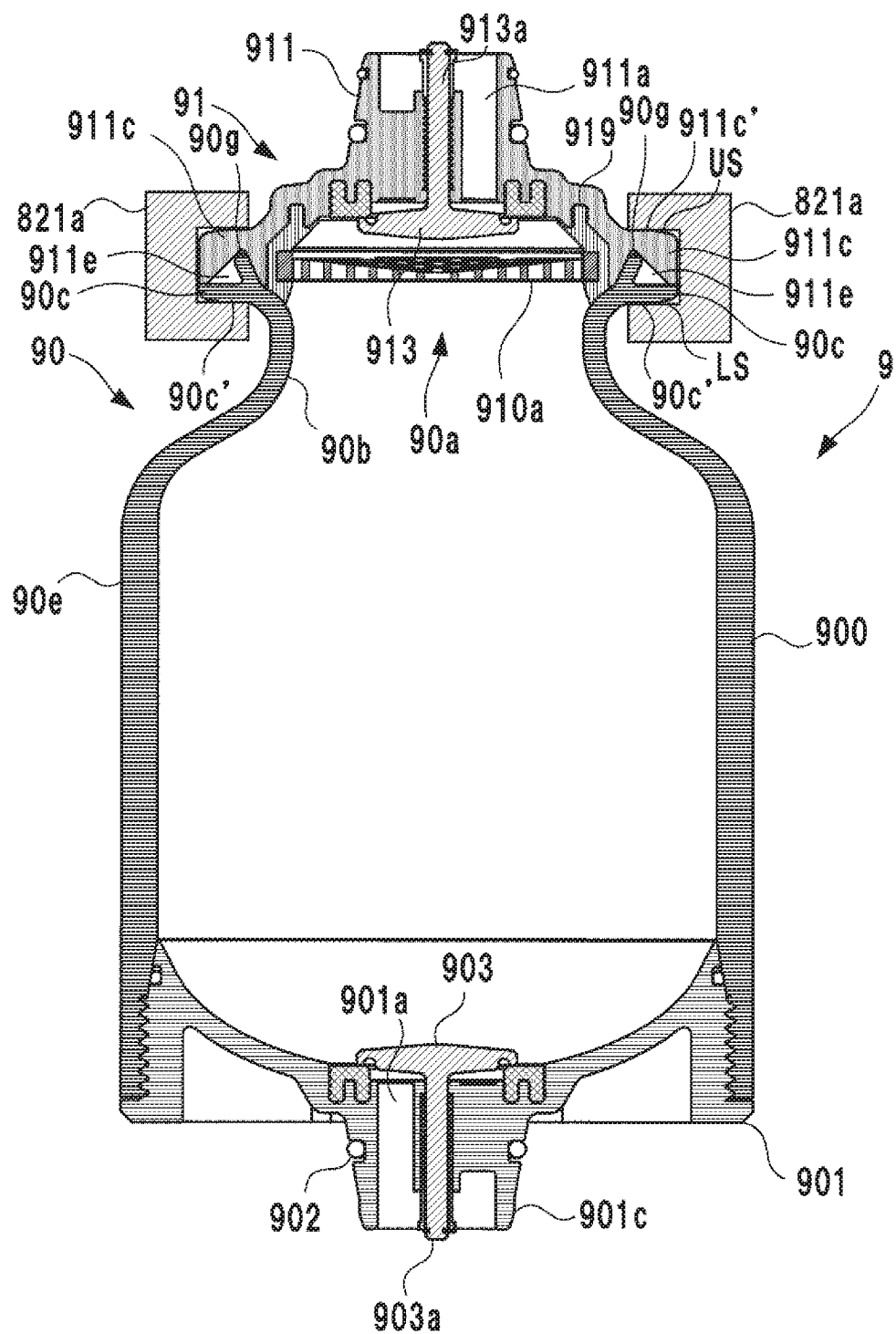
FIG. 59 is a sectional view showing another example of the extraction container.
Figure 60:
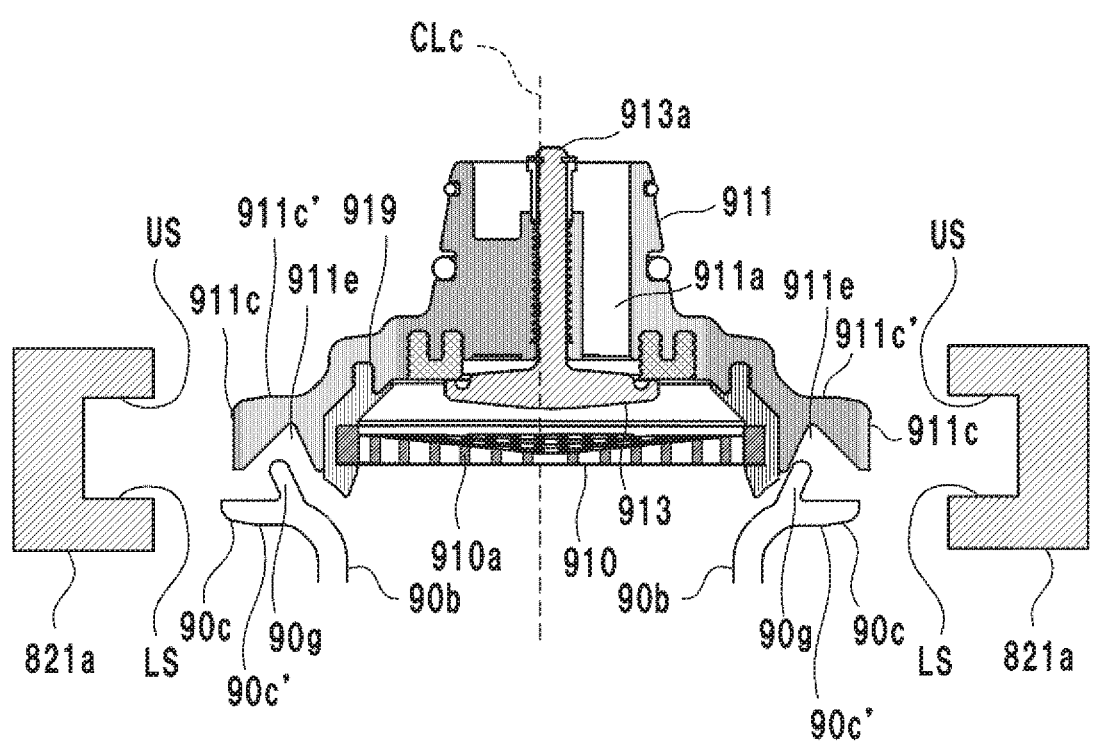
FIG. 60 is an explanatory view of the guide function of the extraction container according to the example shown in FIG. 59.

Another example of the arrangement of an extraction container 9 will be described. FIG. 59 is a sectional view of the extraction container 9 according to this embodiment, and shows a state in which the extraction container 9 is locked by grip members 821a. FIG. 60 is an explanatory view of a guide function of automatically centering a container main body 90 and a lid unit 91.

In the extraction container 9 according to this embodiment, a guide portion 911e and a guide portion 90g are provided on a collar portion 911c and a flange portion 90c, respectively. When the lid unit 91 closes an opening 90a, one of the guide portions 911e and 90g guides the other, thereby automatically performing centering of the container main body 90 and the lid unit 91.

In this embodiment, the guide portion 911e is an annular groove formed over the entire periphery of the collar portion 911c. The groove has a triangular sectional shape and is open downward (to the side of the container main body 90). The guide portion 90g is an annular rib formed over the entire periphery of the flange portion 90c. The rib projects upward (from the flange portion 90c) (to the side of the lid unit 91) and tilts in correspondence with the tile of the inner surface of the guide portion 911e.

FIG. 60 shows a case in which the lid unit 91 closes the opening 90a from a state in which the lid unit 91 is apart from the opening 90a. The example shown in FIG. 60 shows a state in which the lid unit 91 is shifted by a small amount from a center line CLc of the container main body 90. Note that the center of the lid unit 91 is the axis of a shaft 913a.

If the lid unit 91 is shifted from the center line CLc of the container main body 90, as shown in FIG. 60, when the collar portion 911c and the flange portion 90c are overlaid, the guide portion 90g abuts against the tilting surface of the guide portion 911e on the inner side in the radial direction, and at least one of the guide portions slightly displaces in the horizontal direction such that the center of the lid unit 91 matches the center line CLc of the container main body 90 by the guide. Centering of the container main body 90 and the lid unit 91 is thus automatically performed.

Note that in this embodiment, the guide portion 911e is formed as a groove, and the guide portion 90g is formed as a rib. However, the relationship may be reversed. In addition, the shape of the guide portion 911e or the guide portion 90g can also appropriately be selected.

In this embodiment, the grip member 821a has a rectangular sectional shape, as in the example of FIG. 17, and an upper inner surface US that forms the upper side of the sectional shape and a lower inner surface LS that forms the lower side of the sectional shape are parallel to each other. In a lock state, the upper inner surface US is in contact with a part (contact surface) 911c' of the upper surface of the collar portion 911c, and the lower inner surface LS is in contact with a part (contact surface) 90c' of the lower surface of the flange portion 911c. In the lock state, in this embodiment, the upper inner surface US, the lower inner surface LS, the contact surface 911c' and the contact surface 90c' are parallel to each other and orthogonal to the center line CLc. When the pressure in the extraction container 9 is raised, a force for separating the lid unit 91 and the container main body 90 from each other in the vertical direction (more exactly, in the direction of the center line CLc) acts on them. Since the upper inner surface US, the lower inner surface LS, the contact surface 911c' and the contact surface 90c' are parallel to each other, as a component of the force for separating, a component of force in a direction to open the pair of grip members 821a to the left and right sides hardly acts, and the lock state can more reliably be maintained.

Other Embodiments

The above-described embodiments can be combined with each other. Additionally, in the above embodiments, a coffee beverage has been handled exclusively. However, teas such as Japanese tea and black tea and various kinds of beverages such as a soup can also be handled. Furthermore, coffee beans, raw coffee beans, ground beans of coffee beans, roasted coffee beans, ground beans of roasted coffee beans, unroasted coffee beans, ground beans of unroasted coffee beans, coffee bean powder, instant coffee, coffee in a pot and the like have been exemplified as the extraction target. As the beverage, a coffee beverage and the like have been exemplified. As the beverage liquid, a coffee liquid has been exemplified. However, the present invention is not limited to these. The extraction target need only be an extraction material such as tea leaves of Japanese tea, black tea, oolong tea or the like, powdered tea, a vegetable, a ground vegetable, a fruit, a ground fruit, grain, ground grain, a mushroom such as a shiitake mushroom, a ground product of a mushroom such as a shiitake mushroom, a heated and dried product of a mushroom such as a shiitake mushroom, a ground product of a heated and dried product of a mushroom such as a shiitake mushroom, fish such as a skipjack, a ground product of fish such as a skipjack, a heated and dried product of fish such as a skipjack, a ground product of a heated and dried product of fish such as a skipjack, seaweed such as kelp, a ground product of seaweed such as kelp, a heated and dried product of seaweed such as kelp, a ground product of a heated and dried product of seaweed such as kelp, a heated and dried product of a meat such as pork, beef, chicken or the like, a ground product of a heated and dried product of the meat, a heated and dried product of a meat such as pork bone, beef bone, chicken bone or the like or a ground product of a heated and dried product of the bone. The beverage need only be a beverage such as Japanese tea, black tea, oolong tea, vegetable juice, fruit juice, soup, dashi or soup. The beverage liquid need only be an extract such as an extract of Japanese tea, an extract of black tea, an extract of oolong tea, an extract of a vegetable, an extract of a fruit, an extract of a mushroom, an extract of fish or the like, an extract of a meat or an extract of a bone. Note that in the embodiments, expressions such as water, tap water, pure water, hot water and wash water are used in some portions. For example, water may be replaced with hot water, and hot water may be replaced with water. That is, an expression may be replaced with another expression, and all expressions may be replaced with liquid, steam, high-temperature water, cooling water, cold water or the like. For example, an expression "an extraction target (for example, ground beans of roasted coffee beans) and hot water are put in the extraction container 9" may be replaced with an expression "an extraction target (for example, ground beans of roasted coffee beans) and cold water (or simply water) are put in the extraction container 9". In this case, the method and apparatus may be regarded as an extracting method and beverage producing apparatus for cold brew coffee or the like.

Summary of Embodiments

The above-described embodiments disclose at least the following apparatuses or methods.

A1. There is provided a separation apparatus (for example, 6) for separating an unwanted substance from ground beans of roasted coffee beans, comprising:

a forming unit (for example, 6B) configured to form a separation chamber (for example, SC) through which the ground beans pass; and a suction unit (for example, 6A) communicating with the separation chamber in a direction crossing a passage direction of the ground beans and configured to suck air in the separation chamber, wherein the forming unit includes:

an inlet (for example, 65a, 65a') for the ground beans, which communicates with the separation chamber; and an outlet (for example, 66) for the ground beans, which communicates with the separation chamber, and the air is sucked from the outlet into the separation chamber by suction of the suction unit.

A2. There is provided the separation apparatus wherein an opening area (for example, SC2) of the outlet is larger than an opening area (for example, SC1') of the inlet.

A3. There is provided the separation apparatus wherein the forming unit comprises a tubular portion (for example, 65), a one-end opening portion (for example, 65a) of the tubular portion forms the inlet, an other-end opening portion (for example, 65b) of the tubular portion faces the separation chamber, and an opening area of the outlet is larger than an opening area of the other-end opening portion.

A4. There is provided the separation apparatus wherein an internal space of the tubular portion has a shape that decreases a sectional area from a side of the one-end opening portion to a side of the other-end opening portion (for example, FIG. 6).

A5. There is provided the separation apparatus wherein the tubular portion is extended in a vertical direction, and at least a part of a lower end of the tubular portion on a side of the suction unit projects downward with respect to at least a part of the lower end on an opposite side (for example, FIG. 9, EX3).

A6. There is provided the separation apparatus wherein the air is sucked from the inlet into the separation chamber by suction of the suction unit.

A7. There is provided the separation apparatus wherein the tubular portion is extended in a vertical direction, and the other-end opening portion is within a region formed by extending the outlet in the vertical direction (for example, FIG. 8).

A8. There is provided the separation apparatus wherein the one-end opening portion, the other-end opening portion, and the outlet have circular shapes and are arranged on the same center line (for example, CL) (for example, FIG. 8).

A9. There is provided the separation apparatus wherein the forming unit includes:

a pipe portion (for example, 63) extending in a direction crossing the same center line and configured to form a communicating path to the suction unit; and a separation chamber forming portion (for example, 64) connected to the pipe portion and configured to form the separation chamber, and the separation chamber forming portion has an annular shape with respect to the same center line as a center (for example, FIG. 8).

A10. There is provided the separation apparatus wherein a turbulence promoting portion (for example, 67) configured to generate turbulence in the air sucked from the outlet into the separation chamber is formed on a peripheral wall of the outlet.

A11. There is provided the separation apparatus wherein the turbulence promoting portion includes a plurality of turbulence promoting elements (for example, 67a).

A12. There is provided the separation apparatus wherein the plurality of turbulence promoting elements are repetitively formed in a peripheral direction of the outlet.

A13. There is provided the separation apparatus wherein the plurality of turbulence promoting elements comprise a plurality of projections, a plurality of notches, or a plurality of holes.

A14. There is provided the separation apparatus wherein the tubular portion projects into the separation chamber, the one-end opening portion of the tubular portion is located outside the separation chamber, and the other-end opening portion of the tubular portion is located inside the separation chamber.

A15. There is provided a grinding apparatus (for example, 5) comprising:

a first grinder (for example, 5A) configured to coarsely grind roasted coffee beans;

the above-described separation apparatus configured to separate an unwanted substance from ground beans discharged from the first grinder; and a second grinder (for example, 5B) configured to finely grind the ground beans discharged from the separation apparatus.

A16. There is provided a beverage producing apparatus (for example, 1) comprising:

the above-described grinding apparatus; and an extracting apparatus (for example, 3) configured to extract a coffee liquid from ground beans discharged from the grinding apparatus.

B1. There is provided an extracting method of extracting a coffee liquid from ground beans of roasted coffee beans, comprising:

a pressure reduction step (for example, S15) of switching an interior of an extraction container in which the ground beans and a liquid are stored from a first air pressure to a second air pressure lower than the first air pressure; and an extraction step (for example, S17) of extracting the coffee liquid from the ground beans, wherein the first air pressure is an air pressure at which the liquid at a predetermined temperature does not boil, the second air pressure is an air pressure at which the liquid that does not boil at the first air pressure boils, and the switching from the first air pressure to the second air pressure is done by releasing the air pressure in the extraction container.

B2. There is provided the extracting method wherein in the extraction step, the coffee liquid is extracted by a permeation method while discharging the liquid in the extraction container from the extraction container.

B3. There is provided the extracting method wherein in the extraction step, the coffee liquid is extracted by an immersion method in the extraction container.

B4. There is provided the extracting method wherein the liquid is high-temperature water, the predetermined temperature is a temperature not less than a boiling point of the liquid at the first air pressure, the first air pressure is an air pressure more than an atmospheric pressure, and the second air pressure is the atmospheric pressure.

B5. There is provided the extracting method wherein the liquid supplied to the extraction container is a warmed liquid and is pressure-fed into the extraction container at a third air pressure at which the liquid does not boil, and the third air pressure is an air pressure lower than the first air pressure and higher than the second air pressure.

B6. There is provided the extracting method further comprising a steaming step (for example, S11) of steaming the ground beans by the liquid supplied to the extraction container before the pressure reduction step, wherein in the steaming step, the air pressure in the extraction container is maintained at the third air pressure.

B7. There is provided the extracting method further comprising a step (for example, S14) of extracting coffee by an immersion method in the extraction container before the pressure reduction step.

B8. There is provided an extracting apparatus (for example, 3) for extracting a coffee liquid from ground beans of roasted coffee beans, comprising:

an extraction container (for example, 9);

a supply unit (for example, 7) configured to supply a liquid and an air pressure to the extraction container; and a control unit (for example, 11) configured to control the supply unit, wherein the control unit executes pressure reduction control of switching an interior of the extraction container in which the ground beans and the liquid are stored from a first air pressure to a second air pressure lower than the first air pressure (for example, S15), the first air pressure is an air pressure at which the liquid at a predetermined temperature does not boil, the second air pressure is an air pressure at which the liquid that does not boil at the first air pressure boils, and the switching from the first air pressure to the second air pressure is done by releasing the air pressure in the extraction container.

C1. There is provided an extracting apparatus (for example, 3) for extracting a coffee liquid from ground beans of roasted coffee beans, comprising:

an extraction container (for example, 9) including a neck portion (for example, 90b) with an opening (for example, 90a) and a trunk portion (for example, 90e) and configured to store the ground beans and a liquid;

a filter (for example, 910) arranged on the opening of the neck portion and configured to restrict leakage of the ground beans; and a driving unit (for example, 8B) configured to change a posture of the extraction container from a first posture in which the neck portion is located on an upper side to a second posture in which the neck portion is located on a lower side.

C2. There is provided the extracting apparatus wherein the extraction container includes a lid unit (for example, 91) including the filter, and the lid unit opens the opening when charging the ground beans into the extraction container (for example, S2), and covers the opening when extracting the coffee liquid in the extraction container (for example, S3).

C3. There is provided the extracting apparatus wherein in the first posture, the ground beans accumulate in the trunk portion, in the second posture, the ground beans accumulate in the neck portion, and the extraction container is formed such that an accumulation thickness of the ground beans in the second posture is larger than in the first posture.

C4. There is provided the extracting apparatus wherein a sectional area of an internal space is smaller in the neck portion than in the trunk portion.

C5. There is provided the extracting apparatus wherein the extraction container includes a shoulder portion (for example, 90d) between the trunk portion and the neck portion, and in the shoulder portion, a sectional area of an internal space is gradually reduced toward the neck portion.

C6. There is provided the extracting apparatus wherein the neck portion has a cylindrical shape.

C7. There is provided the extracting apparatus wherein the first posture is maintained for at least a predetermined immersion time (for example, S14).

C8. There is provided the extracting apparatus wherein the second posture is maintained for at least a predetermined permeation time (for example, S17).

C9. There is provided an extracting method of extracting a coffee liquid from ground beans of roasted coffee beans, comprising:

an immersion step (for example, S14) of immersing, in a liquid in an extraction container with a first posture, the ground beans accumulated in the extraction container in a first form;

an inverting step (for example, S16) of inverting a posture of the extraction container from the first posture to a second posture and accumulating the ground beans in a second form; and a permeation step (for example, S17) of sending the liquid from the extraction container in the second form, wherein the second form is a form in which an accumulation thickness of the ground beans is larger than in the first form, and in the permeation step, the liquid is sent through the ground beans accumulated in the second form.

C10. There is provided the extracting method wherein the extraction container includes a thick portion (for example, 90e) and a thin portion (for example, 90b), in the first posture, the ground beans accumulate in the thick portion, and in the second posture, the ground beans accumulate in the thin portion.

D1. There is provided a beverage producing apparatus (for example, 1) including:

a separation apparatus (for example, 6) configured to separate an unwanted substance from ground beans of roasted coffee beans; and an extracting apparatus (for example, 3) configured to extract a coffee liquid from the ground beans from which the unwanted substance is separated by the separation apparatus, comprising:

a housing (for example, 100) configured to form an exterior of the beverage producing apparatus, wherein the housing includes a first transmissive portion (for example, 101) configured to make at least a part of the separation apparatus visible from an outside.

D2. There is provided a beverage producing apparatus (for example, 1) including an extracting apparatus (for example, 3) configured to extract a coffee liquid from ground beans of roasted coffee beans, comprising:

a housing (for example, 100) configured to form an exterior of the beverage producing apparatus, wherein the extracting apparatus includes an extraction container (for example, 9) in which the ground beans and a liquid are stored, and a driving unit (for example, 8B) configured to move the extraction container when extracting the coffee liquid, the housing includes a first transmissive portion (for example, 101) configured to make at least a part of the extraction container visible from an outside.

D3. There is provided the beverage producing apparatus wherein the separation apparatus includes a collection container (for example, 60B) configured to store the unwanted substance, the collection container includes a second transmissive portion (for example, 62) configured to make the stored unwanted substance visible from the outside, and the unwanted substance stored in the collection container is visible from the outside via the first transmissive portion and the second transmissive portion.

D4. There is provided the beverage producing apparatus wherein the separation apparatus includes a blower unit (for example, 60A) configured to expel air in the collection container, and the blower unit and the collection container form a centrifugal separation apparatus configured to collect the unwanted substance to a portion of the collection container.

D5. There is provided the beverage producing apparatus wherein the collection container is detachable from the separation apparatus.

D6. There is provided the beverage producing apparatus further comprising:

a first grinder (for example, 5A) configured to coarsely grind the roasted coffee beans; and a second grinder (for example, 5B) configured to finely grind the roasted coffee beans, wherein the separation apparatus separates the unwanted substance from ground beans discharged from the first grinder, the second grinder finely grinds the ground beans from which the unwanted substance is separated by the separation apparatus, and in the second grinder, at least a part of the second grinder is visible via the first transmissive portion.

D7. There is provided the beverage producing apparatus wherein the first transmissive portion is configured to be freely opened/closed (for example, FIG. 56, FIG. 58).

D8. There is provided the beverage producing apparatus wherein the first transmissive portion has a shape that makes an interior of the apparatus visible at least from a front side and a lateral side of the beverage producing apparatus (for example, FIG. 58).

D9. There is provided the beverage producing apparatus wherein the first transmissive portion includes a curved surface (for example, FIG. 58).

D10. There is provided the beverage producing apparatus wherein a posture of the extraction container is changed by driving of the driving unit when extracting the coffee liquid, and the change in the posture of the extraction container is visible via the first transmissive portion.

E1. There is provided a beverage producing apparatus (for example, 1) for producing a beverage using roasted coffee beans as a material, comprising:

a bean container (for example, 40) configured to store the roasted coffee beans;

an attachment portion (for example, 44) to which the bean container is attached;

a first receiving portion (for example, 442) configured to receive the roasted coffee beans; and a second receiving portion (for example, 42c) configured to receive the roasted coffee beans, wherein the first receiving portion receives the roasted coffee beans from the bean container attached to the attachment portion, and the second receiving portion is an opening portion formed in a portion different from the attachment portion.

E2. There is provided the beverage producing apparatus further comprising a sending unit (for example, 41) configured to automatically send a predetermined amount of roasted coffee beans received by the first receiving portion to a downstream side, wherein the roasted coffee beans received by the second receiving portion are not automatically sent by the sending unit and can be used to produce the beverage.

E3. There is provided the beverage producing apparatus further comprising a grinder (for example, 5A) configured to grind the roasted coffee beans, wherein the roasted coffee beans received by one of the first receiving portion and the second receiving portion are supplied to the grinder.

E4. There is provided the beverage producing apparatus wherein a path length of a supply path (for example, RT2) of the roasted coffee beans from the second receiving portion to the grinder is smaller than a path length of a supply path (for example, RT1) of the roasted coffee beans from the first receiving portion to the grinder.

E5. There is provided the beverage producing apparatus further comprising:

a first supply path (for example, RT1) configured to pass the roasted coffee beans received by the first receiving portion; and a second supply path (for example, RT2) configured to pass the roasted coffee beans received by the second receiving portion, wherein the second supply path is combined with a halfway point of the first supply path.

E6. There is provided the beverage producing apparatus wherein the sending unit comprises a screw conveyor and is a unit configured to send the predetermined amount of roasted coffee beans by a rotation amount of a screw shaft (for example, 47).

E7. There is provided the beverage producing apparatus wherein the sending unit is visible via the opening portion (for example, 42c).

E8. There is provided the beverage producing apparatus wherein the bean container comprises an outlet (for example, 405a) of the roasted coffee beans for the first receiving portion, and a lid mechanism (for example, 408) configured to open/close the outlet, and the beverage producing apparatus comprises a driving mechanism (for example, 41a, 444, 445c) configured to operate the lid mechanism and automatically open the outlet from a closed state to an open state after the bean container is attached to the attachment portion.

E9. There is provided the beverage producing apparatus wherein the driving mechanism can operate the lid mechanism and automatically close the outlet from the open state to the closed state.

F1. There is provided an extracting apparatus (for example, 3) for extracting a coffee liquid from ground beans of roasted coffee beans, comprising:

a container (for example, 90) in which the ground beans and a liquid are stored, and the coffee liquid is extracted from the ground beans; and a driving unit (for example, 8B) configured to move the container to a ground bean supply position (for example, a bean charging position indicated by a broken line in FIG. 9) at which the ground beans are supplied to the container and a liquid supply position (for example, an extraction position indicated by a solid line in FIG. 9) at which the liquid is supplied to the container.

F2. There is provided the extracting apparatus further comprising a housing (for example, 100) configured to form an exterior of the extracting apparatus, wherein the housing includes a transmissive portion (for example, 101) configured to make the movement of the container visible from an outside.

F3. There is provided the extracting apparatus wherein the driving unit reciprocally moves the container between the ground bean supply position and the liquid supply position (for example, FIG. 9).

F4. There is provided the extracting apparatus wherein the driving unit translates the container in a horizontal direction (for example, FIG. 9).

F5. There is provided the extracting apparatus wherein the driving unit includes a support member (for example, 820) configured to support the container.

F6. There is provided the extracting apparatus wherein the support member includes:

a holding member (for example, 820a) configured to hold the container; and a shaft member (for example, 820b) connected to the holding member and extending in a moving direction of the container, when the moving direction of the container is a front surface to rear surface direction of the container, the holding member is extended along left and right side portions and a bottom portion of the container (for example, FIG. 29, FIG. 30), the shaft member is connected to the holding member on each side portion of the container, and the shaft member is moved in the moving direction.

F7. There is provided the extracting apparatus wherein after the ground beans are supplied to the container at the ground bean supply position, the liquid is supplied to the container at the liquid supply position.

F8. There is provided the extracting apparatus wherein after a liquid for preheating is supplied to the container at the liquid supply position, the ground beans are supplied to the container at the ground bean supply position, and the liquid is then supplied to the container at the liquid supply position.

F9. There is provided the extracting apparatus wherein when the moving direction of the container is a front surface to rear surface direction of the container, a front surface of the container is visible via the transmissive portion, and the liquid supply position is a position on a far side of the ground bean supply position.

F10. There is provided the extracting apparatus further comprising a lid unit (for example, 91) detachably attached to an opening (for example, 90a) of the container at the liquid supply position, wherein the lid unit includes a hole (for example, 911a) configured to make an interior of the container communicate with an outside, and in a state in which the lid unit is attached to the opening at the liquid supply position, the liquid is supplied into the container via the hole.

F11. There is provided the extracting apparatus wherein in a state in which the lid unit is separated from the opening at the liquid supply position, the container moves to the ground bean supply position, and the ground beans are supplied into the container via the opening.

F12. There is provided the extracting apparatus wherein the driving unit includes a mechanism configured to invert the container and the lid unit to a first posture in which the lid unit is located on the upper side at the liquid supply position and a second posture in which the lid unit is located on a lower side, and a plug member (for example, 913) configured to open/close the hole, in the first posture, the liquid is supplied into the extraction container, and in the second posture, the plug member opens the hole, and a coffee beverage is sent from the container via the hole.

G1. There is provided an extracting apparatus (for example, 3) for extracting a coffee liquid from ground beans of roasted coffee beans, comprising:

an extraction container (for example, 9) in which the ground beans and a liquid are stored, and the coffee liquid is extracted from the ground beans; and a supply unit (for example, 7) configured to supply the liquid to the extraction container, wherein the extraction container includes:

a first hole (for example, 911a) configured to send a coffee beverage in the extraction container; and a second hole (for example, 901a) configured to send a liquid used to cleaning in the extraction container.

G2. There is provided the extracting apparatus further comprising a driving unit (for example, 8B) configured to invert a posture of the extraction container between a first posture and a second posture, wherein the first hole is located at a lower end of the extraction container in the first posture and at an upper end of the extraction container in the second posture, and the second hole is located at the upper end of the extraction container in the first posture and at the lower end of the extraction container in the second posture.

G3. There is provided the extracting apparatus wherein after the coffee beverage in the extraction container is sent via the first hole in a state in which the extraction container is in the first posture, the extraction container is changed to the second posture by the driving unit, and the liquid for cleaning is supplied by the supply unit into the extraction container via the first hole.

G4. There is provided the extracting apparatus further comprising a filter (for example, 910) configured to restrict leakage of the ground beans in the extraction container from the first hole.

G5. There is provided the extracting apparatus wherein the filter comprises a metal filter.

G6. There is provided the extracting apparatus wherein the metal filter is located on a side of the lower end of the extraction container in the first posture and on a side of the upper end of the extraction container in second posture.

G7. There is provided the extracting apparatus wherein the extraction container includes a first plug member (for example, 913) configured to open/close the first hole, and a second plug member (for example, 903) configured to open/close the second hole.

G8. There is provided the extracting apparatus wherein the extraction container includes a transmissive portion (for example, 90) configured to make an interior visible.

G9. There is provided the extracting apparatus wherein the second hole is larger than the first hole, and when the liquid for cleaning is supplied from the first hole into the extraction container, air is sent from the first hole.

H1. There is provided a beverage producing apparatus (for example, 1) for producing a beverage using roasted coffee beans as a material, comprising:

a bean container (for example, 40) configured to store the roasted coffee beans;

an attachment portion (for example, 44) to which the bean container is detachably attached; and a conveyance mechanism (for example, 41) capable of conveying the roasted coffee beans from the bean container, wherein the conveyance mechanism is provided to remain on a side of the attachment portion in a case in which the bean container is detached from the attachment portion.

H2. There is provided the beverage producing apparatus wherein the bean container includes:

a first port (for example, an end of the tube portion 401) configured to allow the roasted coffee beans to exit/enter; and a second port (for example, 405*a*) configured to allow the roasted coffee beans to exit/enter, the first port is a port through which the roasted coffee beans do not pass when moving from the bean container into the beverage producing apparatus, and the second port is a port through which the roasted coffee beans pass when moving from the bean container into the beverage producing apparatus.

H3. There is provided the beverage producing apparatus wherein the bean container includes an opening/closing member (for example, 408) configured to open/close the second port.

H4. There is provided the beverage producing apparatus wherein the bean container includes:

a tube portion (for example, 401); and a forming member (for example, 405) provided at an end of the tube portion and configured to form the second port, and the opening/closing member is attached to the forming member to be rotatable about a central axis of the tube portion.

H5. There is provided the beverage producing apparatus wherein the attachment portion is provided with a driving mechanism (for example, 41*a*, 444, 445*c*) capable of operating the opening/closing member and opening the second port.

H6. There is provided the beverage producing apparatus wherein the driving mechanism can operate the opening/closing member and close the second port.

H7. There is provided the beverage producing apparatus wherein the attachment portion is provided with restriction means (for example, 408*a*) for restricting detachment of the bean container in a case in which the second port is open.

H8. There is provided the beverage producing apparatus wherein the conveyance mechanism conveys the roasted coffee beans received by a receiving portion (for example, 442), the receiving portion receives the roasted coffee beans from the bean container attached to the attachment portion, and after the conveyance mechanism is driven (for example, FIG. 44) in a state in which the second port is partially closed by the opening/closing member, the second port is completely closed by the opening/closing member.

H9. There is provided the beverage producing apparatus wherein the conveyance mechanism conveys the roasted coffee beans received by a receiving portion (for example, 442), the receiving portion receives the roasted coffee beans from the bean container attached to the attachment portion, and the attachment portion is provided with a shutter (for example, 443) configured to open/close the receiving portion.

H10. There is provided the beverage producing apparatus wherein the bean container comprises restriction means (for example, 406*a*, 408*d*, 406*a'*, 408*d'*) for restricting opening of the second port by the opening/closing member in a case in which the bean container is not attached to the attachment portion.

I1. There is provided an extracting apparatus (for example, 3) for extracting a coffee liquid from ground beans of roasted coffee beans, comprising:

a container main body (for example, 90) configured to store the ground beans and a liquid;

a lid (for example, 91) configured to close an opening (for example, 90*a*) of the container main body; and a lock mechanism (for example, 821) configured to lock the container main body and the lid in a state in which the lid closes the opening.

I2. There is provided the extracting apparatus wherein the container main body includes a peripheral portion (for example, 90*c*) configured to define the opening, the lid includes a collar portion (for example, 911*c*) configured to overlap the peripheral portion, and the lock mechanism includes a fitting portion (for example, 821) fitted on the peripheral portion and the collar portion such that the peripheral portion and the collar portion, which overlap each other, are sandwiched.

I3. There is provided the extracting apparatus wherein the fitting portion includes a first surface (for example, LS) configured to contact the peripheral portion in a fitted state, and a second surface (for example, US) configured to contact the collar portion, the peripheral portion includes a third surface (for example, 90*c'*) configured to contact the first surface, the collar portion includes a fourth surface (for example, 911*c'*) configured to contact the second surface, and in the fitted state, the first surface to the fourth surface are parallel to each other.

I4. There is provided the extracting apparatus further comprising:

a holding portion (for example, 801) configured to hold the lid; and driving means (for example, 8A) for moving the holding portion to a first position at which the lid closes the opening and a second position at which the lid separates from the opening.

I5. There is provided the extracting apparatus wherein the collar portion and the peripheral portion respectively include guide portions (for example, 90*g*, 911*e*) configured to guide each other such that a position of the container main body and a position of the lid match when the collar portion and the peripheral portion overlap.

I6. There is provided the extracting apparatus wherein the lid comprises a seal member (for example, 919*a*) configured to seal between the container main body and the lid.

I7. There is provided the extracting apparatus wherein in a case in which the lock mechanism locks the container main body and the lid, the lid cannot be moved to the second position even when the driving means is driven.

I8. There is provided the extracting apparatus wherein the lid includes:

a hole (for example, 911*a*) extending through the lid; and a plug member (for example, 913) configured to open/close the hole, and in a state in which the container main body and the lid are locked by the lock mechanism, air at an air pressure higher than an atmospheric pressure is supplied into the container main body via the hole.

I9. There is provided the extracting apparatus wherein the plug member can be opened by the air pressure of the air supplied into the container main body.

I10. There is provided the extracting apparatus wherein the lid includes:

a hole (for example, 911a) extending through the lid; and a plug member (for example, 913) configured to open/close the hole, and in a state in which the container main body and the lid are locked by the lock mechanism, water is supplied into the container main body via the hole.

I11. There is provided the extracting apparatus wherein the plug member can be opened by a liquid pressure of a liquid supplied into the container main body.

The present invention is not limited to the above embodiments, and various changes and modifications can be made within the spirit and scope of the present invention. Therefore, to apprise the public of the scope of the present invention, the following claims are made.

The invention claimed is:

1. A separation apparatus for separating an unwanted substance from coffee beans, comprising:

a forming unit configured to form a separation chamber; and a suction unit configured to suck an air in the separation chamber, wherein the forming unit includes an inlet for the coffee beans on an upper portion of the forming unit, and an outlet on a lower portion of the forming unit, outside air is sucked from the outlet into the separation chamber by suction of the suction unit so that the outside air flows into the separation chamber in a direction opposite to a direction in which the coffee beans fall from the outlet, and a plurality of disturbing elements are formed in a peripheral direction of the outlet and configured to disturb air flow which flows into the separation chamber through the outlet.

2. The separation apparatus according to claim 1, wherein the forming unit and the suction unit are connected through a tube portion with each other, and the tube portion is connected to a side portion of the forming unit.

3. The separation apparatus according to claim 1, wherein the coffee beans ground by a first grinder fall into the inlet, the coffee beans which fall from the outlet are ground by a second grinder which is a separate grinder from the first grinder, the first grinder, the second grinder and the forming unit are separate, and the separation apparatus further comprises a main body to which the first grinder, the second grinder and the forming unit are attached.

4. The separation apparatus according to claim 3, wherein each of the first grinder and the second grinder grinds the coffee beans by a rotary blade which rotates about a rotary axis in a vertical direction.

* * * * *